US008155718B2

(12) United States Patent
Byun et al.

(10) Patent No.: US 8,155,718 B2
(45) Date of Patent: Apr. 10, 2012

(54) SLIDING/HINGE APPARATUS FOR SLIDING/ROTATING TYPE MOBILE TERMINALS

(75) Inventors: Chang-Heum Byun, Gumi-si (KR); Jong-Gun Bae, Gumi-si (KR); Sung-Il Kang, Gumi-si (KR); Seung-Hwan Lee, Gumi-si (KR); In-Gon Park, Seoul (KR); Chang-soo Lee, Inchon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 401 days.

(21) Appl. No.: 11/227,268

(22) Filed: Sep. 16, 2005

(65) Prior Publication Data

US 2006/0030381 A1    Feb. 9, 2006

Related U.S. Application Data

(63) Continuation-in-part of application No. 10/917,353, filed on Aug. 13, 2004.

(30) Foreign Application Priority Data

| Sep. 3, 2003 | (KR) | ................................. 2003-61456 |
| Nov. 13, 2003 | (KR) | ................................. 2003-80342 |
| Apr. 26, 2004 | (KR) | ................................. 2004-28590 |

(51) Int. Cl.
*H04M 1/00* (2006.01)
(52) U.S. Cl. ............... 455/575.4; 455/575.1; 455/575.3; 455/550.1; 16/347; 16/330; 16/342; 248/289.11; 248/917
(58) Field of Classification Search ............... 455/575.4, 455/575.1, 575.3, 550.1; 16/347, 330, 342; 248/289.11, 917
See application file for complete search history.

(56) References Cited

U.S. PATENT DOCUMENTS

| 6,522,529 | B1 | 2/2003 | Huilgol et al. |
| 6,941,618 | B2 | 9/2005 | Kim |
| 7,529,571 | B2 | 5/2009 | Byun et al. |
| 2002/0102946 | A1* | 8/2002 | SanGiovanni ................. 455/90 |
| 2003/0064688 | A1* | 4/2003 | Mizuta et al. .................. 455/90 |
| 2003/0064758 | A1 | 4/2003 | Mizuta et al. |
| 2003/0125008 | A1* | 7/2003 | Shimamura ................... 455/344 |
| 2003/0203747 | A1* | 10/2003 | Nagamine ................... 455/575.3 |
| 2004/0085739 | A1 | 5/2004 | Lee et al. |
| 2004/0198460 | A1* | 10/2004 | Sakuta et al. ................ 455/566 |
| 2004/0203517 | A1* | 10/2004 | Park et al. .................... 455/90.3 |
| 2004/0203532 | A1* | 10/2004 | Mizuta ......................... 455/90.3 |

(Continued)

FOREIGN PATENT DOCUMENTS

EP              1 357 726          10/2003

(Continued)

*Primary Examiner* — Ajit Patel
*Assistant Examiner* — Khai M Nguyen
(74) *Attorney, Agent, or Firm* — Roylance, Abrams, Berdo & Goodman, L.L.P.

(57) ABSTRACT

Disclosed herein is a sliding/hinge apparatus for sliding/rotating type mobile terminals, which can be slid and rotated from a body housing of the sliding/rotating type mobile terminal. The sliding/rotating type mobile terminal includes a body housing and a slide housing slidably mounted on the body housing. The apparatus comprises first and second hinge frames mounted in the body housing by means of screws, first and second plates, one or more slide bars, and a coupling unit inserted through the center parts of the first and second hinge frames so that the first and second hinge frames are rotatably coupled with each other while being opposite to each other.

17 Claims, 73 Drawing Sheets

U.S. PATENT DOCUMENTS

| | | |
|---|---|---|
| 2004/0224729 A1* | 11/2004 | Watanabe et al. .......... 455/575.3 |
| 2004/0259609 A1 | 12/2004 | Fuji et al. |
| 2005/0005399 A1 | 1/2005 | Lu et al. |
| 2005/0078817 A1* | 4/2005 | Lee .......................... 379/433.12 |
| 2006/0060737 A1* | 3/2006 | Jeun ........................ 248/289.11 |
| 2010/0029348 A1* | 2/2010 | Lee et al. ................... 455/575.4 |
| 2010/0227650 A1* | 9/2010 | Kim et al. ..................... 455/566 |

FOREIGN PATENT DOCUMENTS

| | | |
|---|---|---|
| EP | 1 577 975 | 9/2005 |
| EP | 1 638 295 | 3/2006 |
| JP | 57-127237 | 8/1982 |
| JP | 2001-156893 | 6/2001 |
| JP | 2003-113238 * | 4/2003 |
| JP | 2003-114670 | 4/2003 |
| JP | 2003-0125052 | 4/2003 |
| JP | 2003-129942 | 5/2003 |
| JP | 2003-0239942 | 8/2003 |
| JP | 15-319043 | 11/2003 |
| JP | 2003/0338866 | 11/2003 |
| JP | 2004-0215180 | 7/2004 |
| JP | 2004-0320549 | 11/2004 |
| KR | 20-0330435 | 10/2003 |
| SE | 520 967 C2 | 9/2003 |
| WO | WO 03/046705 | 6/2003 |
| WO | WO 03/050665 | 6/2003 |

* cited by examiner

SLIDING/HINGE APPARATUS FOR SLIDING/ROTATING TYPE MOBILE TERMINALS

CROSS-REFERENCE TO RELATED APPLICATIONS

This application is a continuation-in-part of application Ser. No. 10/917,353, filed on Aug. 13, 2004. This application also claims the benefit under 35 U.S.C. §119(a) of Korean Patent Application Serial No. 2003-61456, filed on Sep. 3, 2003, Korean Patent Application Serial No. 2003-80342, filed on Nov. 13, 2003, and Korean Patent Application Serial No. 2004-28590, filed on Apr. 26, 2004. The entire content of each of the aforementioned applications is hereby incorporated by reference.

BACKGROUND OF THE INVENTION

1. Field of the Invention

The present invention relates generally to a sliding/hinge apparatus for sliding/rotating type mobile terminals. More particularly, the present invention relates to a sliding hinge apparatus which can be slid and rotated from a body housing of the sliding/rotating type mobile terminal.

2. Description of the Related Art

Generally, "portable communication devices" describes devices that are portable and enable owners of the devices to perform wireless communications. Such portable communication devices include hand-held PCs (HHP), CT-2 cellular phones, digital phones, PCS phones, and personal digital assistants (PDAs). On the basis of their forms, the portable communication devices can be classified into several types of portable wireless terminals. For example, portable wireless terminals can be basically classified as a bar-type wireless terminal, a flip-type wireless terminal, and a folder-type wireless terminal. The bar-type wireless terminal has a bar-type single housing, the flip-type wireless terminal comprises a bar-type housing and a flip part rotatably attached to the housing by means of a hinge apparatus, and the folder-type wireless terminal comprises a bar-type housing and a folder part rotatably attached to the housing by means of a hinge apparatus. On the basis of where or how they are worn, the portable wireless terminals can also be classified as a necklace-type wireless terminal and a wrist-type wireless terminal. The necklace-type wireless terminal is worn on the neck of a user by means of a string or chain, and the wrist-type wireless terminal is worn on the wrist of the user by means of a wrist band.

On the basis of how they are opened or closed, the portable wireless terminals can be further classified as a rotating-type wireless terminal and a sliding-type wireless terminal. The rotating-type wireless terminal is characterized in that the two housings are rotatably connected to each other while the housings are continuously opposite to each other. The rotating-type wireless terminal is opened or closed by the rotation of the two housings in such a manner that the housings are rotated apart from or close to each other. On the other hand, the sliding-type wireless terminal is characterized in that one of two housings is longitudinally slid relative to the other of the housings. The sliding-type wireless terminal is opened or closed by the sliding movement of one of the housings in such a manner that the housings are apart from or close to each other. The various types of portable wireless terminals described above are well known and appreciated by those having an ordinary skill in the art to which the present invention pertains.

Each conventional portable wireless terminal is indispensably provided with an antenna unit, data input/output units, and data transmitting/receiving units. The data input unit usually comprises a keypad with which data is input by means of depressing buttons via the user's fingers or a stylus. Alternatively, there a touch pad or a touch screen can be used. The data output unit generally uses an LCD. The conventional portable communication device is provided with a camera lens so that a user of the device can talk with another user of the device while looking at each other, or take pictures of desired subjects In the sliding-type mobile terminal as described above, one of the housing pieces (i.e., a slide housing) is slid along the other housing (i.e., a body housing) in the longitudinal direction of the terminal so that the sliding-type mobile terminal is opened. This feature of the sliding-type mobile terminal fully satisfies users' various changeable preferences as compared to the conventional folder-type mobile terminal. The slide housing of the sliding-type mobile terminal is slid upward or downward along the body housing of the sliding-type mobile terminal by approximately half of the length of the body housing so that the sliding-type mobile terminal is opened.

The body housing of the sliding-type mobile terminal is usually provided with a keypad comprising a plurality of keys, which are arranged in a 3×4 matrix. The slide housing of the sliding-type mobile terminal is usually provided with a liquid crystal display unit.

The slide housing of the sliding-type mobile terminal can be guided on the body housing of the sliding-type mobile terminal by means of a guiding member. To this end, either the slide housing or the body housing is provided with a guide rib while the other of the slide housing and the body housing is provided with a guide slit, which corresponds to the guide rib. The sliding and body housings are provided at the positions where the sliding-type mobile terminal is fully opened and closed with stoppers so that excessive sliding of the slide housing on the body housing is effectively prevented.

In the conventional sliding/rotating type mobile terminal, however, the liquid crystal display unit is formed in the shape of a rectangle, the length of which is large in the longitudinal direction of the terminal, so that the size of the liquid crystal display unit is increased in proportion to the external size of the sliding/rotating type mobile terminal. The liquid crystal display unit will be rotated when a wide screen is desired (or necessary) as the liquid crystal display unit extends in the longitudinal direction of the terminal. Consequently, the keypad rotates along with the terminal, with the result that inputting data via the keys is very difficult.

In the case that the liquid crystal display unit is used while the terminal is placed in the longitudinal direction thereof, on the other hand, the display screen is small. As a result, it is inconvenient for a user to watch TV, moving images, and games on the liquid crystal display unit of the terminal.

An example of a sliding type mobile terminal is disclosed, for example, in U.S. Pat. No. 6,822,871, the entire contents of which are incorporated herein by reference. The sliding type mobile terminal includes a main body, a sub body, a spring module, a slide guide, and a slide groove. In the sliding type mobile terminal of the U.S. Pat. No. 6,822,871, however, the sub body is merely slid upward and downward, not rotated. Consequently, the liquid crystal display unit disposed on the sub body is not used in the form of a wide screen.

SUMMARY OF THE INVENTION

Therefore, the present invention has been made in view of the above problem, and it is an object of the present invention to provide a sliding hinge apparatus for sliding/rotating type mobile terminals, which can be slid and rotated from a body housing of the sliding/rotating type mobile terminal, whereby the usability of the mobile terminal is improved.

It is another object of the present invention to provide a sliding/hinge apparatus for sliding/rotating type mobile terminals, which can be slid and rotated so that the body housing and the slide housing are arranged in the shape of a "T", whereby the liquid crystal display unit of the mobile terminal is used in the form of a wide screen.

In accordance with one aspect of the present invention, the above and other objects can be accomplished by the provision of a sliding/hinge apparatus for sliding/rotating type mobile terminals, each of the terminals comprising a body housing and a slide housing slidably mounted on the body housing, wherein the sliding/hinge apparatus comprises a first hinge frame mounted in the body housing, a second hinge frame disposed on first hinge frame while the second hinge frame is opposite to the first hinge frame so that the slide housing is slid and rotated about a hinge axis, first and second plates slidably attached to the second hinge frame, the first and second plates being fixed to the slide housing and one or more slide bars disposed between the second hinge frame and the first plate. The sliding/hinge apparatus further comprises a coupling unit inserted through the center parts of the first and second hinge frames so that the first and second hinge frames are rotatably coupled with each other while being opposite to each other.

In accordance with another aspect of the present invention, there is provided a sliding hinge apparatus for sliding/rotating type mobile terminals, each of the terminals comprising a body housing and a slide housing slidably mounted on the body housing, wherein the sliding/hinge apparatus comprises a first hinge frame mounted in the body housing, a second hinge frame having a cylindrical hinge housing inserted through the first hinge frame while being opposite to the first hinge frame so that the slide housing is slid and rotated about a hinge axis, and first and second plates slidably attached to the second hinge frame, the first and second plates being fixed to the slide housing. The sliding/hinge apparatus further comprises one or more slide bars disposed between the second hinge frame and the first plate, a rotary washer provided between the first and second hinge frames so that the second hinge frame is rotated while being opposite to the first hinge frame and a snap ring connected to the lower end of the hinge housing.

In accordance with another aspect of the present invention, there is provided a sliding/hinge apparatus for sliding/rotating type mobile terminals, each of the terminals comprising a body housing and a slide housing slidably mounted on the body housing, wherein the sliding/hinge apparatus comprises a first hinge frame mounted in the body housing, a second hinge frame disposed on the first hinge frame while the second hinge frame is opposite to the first hinge frame so that the slide housing is slid and rotated about a hinge axis, and a first plate slidably and rotatably attached to the second hinge frame; a second plate attached to the first plate, the second plate being fixed to the sliding housing; one or more slide bars disposed between the second hinge frame and the first plate. The sliding/hinge apparatus further comprises a guide pin formed at a prescribed position of the first hinge frame and a pin guide hole formed at the first plate, the guide pin being disposed in the pin guide hole such that the guide pin is slid and rotated.

In accordance with yet another aspect of the present invention, there is provided a sliding/hinge apparatus for sliding/rotating type mobile terminals, each of the terminals comprising a body housing and a slide housing slidably mounted on the body housing, wherein the sliding/hinge apparatus comprises a first hinge frame mounted in the body housing a second hinge frame disposed on the first hinge frame while the second hinge frame is opposite to the first hinge frame so that the slide housing is rotated about a hinge axis, first and second plates attached to the second hinge frame, the first and second plates being provided with slide bars, respectively, so that the slide housing is slid and first and second slide bars attached to both sides of the first plate such that the second plate is slid between the first and second slide bars. The sliding/hinge apparatus further comprises a guide pin formed at a prescribed position of the first hinge frame such that the guide pin is guided along a guide formed at the second plate.

In accordance with still another aspect of the present invention, there is provided a sliding/hinge apparatus for sliding/rotating type mobile terminals, each of the terminals comprising a body housing and a slide housing slidably mounted on the body housing, wherein the sliding/hinge apparatus comprises a first hinge frame mounted in the body housing, a second hinge frame disposed on the first hinge frame while the second hinge frame is opposite to the first hinge frame so that the slide housing can be rotated about a hinge axis and first and second plates attached to the second hinge frame such that the slide housing can be slid. The sliding/hinge apparatus further comprises a guide unit formed at both sides of the first and second plates such that the second plate can be slid, and a stopper pin formed at a prescribed position of the upper surface of the body housing such that the first and second plates can be slid and rotated, and the slid and rotated first and second plates can be stopped by means of the stopper pin.

In accordance with another aspect of the present invention, there is provided a sliding/rotating type portable communication apparatus including a first housing and a second housing adapted to slide while facing the first housing, rotate about a predetermined axis, slide in the rotating direction, and rotate again from the final position after the sliding to be folded on the upper surface of the first housing.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
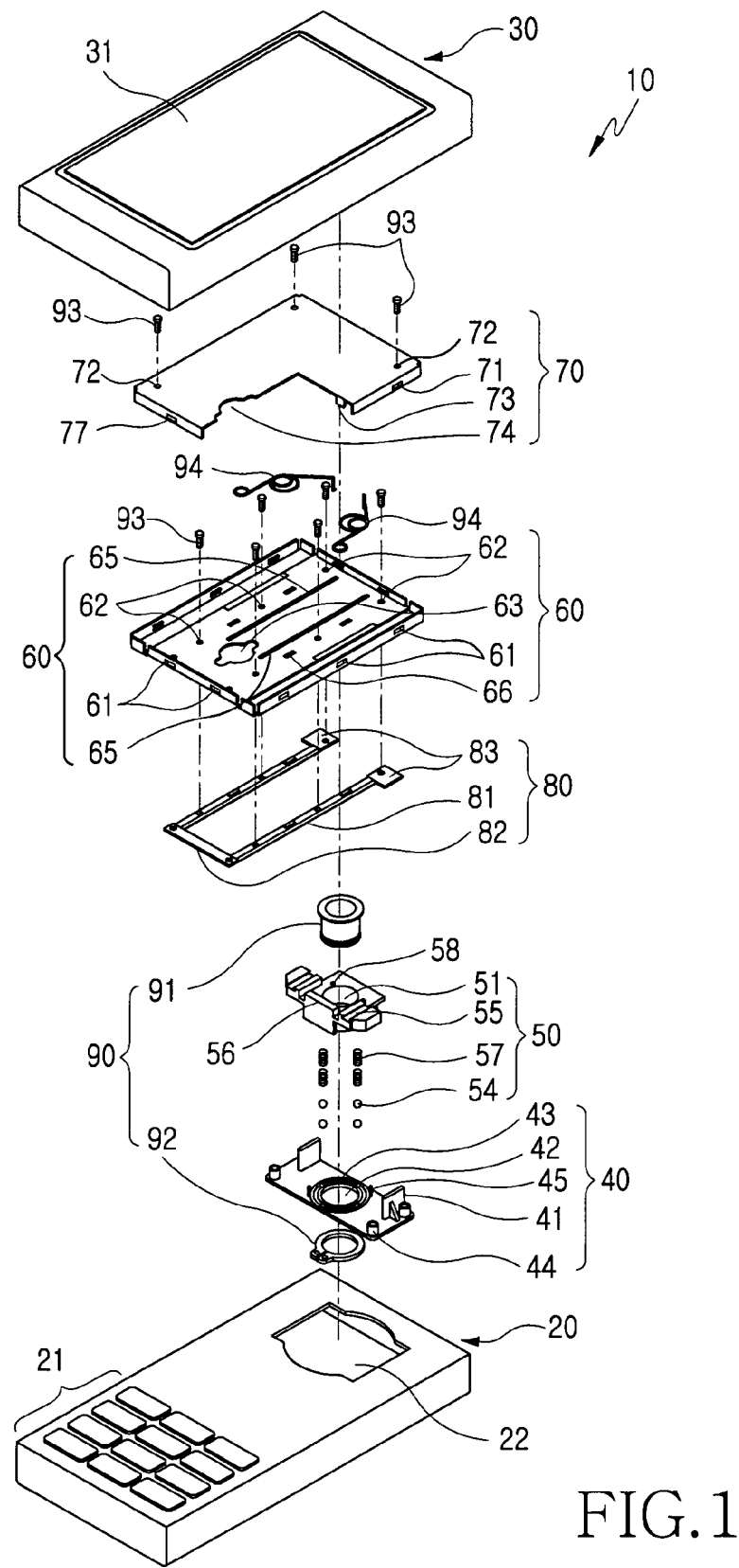
FIG. 1 is an exploded perspective view showing the construction of a sliding/hinge apparatus for sliding/rotating type mobile terminals according to a first preferred embodiment of the present invention.

Now, preferred embodiments of the present invention will be described in detail with reference to the annexed drawings. In the drawings, the same or similar elements are denoted by the same reference numerals even though they are depicted in different drawings.

A description will first be given of a sliding/hinge apparatus 10 for sliding/rotating type mobile terminals according to a first preferred embodiment of the present invention with reference to FIGS. 1 to 14. As shown in FIGS. 1 to 14, the sliding/hinge apparatus 10 comprises first and second hinge frames 40 and 50, first and second plates 60 and 70, one or more slide bars 80 and a coupling unit 90.

The first hinge frame 40 is mounted in a body housing 20 of the sliding/rotating type mobile terminal in such a manner that the first hinge frame 40 is rotatably attached to the second hinge frame 50. The first hinge frame 40 is securely fixed to the body housing 20 by means of screws 93. The second hinge frame 50 is attached to the first hinge frame 40 while the second hinge frame 50 is opposite to the first hinge frame 40 so that a slide housing 30 of the sliding/rotating type mobile terminal is slid and rotated about a hinge axis A1 (see FIG. 12). The first plate 60 is slidably attached to the second hinge frame 50. The second plate 70 is attached to the first plate 60 in such a manner that the second plate 70 is fixed to the slide housing 30 by means of screws 93.

The slide bars 80 are disposed between the second hinge frame 50 and the first plate 60 such that the slide housing 30 is slidably supported by means of the slide bars 80 The slide bars 80 are fixed to the first plate 60 by means of screws.

The coupling unit 90 is inserted through the center parts of the first and second hinge frames 40 and 50 so that the first and second hinge frames 40 and 50 are rotatably coupled with each other while being opposite to each other. The coupling unit 90 comprises a bush 91 and a snap ring 92. Specifically, the bush 91 is inserted through the center parts of the first and second hinge frames 40 and 50 so that the first and second hinge frames 40 and 50 are rotatably coupled with each other while being opposite to each other. The snap ring 92 is connected to the lower end of the bush 91 while being inserted through the first and second hinge frames 40 and 50. The first hinge frame 40 (FIG. 2) comprises a pair of stoppers 41, a first hinge frame side through-hole 42, ball grooves 43, a pair of rotary stoppers 45, one or more screw engaging parts 44 and a ball guide groove 46. The stoppers 41 are provided at the upper ends of the first hinge frame 40 such that clearance of the second hinge frame 50 due to rotation of the second hinge frame 50 is adjusted by means of the stoppers 41. The first hinge frame side through-hole 42 is formed through the center part of the first hinge frame 40 so that the bush 91 is inserted through the first hinge frame side through-hole 42. The ball grooves 43 are formed around the through-hole 42 while being spaced uniformly apart from each other in the circumferential direction so that a plurality of balls 54 are securely located in the ball grooves 43, respectively.

The ball guide groove 46 is formed such that the ball grooves 43 are connected to each other by means of the ball guide groove 46. The balls 54 are guided along the ball guide groove 46. The rotary stoppers 45 are formed at prescribed positions around the ball guide groove 46. The rotary stoppers 45 contact the second hinge frame 50 so that the rotation of the slide housing 30 is stopped. The screw engaging parts 44 are formed on the first hinge frame 40 so that the screw engaging parts 44 are attached to the inside of the body housing 20 by means of the screws 93 under the condition that the first and second hinge frames 40 and 50 are coupled with each other while being opposite to each other. The rotary stoppers 45 are arranged in such a manner that the stoppers 45 are diagonally opposite to each other.

The second hinge frame 50 (FIG. 2) comprises a second hinge frame side through-hole 51, a cylinder 52, one or more spring holes 53, one or more balls 54, a pair of guide grooves 55 and a stopper protrusion 56. The second hinge frame side through-hole 51 is formed through the center part of the second hinge frame 50 so that the bush 91 is inserted through the second hinge frame side through-hole 51. The cylinder 52 is formed around the through-hole 51 while being extended downward in the direction of the hinge axis A1 such that the cylinder 52 is opposite to the ball grooves 43 of the first hinge frame 40. The spring holes 53 (FIG. 6) are formed while being spaced uniformly apart from each other in the circumferential direction such that the balls 54 and compression springs 57 are mounted in the corresponding spring holes 53.

The balls 54 are safely placed in the spring holes 53, respectively, such that the balls 54 emerge from the lower ends of the spring holes 53, respectively, by means of an elastic force from the compression springs 57. The balls 54 are mounted in the corresponding spring holes 53 in such a manner that the balls 54 are engaged in the ball grooves 43 of the first hinge frame 40, respectively.

Figure 4:
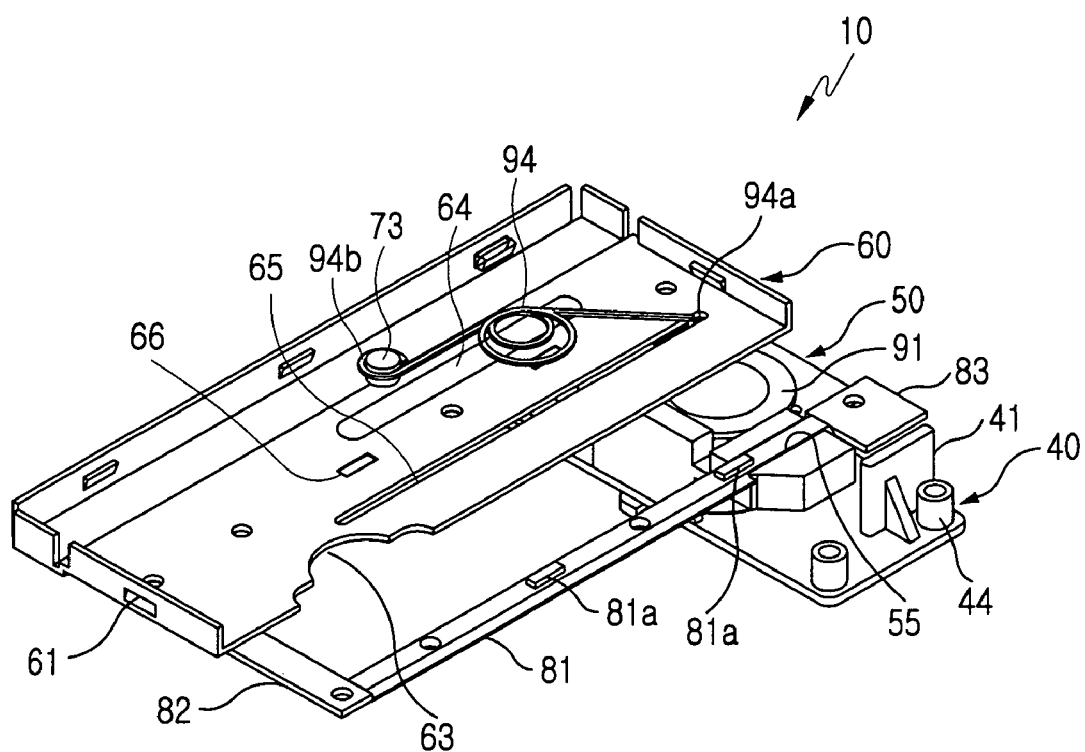
FIG. 4 is a cutaway perspective view showing the interior of the sliding/hinge apparatus for sliding/rotating type mobile terminals shown in FIG. 3.
Figure 5:
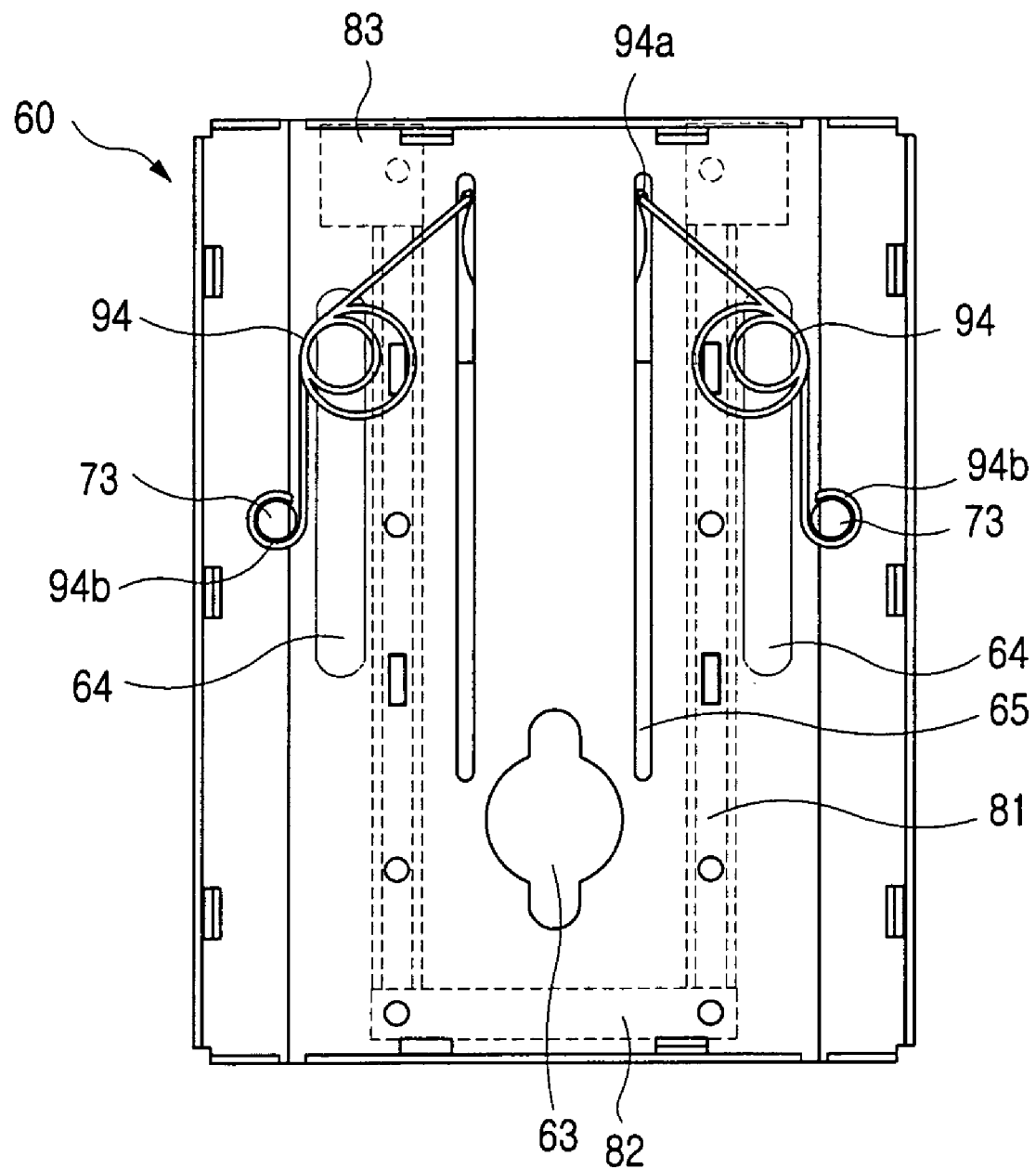
FIG. 5 is a plan view showing the interior of the sliding/hinge apparatus for sliding/rotating type mobile terminals shown in FIG. 3.

The guide grooves 55 are formed at the upper ends of the second hinge frame 50 such that the guide grooves 55 are slidably attached to the first slide bar 81 (FIG. 4). The stopper protrusion 56 is formed at one side of the upper part of the second hinge frame 50. The stopper protrusion 56 contacts the second slide bar 82 so that the sliding movement of the slide bars 80 is stopped. The first plate 60 (FIGS. 1, 5, 6 and 8-10) comprises a plurality of coupling holes 61, one or more screw holes 62, a first plate side through-hole 63, supporting protrusions 64, and a pair of guide holes 65. The plurality of coupling holes 61 are formed around the first plate 60 such that coupling protrusions 77 formed at the second plate 70 are fixedly engaged in the coupling holes 61, respectively. The screw holes 62 are formed at prescribed positions of the first plate 60 such that the slide bars 80 are fixed by means of the screws 93.

The first plate side through-hole 63 is formed at a prescribed position of the first plate 60 such that a flexible circuit (not shown) electrically connected to the slide housing 30 can be inserted through the first plate side through-hole 63. The supporting protrusions 64 are formed in the longitudinal direction of the first plate 60 such that the slide bars 80 are supported by means of the supporting protrusions 64, respectively.

The guide holes 65 are formed in the longitudinal direction of the first plate 60 such that ring springs 94, which will be described in greater detail below, are guided by means of the guide holes 65. The first plate 60 is provided with a plurality of fixing holes 66, which are formed in the longitudinal direction of the first plate 60 such that protrusions formed at the slide bars 80 are fixedly engaged in the fixing holes 66, respectively. The second plate 70 (FIGS. 1, 13 and 14) comprises: a plurality of coupling protrusions 77, one or more screw holes 72, a pair of pins 73, and a second plate side through-hole 74. The coupling protrusions 77 are formed around the second plate 70 such that the coupling protrusions 77 are fixedly engaged in the coupling holes 61 of the first plate 60, respectively. A plurality of screws 93 are engaged in the screw holes 72, respectively, so that the second plate 70 is fixed to the sliding housing 30. The pins 73 are formed at prescribed positions of the second plate 70 such that the pins 73 are connected to ring springs 94, which will be described in greater detail below, respectively.

The second plate side through-hole 74 is formed at a prescribed position of the second plate 70 such that a flexible circuit (not shown) electrically connected to the slide housing 30 can be inserted through the second plate side through-hole 74. Between the first and second plates 60 and 70 are disposed a pair of ring springs 94 for providing an elastic force, by which the slide housing 30 is semi-automatically slid.

One end 94a of each of the ring springs 94 is inserted through the corresponding guide hole 65 formed at the first plate 60 (FIG. 4) such that the end 94a is engaged in a supporting groove 58 formed at the upper end of the second hinge frame 50. Consequently, the end 94a of each of the ring springs 94 is moved along the guide hole 65 when the slide housing 30 is slid. The other end 94b of each of the ring springs 94 is connected to the corresponding pin 73 formed at the second plate 70, by which each of the ring springs 94 is supported. The slide bar 80 (FIG. 1) comprises first slide bars 81, a second slide bar 82, and third slide bars 83.

The first slide bars 81 are formed in the longitudinal directions of the first and second plates 60 and 70 such that the first slide bars 81 are slid while being engaged in the guide grooves 55 formed at the second hinge frame 50. The second slide bar 82 is connected to one end of each of the first slide bars 81 such that the first slide bars 81 are supported by means of the second slide bar 82 and the second slide bar 82 contacts the stopper protrusion 56 of the second hinge frame 50, by which the sliding movement of the slide bar 80 is stopped. The third slide bars 83 is connected to the other end of each of the first slide bars 81 such that the first slide bars 81 are supported by means of the third slide bars 83, respectively.

The operation of the sliding/hinge apparatus for sliding/rotating type mobile terminals with the above-described construction according to the first preferred embodiment of the present invention will now be described in greater detail below with reference to FIGS. 1 to 14. As shown in FIGS. 1 to 14, the sliding type mobile terminal includes a body housing 20, having a keypad 21 comprising a plurality of keys disposed thereon, and a slide housing 30, having a liquid crystal display unit 31 disposed thereon. At a prescribed position of the upper part of the body housing 20 is formed a mounting hole 22, in which the first and second hinge frames 40 and 50 are mounted, as shown in FIG. 1.

Figure 6:
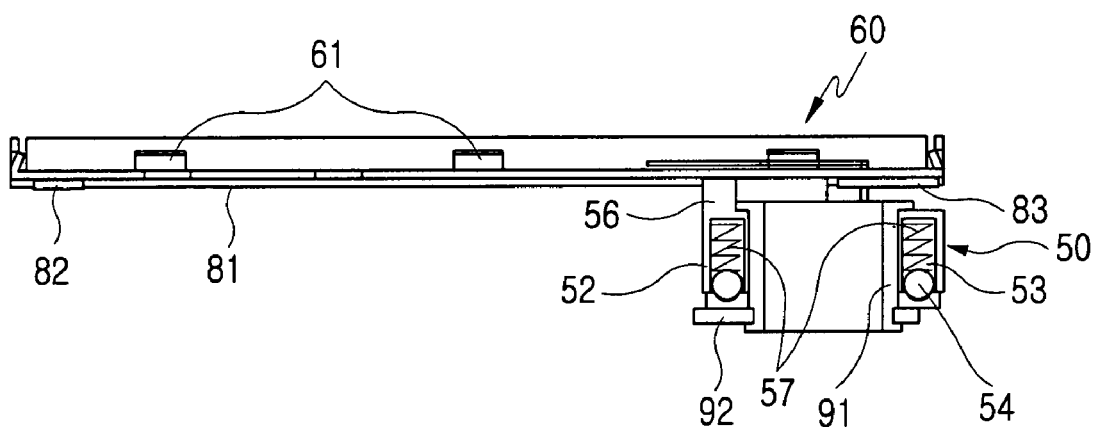
FIG. 6 is a cutaway side cross-sectional view showing the interior of the sliding/hinge apparatus for sliding/rotating type mobile terminals shown in FIG. 3.

The first hinge frame 40 of the sliding/hinge apparatus 10 of the sliding/rotating type mobile terminal is fixed to the body housing 20 by means of screws. On the upper part of the first hinge frame 40 is disposed the second hinge frame 50 while the second hinge frame 50 is opposite to the first hinge frame 40 in such a manner that the slide housing 30 is slid and rotated about the hinge axis A1. Through the center parts of the first and second hinge frames 40 and 50 are inserted the bush 91, by which the first and second hinge frame 40 and 50 are rotatably connected to each other while being opposite to each other, as shown in FIGS. 4 and 6. The snap ring is fitted 92 in a fitting groove formed at the lower end of the bush 91. Through the center parts of the first and second hinge frames 40 and 50 are formed the first and second hinge frame side through-holes 42 and 51, through which the bush 91 is inserted.

Figure 3:
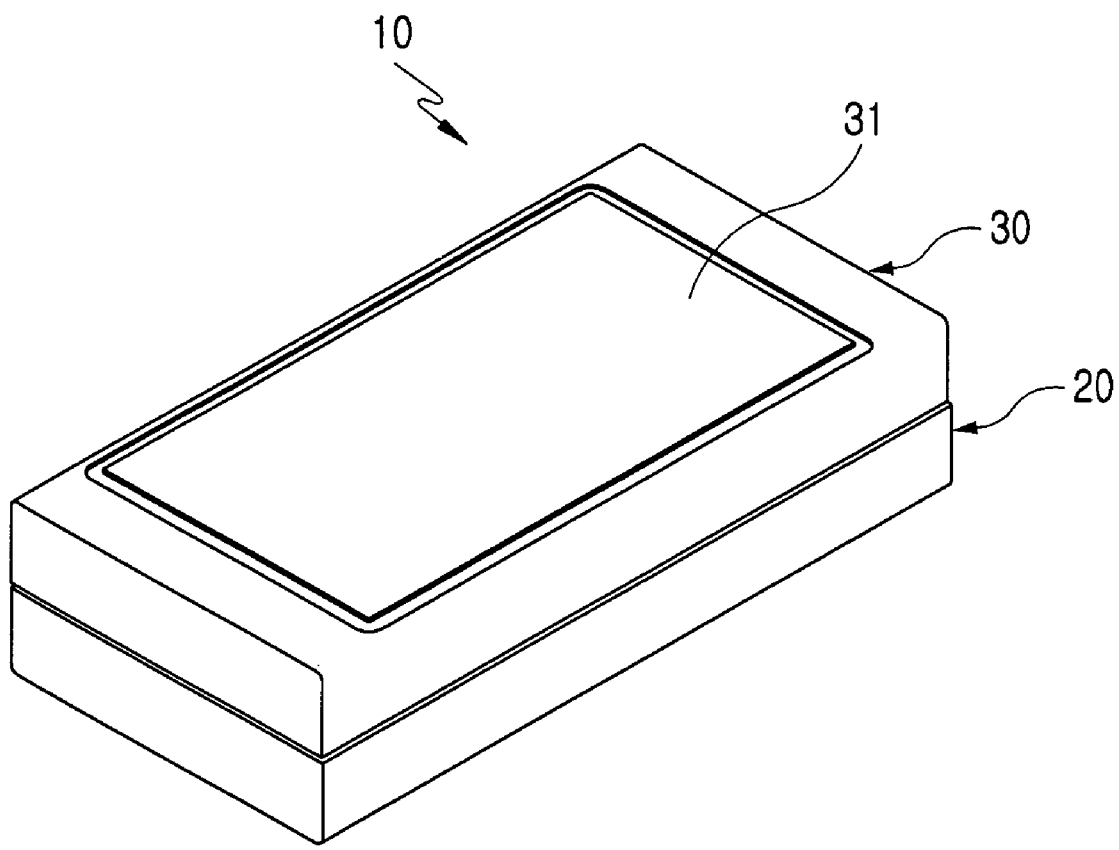
FIG. 3 is an assembled perspective view showing the sliding/hinge apparatus for sliding/rotating type mobile terminals according to the first preferred embodiment of the present invention in FIG. 1.

At the upper ends of the first hinge frame 40 are formed a pair of stoppers 41 for controlling clearance of the second hinge frame 50 due to the rotation thereof (FIG. 4). To the upper part of the second hinge frame 50 is attached the first plate 60 in such a manner that the slide housing 30 is slid, as shown in FIGS. 3 and 4.

Figure 7:
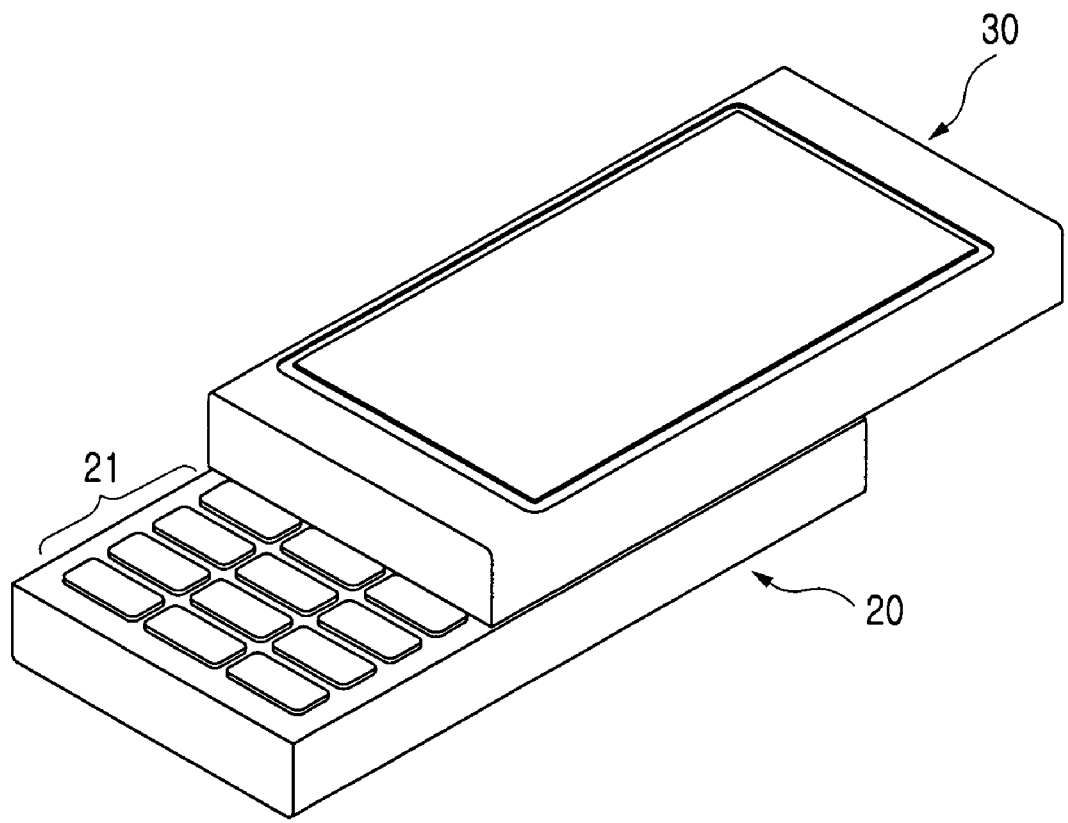
FIG. 7 is a perspective view of the sliding/hinge apparatus for sliding/rotating type mobile terminals according to the first preferred embodiment of the present invention in FIG. 1 showing a slide housing of the sliding/hinge apparatus slid open.
Figure 8:
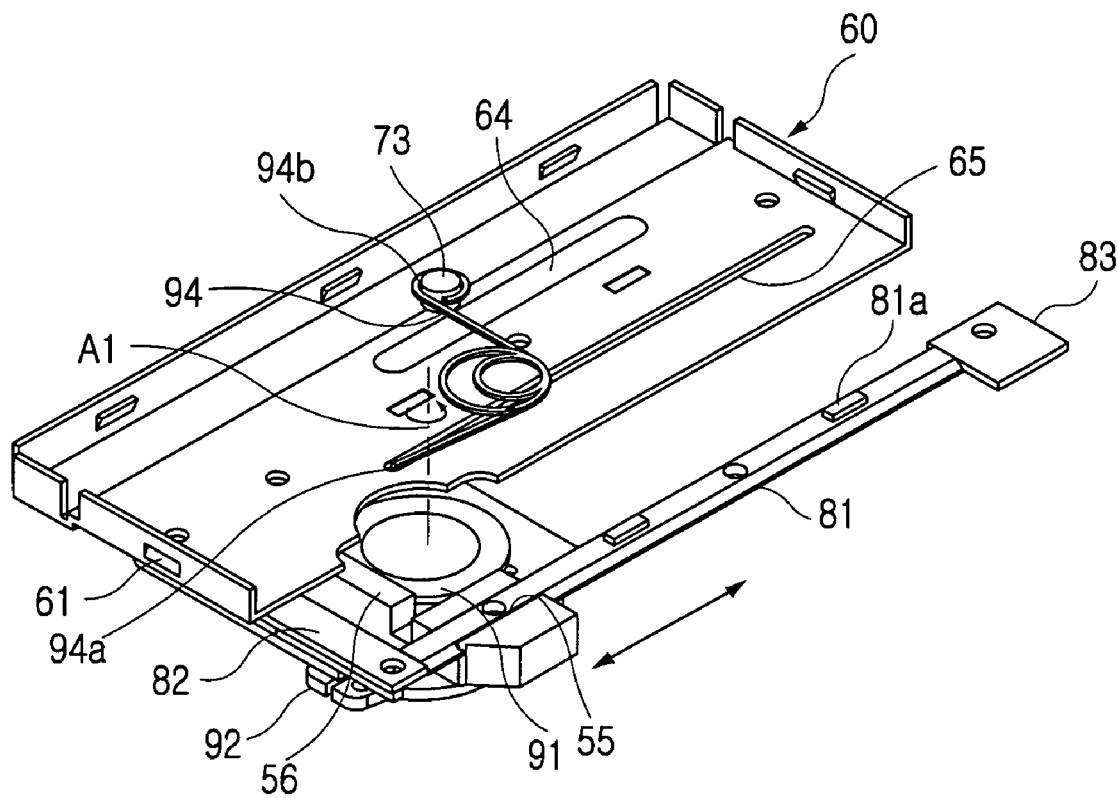
FIG. 8 is a cutaway perspective view showing the interior of the sliding/hinge apparatus for sliding/rotating type mobile terminals shown in FIG. 7.

When the slide housing 30 is slid from the body housing 20 in the longitudinal direction thereof as shown in FIGS. 7 and 8, the first slide bars 81 are slid along the guide grooves 55, respectively, since the pair of first slide bars 81, which are engaged in the pair of guide grooves 55 formed at the upper part of the second hinge frame 50, are disposed between the second hinge frame 50 and the first plate 60.

Figure 10:
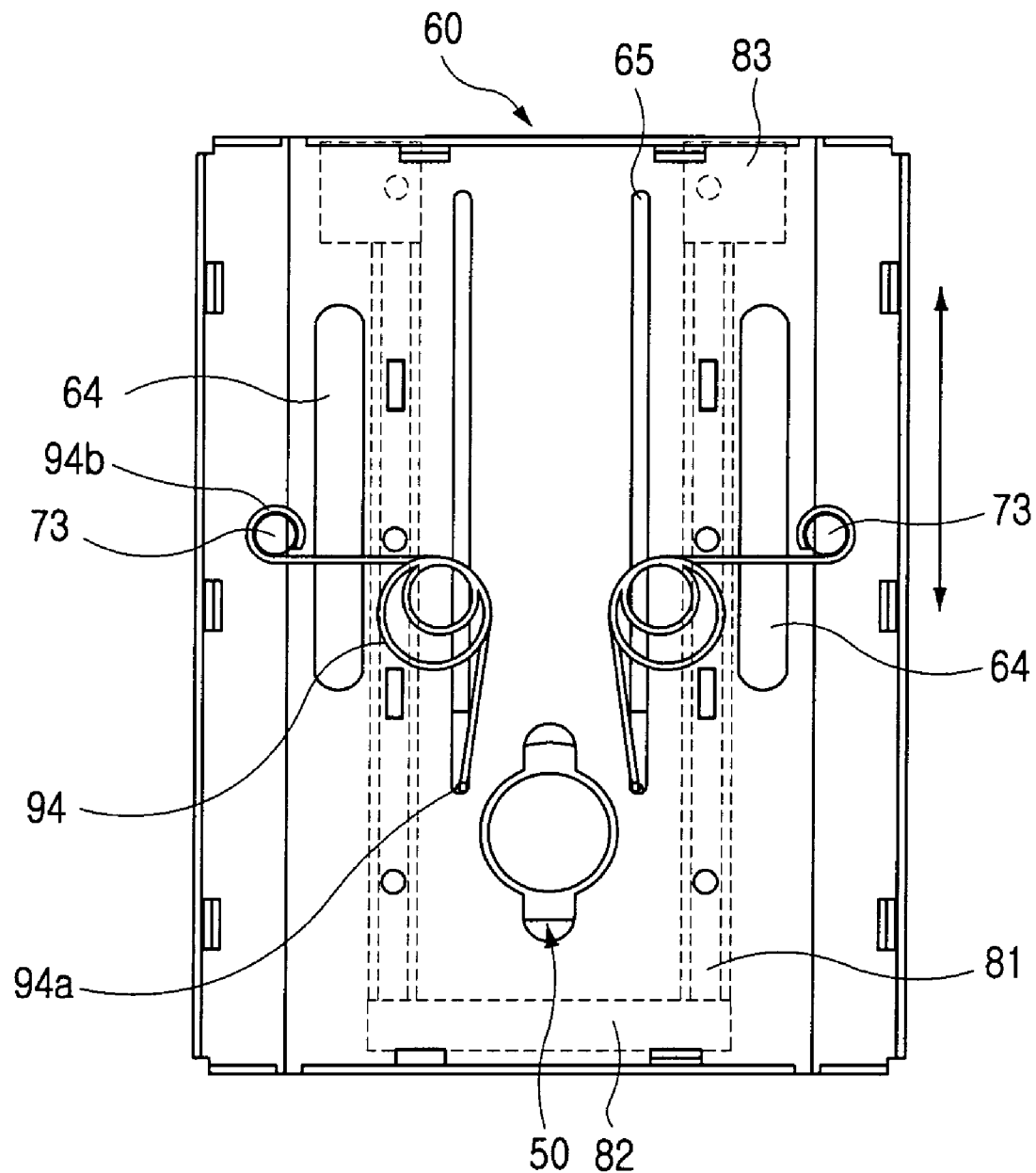
FIG. 10 is a plan view showing the interior of the sliding/hinge apparatus for sliding/rotating type mobile terminals shown in FIG. 7.

As shown in FIG. 10, the pair of ring springs 94 that are capable of providing an elastic force, by which the slide housing 30 is semi-automatically slid, are mounted in the first and second plates 60 and 70. Consequently, the slide housing 30 is semi-automatically slid by means of the elastic force of the ring springs 94.

Figure 9:
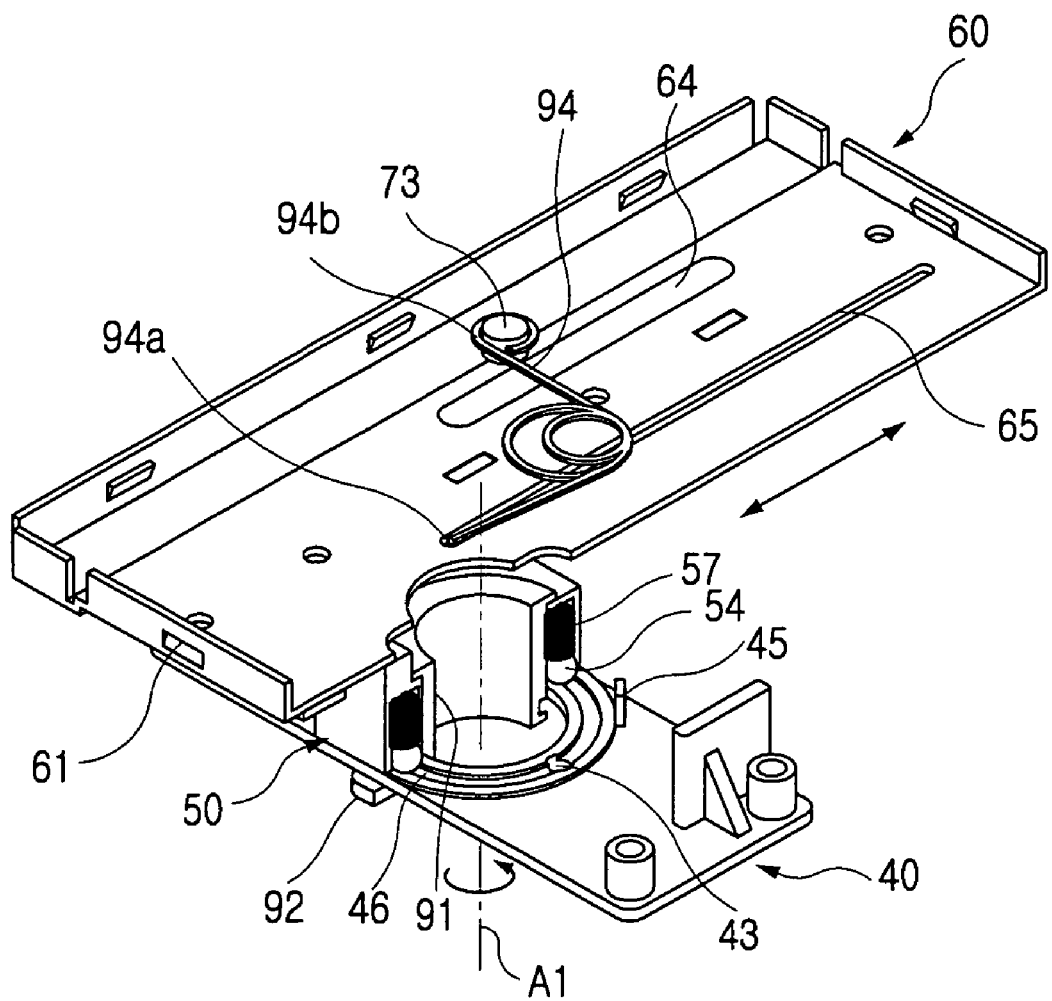
FIG. 9 is a cutaway perspective view showing a hinge frame of the sliding/hinge apparatus for sliding/rotating type mobile terminals shown in FIG. 7.

As shown in FIG. 9, one end 94a of each of the ring springs 94 is inserted through the corresponding guide hole 65 of the first plate 60 so that the end 94a is engaged in the supporting groove 58 formed at the upper part of the second hinge frame 50, and the other end 94b of each of the ring springs 94 is connected to the corresponding pin 73 formed at the second plate 70, so that the ring springs 94 semi-automatically provide the elastic force.

Figure 11:
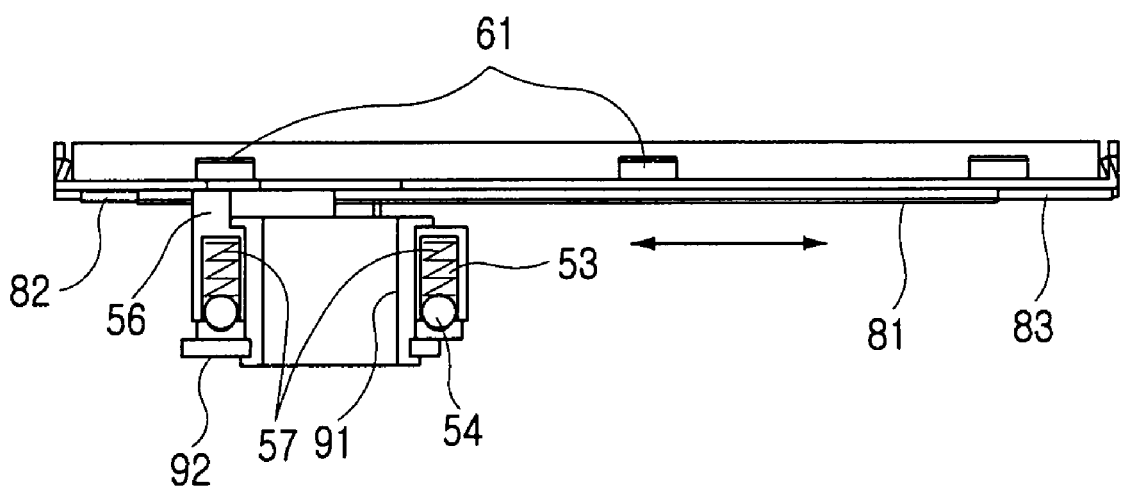
FIG. 11 is a cutaway side cross-sectional view showing the interior of the sliding/hinge apparatus for sliding/rotating type mobile terminals shown in FIG. 7.

As shown in FIG. 10, the first slide bars 81 are formed in the longitudinal direction of the plates, and the first slide bars 81 are connected to each other at one end of each thereof by means of the second slide bar 82. The first slide bars 81 are provided at the other end of each thereof with the third slide bars 83, respectively. As shown in FIG. 11, the second hinge frame 50 is provided at one side of the upper part thereof with the stopper protrusion 56, by which the movement of the slide bar is stopped.

Figure 12:
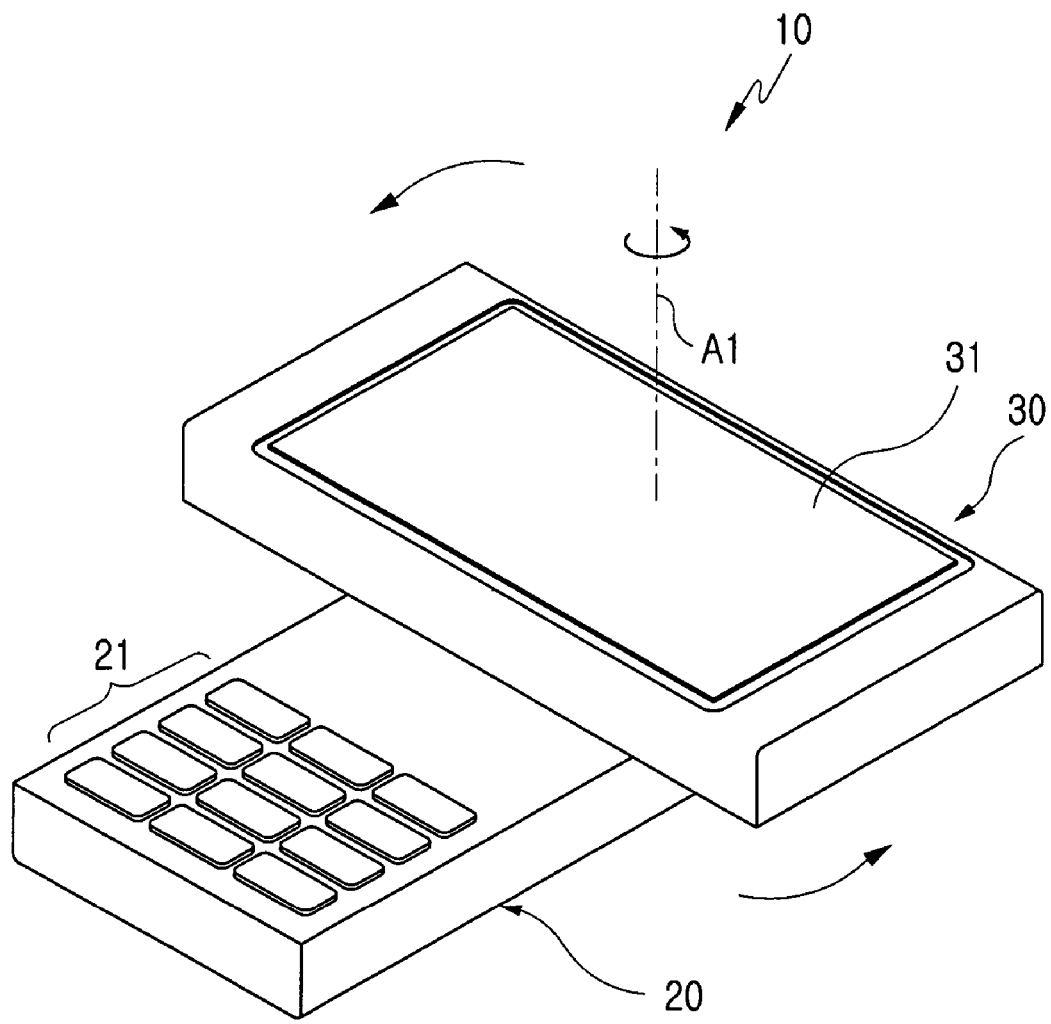
FIG. 12 is a perspective view of the sliding/hinge apparatus for sliding/rotating type mobile terminals according to the first preferred embodiment of the present invention in FIG. 1 showing the slide housing of the sliding/hinge apparatus rotated.

When the slide housing 30 is slid and then rotated as shown in FIG. 12, the slide housing 30 is placed on the body housing 20 in the shape of a "T". One or more ball grooves 43, in which the balls 54 are securely located, are formed around the first hinge frame side through-hole 42 while being spaced uniformly apart from each other in the circumferential direction thereof as shown in FIG. 9. Consequently, the balls 54 are securely located in the ball grooves 43, respectively.

Figure 2:
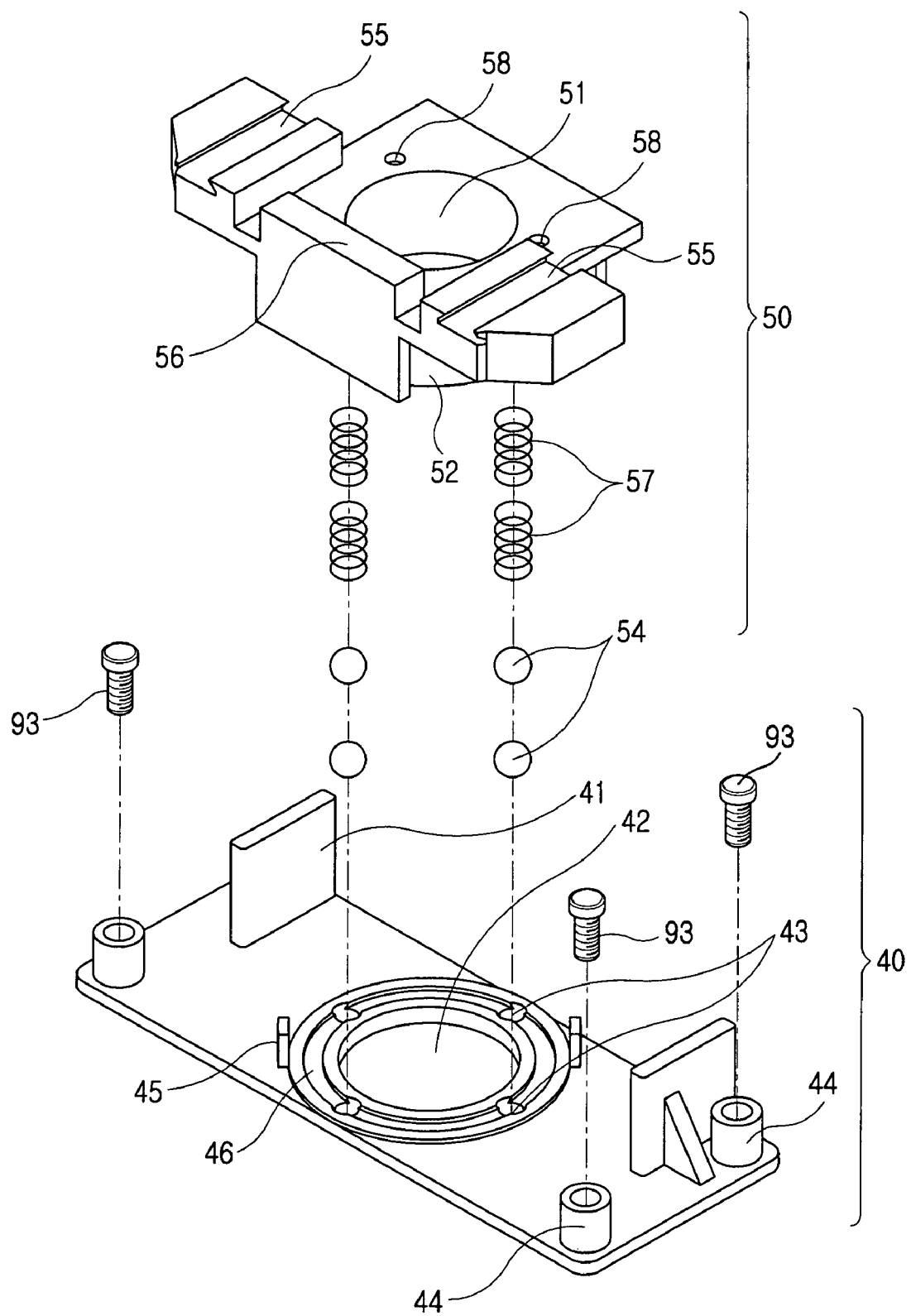
FIG. 2 is an exploded perspective view showing a hinge frame of the sliding/hinge apparatus for sliding/rotating type mobile terminals according to the first preferred embodiment of the present invention in FIG. 1.
Figure 14:
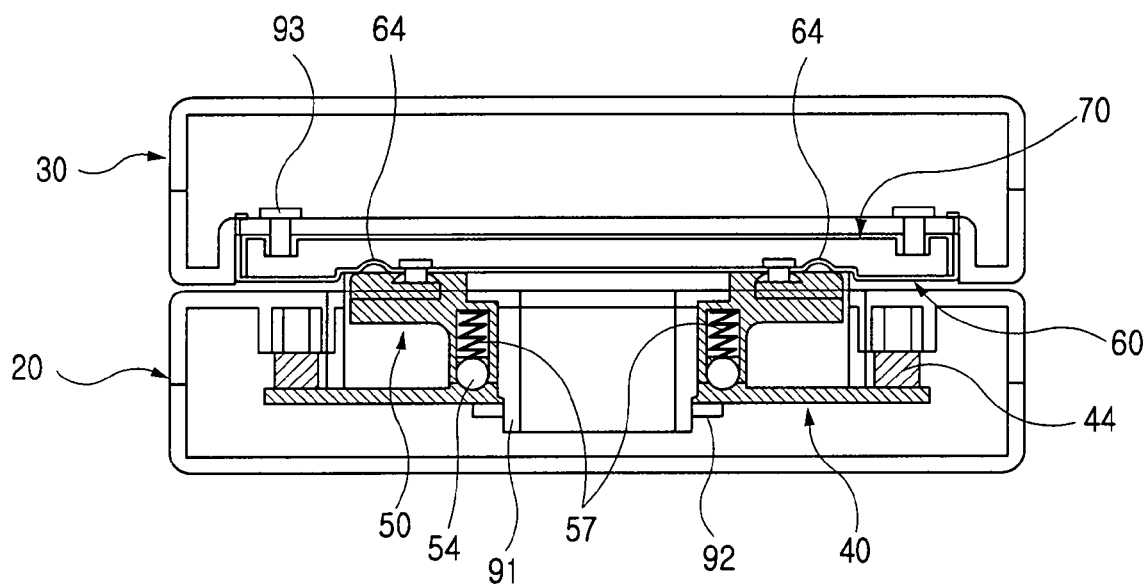
FIG. 14 is a side cross-sectional view showing the construction of the sliding/hinge apparatus for sliding/rotating type mobile terminals according to the first preferred embodiment of the present invention in FIG. 1.

As shown in FIGS. 2 and 14, the cylinder 52 is formed on the second hinge frame 50 in such a manner that it extends downward in the direction of the hinge axis A1. At the lower part of the cylinder 52 are formed one or more spring holes 53, which are arranged around the cylinder 52 while being spaced uniformly apart from each other in the circumferential direction. The compression springs 57 are mounted in the spring holes 53, respectively. To the lower ends of the compression springs 53 are connected the balls 54 which are selectively engaged with and are securely located in the ball grooves 43 of the first hinge frame 40 such that the balls 54 emerge from the lower ends of the spring holes 53, respectively, by means of the elastic force from the compression springs 57.

Figure 13:
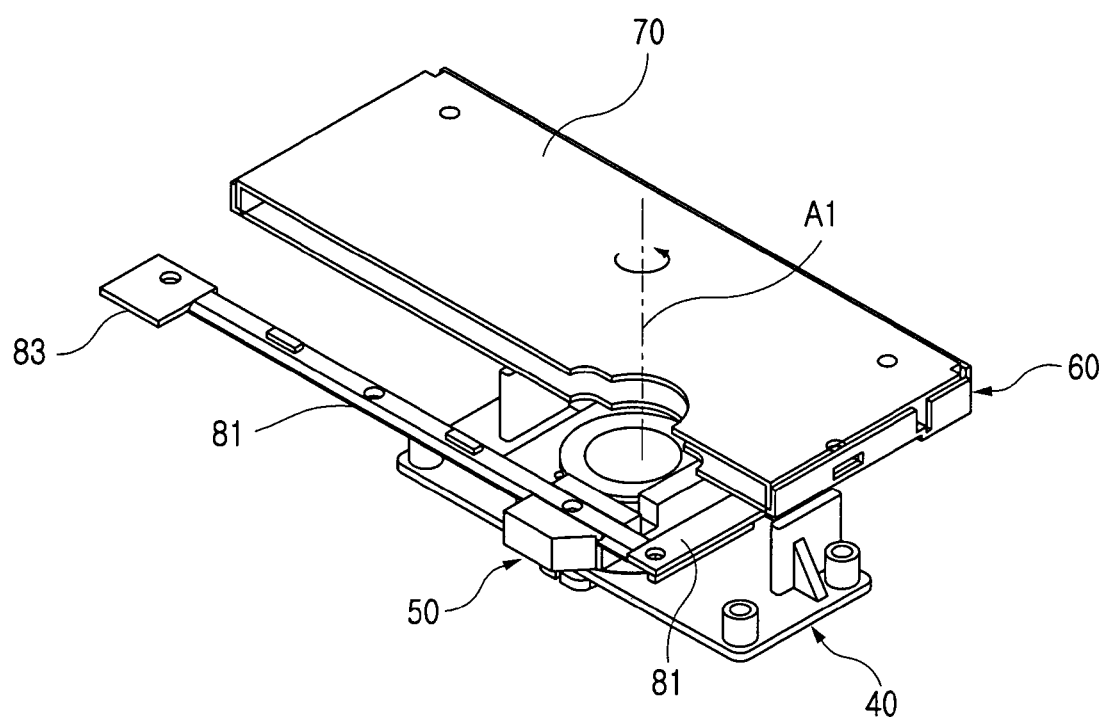
FIG. 13 is a cutaway perspective view showing the interior of the sliding/hinge apparatus for sliding/rotating type mobile terminals shown in FIG. 12.

When the slide housing 30 is rotated as shown in FIG. 13, the balls 54 are separated from the corresponding ball grooves 43, and are then inserted into other different ball grooves 43, respectively. As the slide housing 30 is rotated, the ball guide groove 46 connected to the respective ball grooves 43 is provided for guiding the movement of the balls 54. Consequently, the balls 54 are guided along the ball guide groove 46 when the balls 54 are moved to the ball grooves 43.

At prescribed positions around the ball guide groove 46 are formed the pair of rotary stoppers 45, which contact the second hinge frame 50 for stopping the rotation of the slide housing 30, as shown in FIG. 9. Consequently, the rotary stoppers 45 contact the second hinge frame 50 with the result that the rotation of the slide housing 30 is stopped. The elastic force applied to the balls 54 by means of the compression springs 57 engage the balls 54 into or disengage them from the ball grooves 43.

Figure 15:
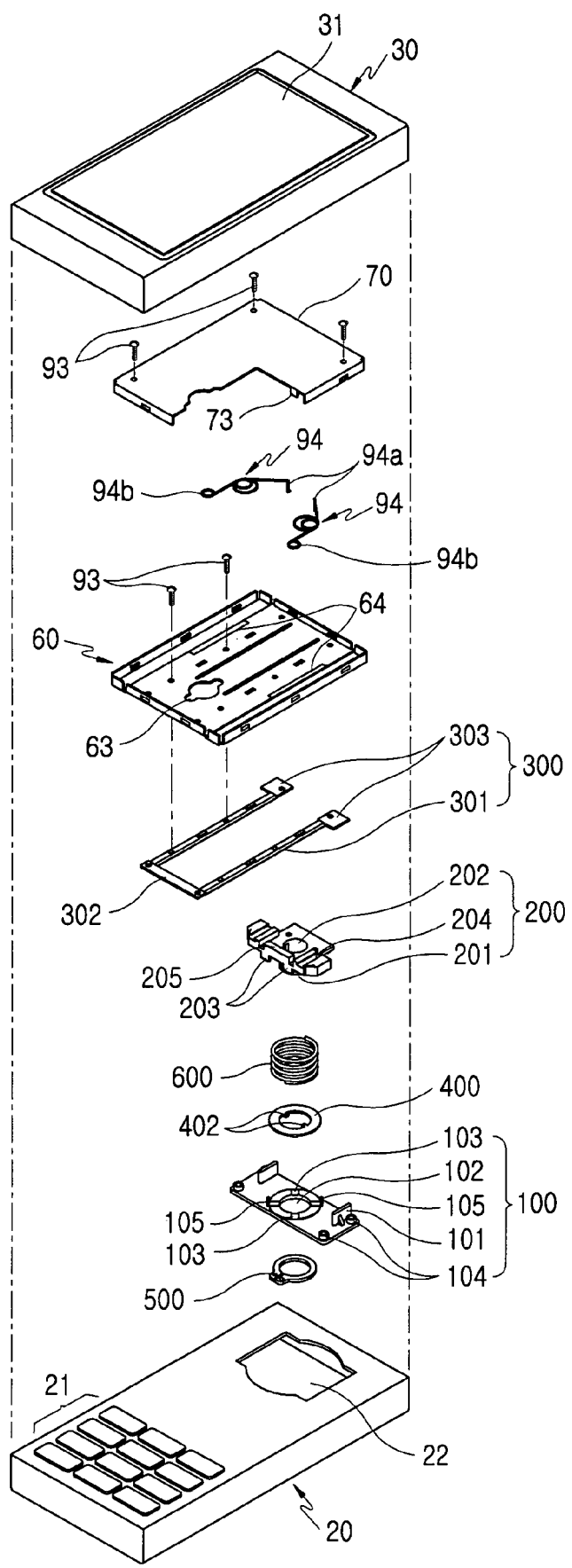
FIG. 15 is an exploded perspective view showing the construction of a sliding/hinge apparatus for sliding/rotating type mobile terminals according to a second preferred embodiment of the present invention.
Figure 16:
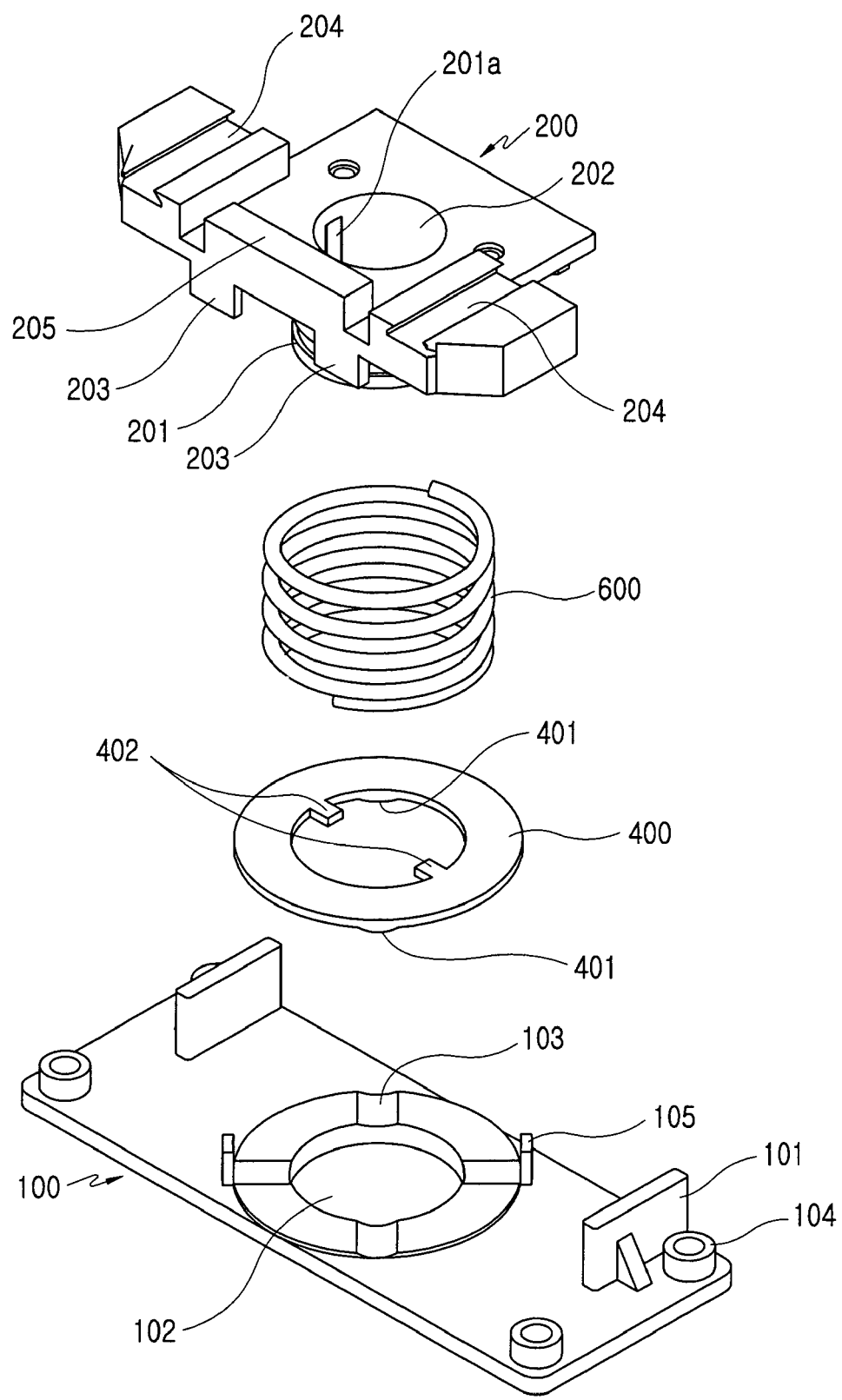
FIG. 16 is an exploded perspective view showing a hinge frame of the sliding/hinge apparatus for sliding/rotating type mobile terminals according to the second preferred embodiment of the present invention in FIG. 15.
Figure 17:
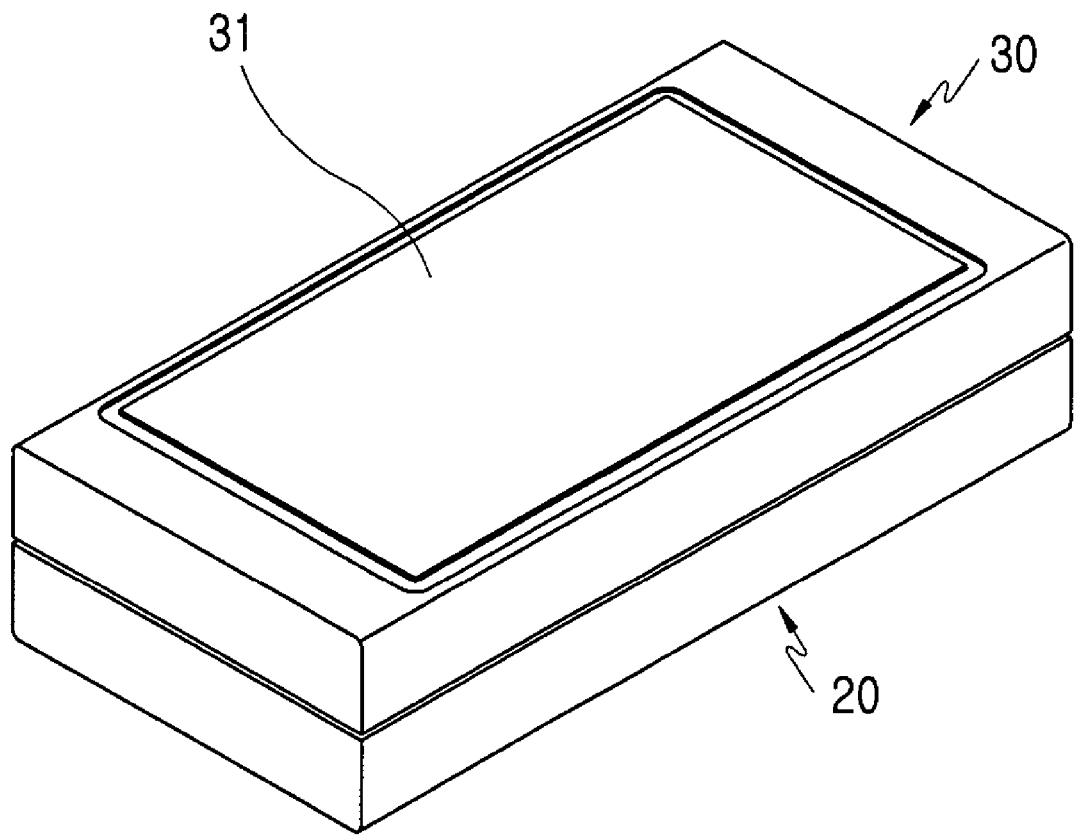
FIG. 17 is an assembled perspective view showing the sliding/hinge apparatus for sliding/rotating type mobile terminals according to the second preferred embodiment of the present invention in FIG. 15.

Operation of a sliding/hinge apparatus for sliding/rotating type mobile terminals according to a second preferred embodiment of the present invention will now be described in detail with reference to FIGS. 15 to 26. As shown in FIG. 15, the sliding type mobile terminal includes a body housing 20, having a keypad 21 comprising a plurality of keys disposed thereon, and a slide housing 30, having a liquid crystal display unit 31 disposed thereon. At a prescribed position of the upper part of the body housing 20 is formed a mounting hole 22, in which first and second hinge frames 40 and 50 are mounted. As shown in FIGS. 15 and 16, a first hinge frame 100 of the sliding/hinge apparatus of the sliding/rotating type mobile terminal is fixed to the body housing 20 by means of screws 93. Through the center part of the first hinge frame 100 is formed a first hinge frame side through-hole 102.

At the upper ends of the first hinge frame 100 are formed one or more screw engaging parts 104 so that the screw engaging parts 104 are attached to the inside of the body housing 20 by means of the screws 93.

Figure 22:
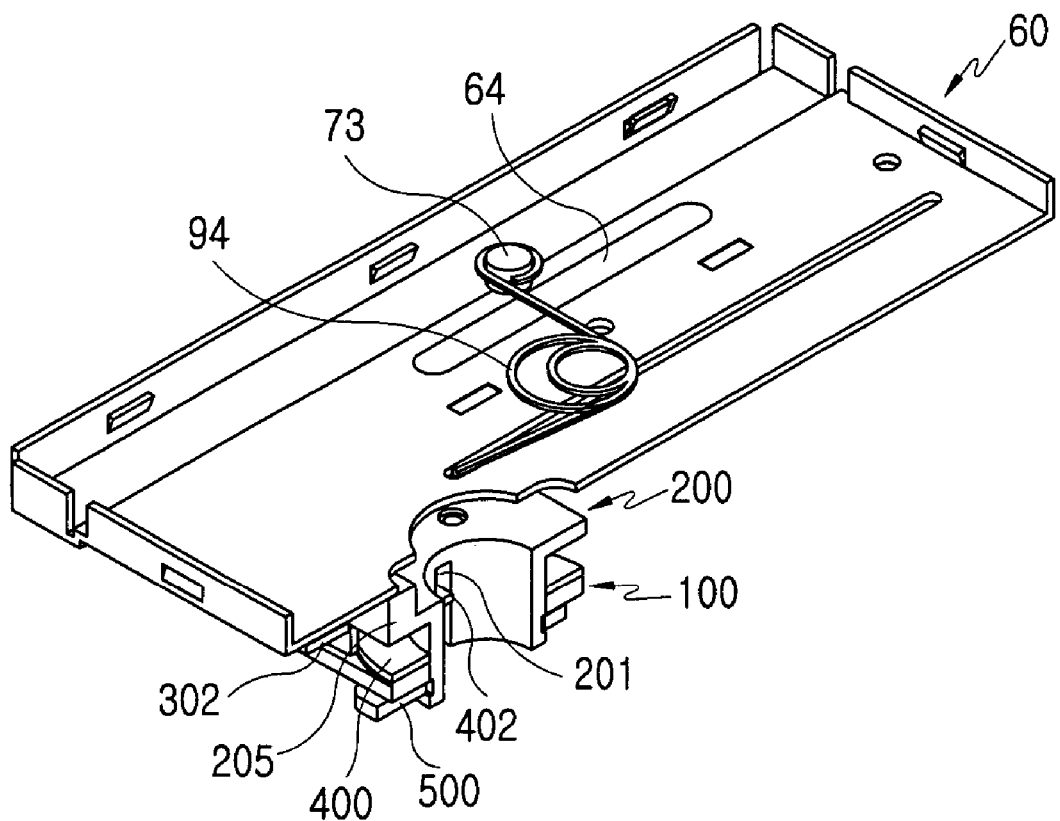
FIG. 22 is a cutaway perspective view showing a hinge frame of the sliding/hinge apparatus for sliding/rotating type mobile terminals shown in FIG. 20.
Figure 23:
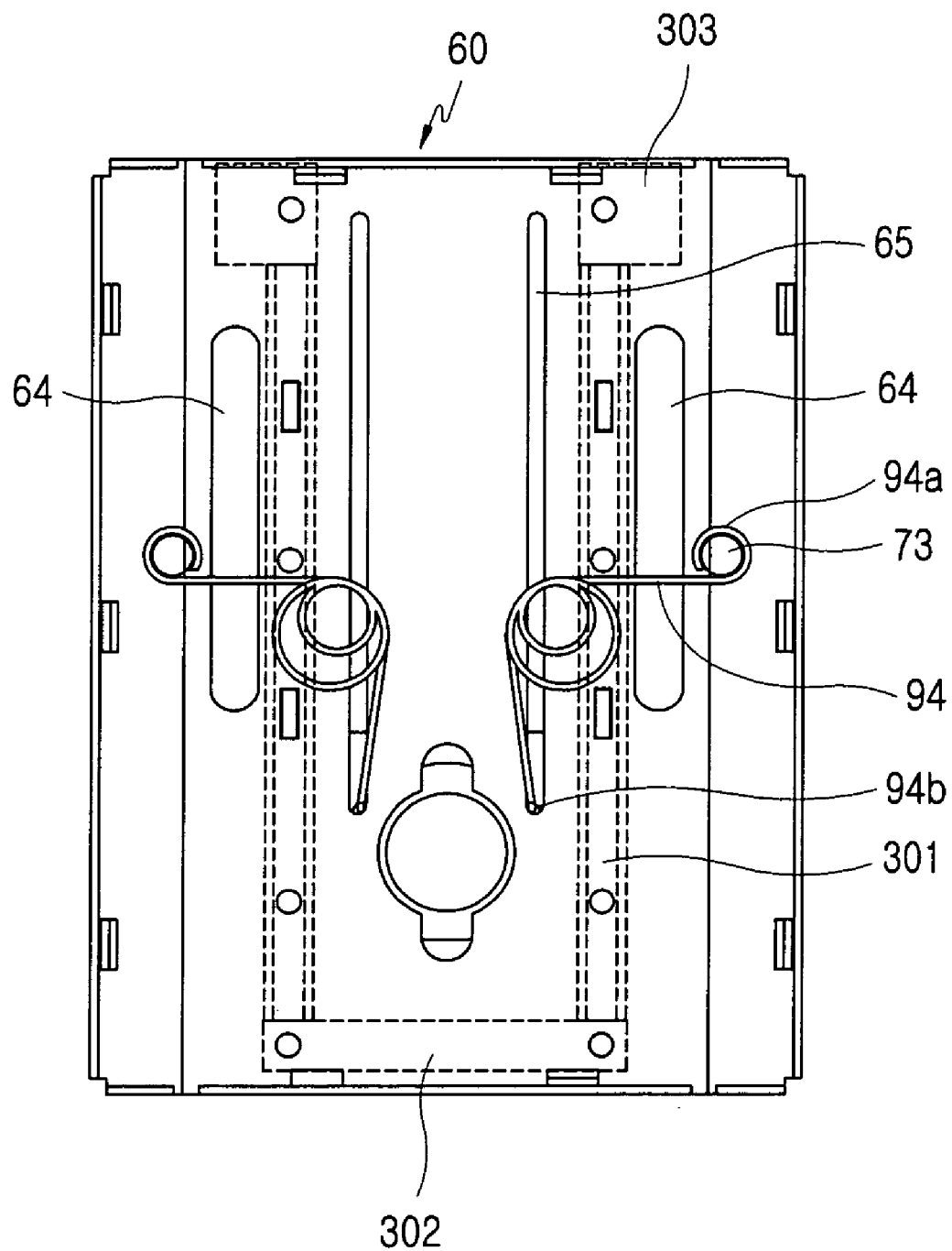
FIG. 23 is a plan view showing the interior of the sliding/hinge apparatus for sliding/rotating type mobile terminals shown in FIG. 20.

At the upper part of the first hinge frame 100 is disposed a second hinge frame 200. The second hinge frame 200 is opposite to the first hinge frame 100 in such a manner that the slide housing 30 can be slid and rotated about a hinge axis A1. At the center part of the second hinge frame 200 is formed a cylindrical hinge housing 201, as shown in FIGS. 16 and 22, which extends downward in the direction of the hinge axis A1 of the hinge frame, so that the first and second hinge frames 100 and 200 are rotatably connected to each other while being opposite to each other. Through the center part of the first hinge frame 100 is formed the first hinge frame side through-hole 102, through which the cylindrical hinge housing 201 is inserted.

Figure 18:
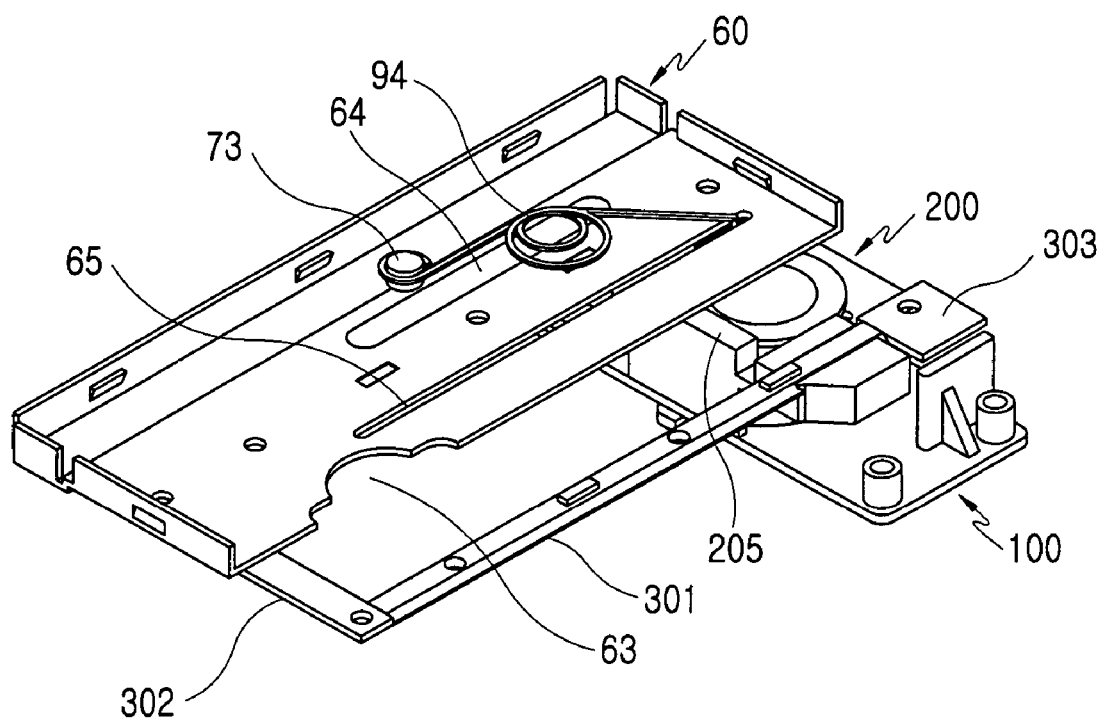
FIG. 18 is a cutaway perspective view showing the interior of the sliding/hinge apparatus for sliding/rotating type mobile terminals shown in FIG. 17.

A snap ring 500 is fitted in a fitting groove formed at the lower end of the cylindrical hinge housing 201, as shown in FIG. 18, so that the first hinge frame 100 is connected to the second hinge frame 200 while the first hinge frame 100 is opposite to the second hinge frame 200.

Figure 19:
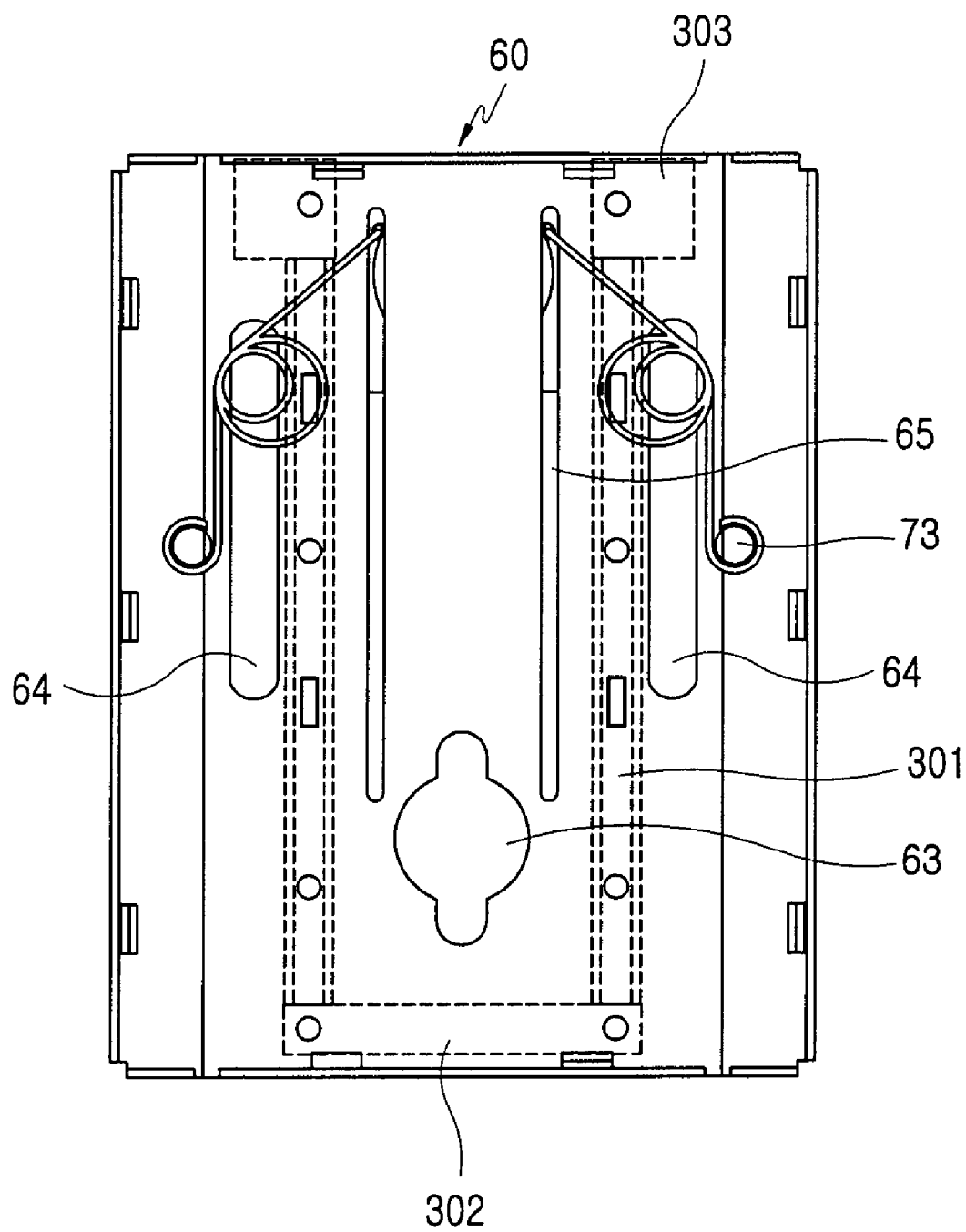
FIG. 19 is a plan view showing the interior of the sliding/hinge apparatus for sliding/rotating type mobile terminals shown in FIG. 17.
Figure 20:
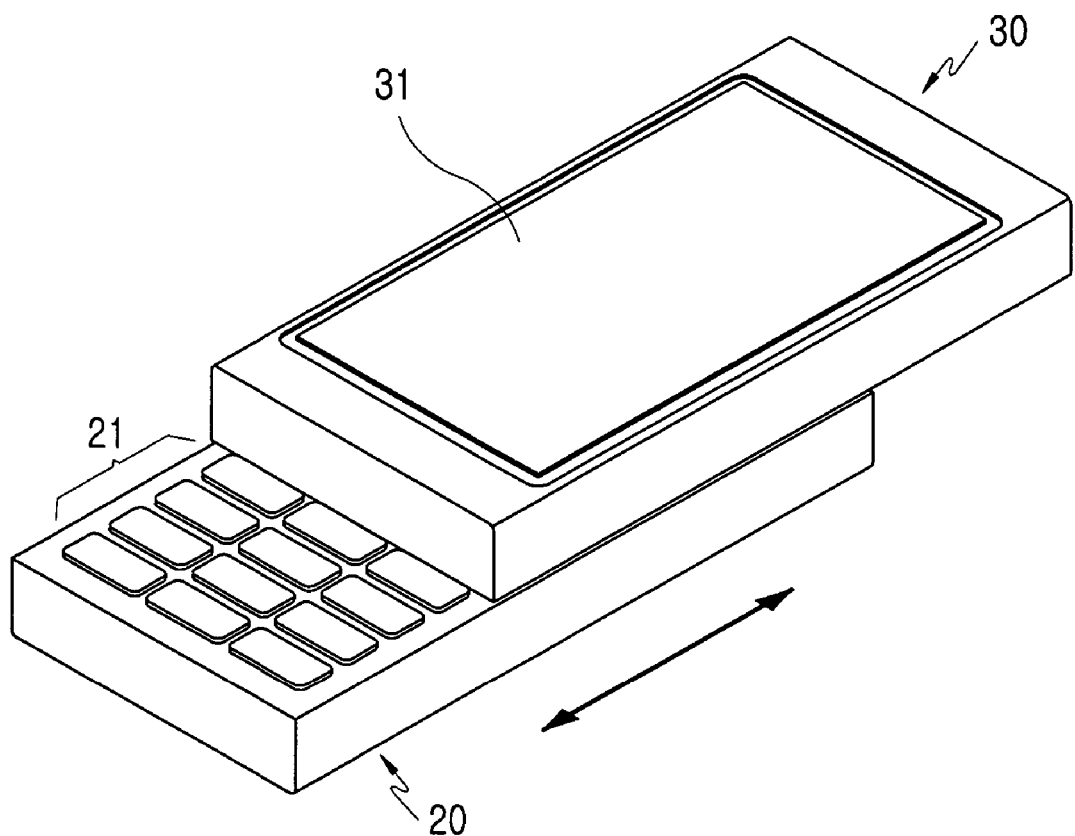
FIG. 20 is a perspective view of the sliding/hinge apparatus for sliding/rotating type mobile terminals according to the second preferred embodiment of the present invention showing a slide housing of the sliding/hinge apparatus slid open.
Figure 21:
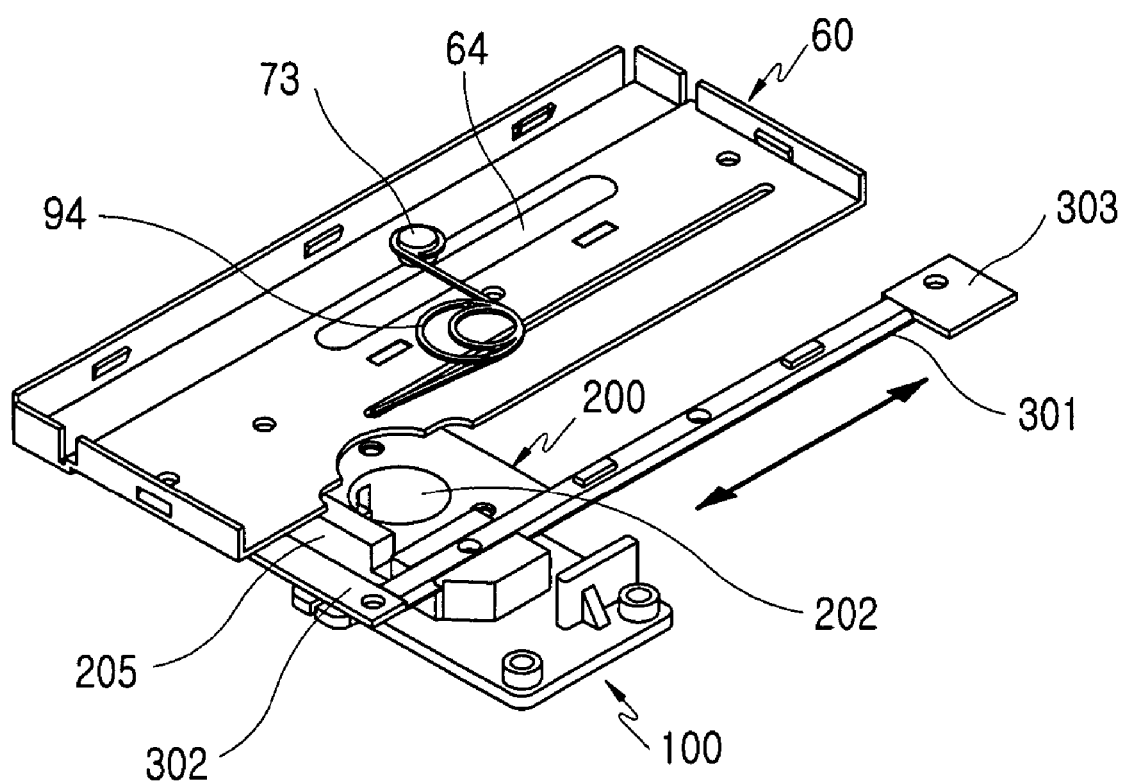
FIG. 21 is a cutaway perspective view showing the interior of the sliding/hinge apparatus for sliding/rotating type mobile terminals shown in FIG. 20.

At the upper ends of the first hinge frame 40 are formed a pair of stoppers 101 for controlling clearance of the second hinge frame 200 due to the rotation thereof. To the upper part of the second hinge frame 200 is attached a first plate 60 in such a manner that the slide housing 30 can be slid, as shown in FIGS. 19 and 21. The first plate 60 is fixed to the slide housing 30 by means of screws 93.

When the slide housing 30 is slid from the body housing 20 in the longitudinal direction thereof, as shown in FIGS. 20 to 23, a pair of first slide bars 301 are slid along a pair of guide grooves 204 formed at the upper part of the second hinge frame 200, respectively, since the first slide bars 301 are engaged in the pair of guide grooves 204 while being disposed between the second hinge frame 200 and the first plate 60.

Figure 24:
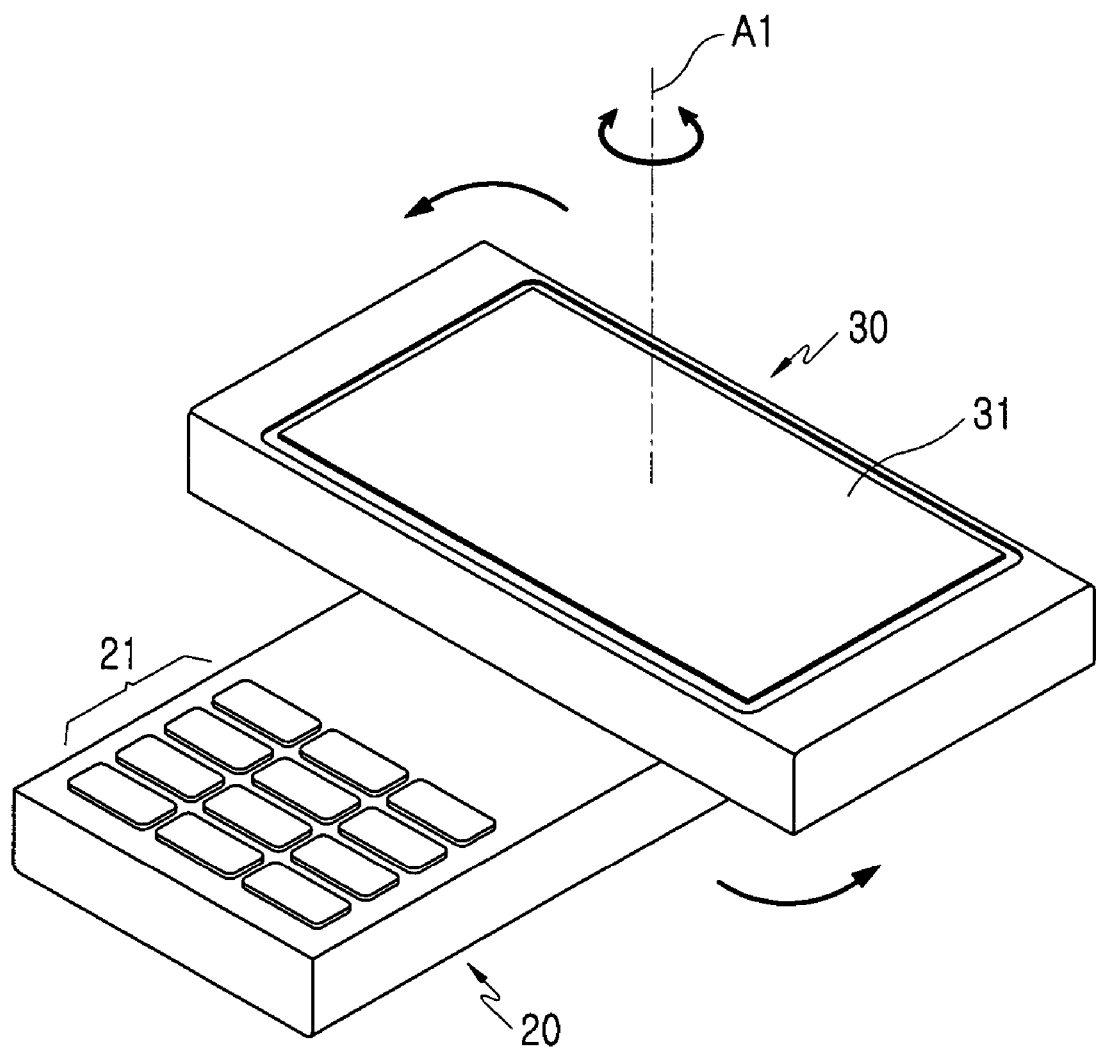
FIG. 24 is a perspective view of the sliding/hinge apparatus for sliding/rotating type mobile terminals according to the second preferred embodiment of the present invention in FIG. 15 showing the slide housing of the sliding/hinge apparatus rotated apart.
Figure 25:
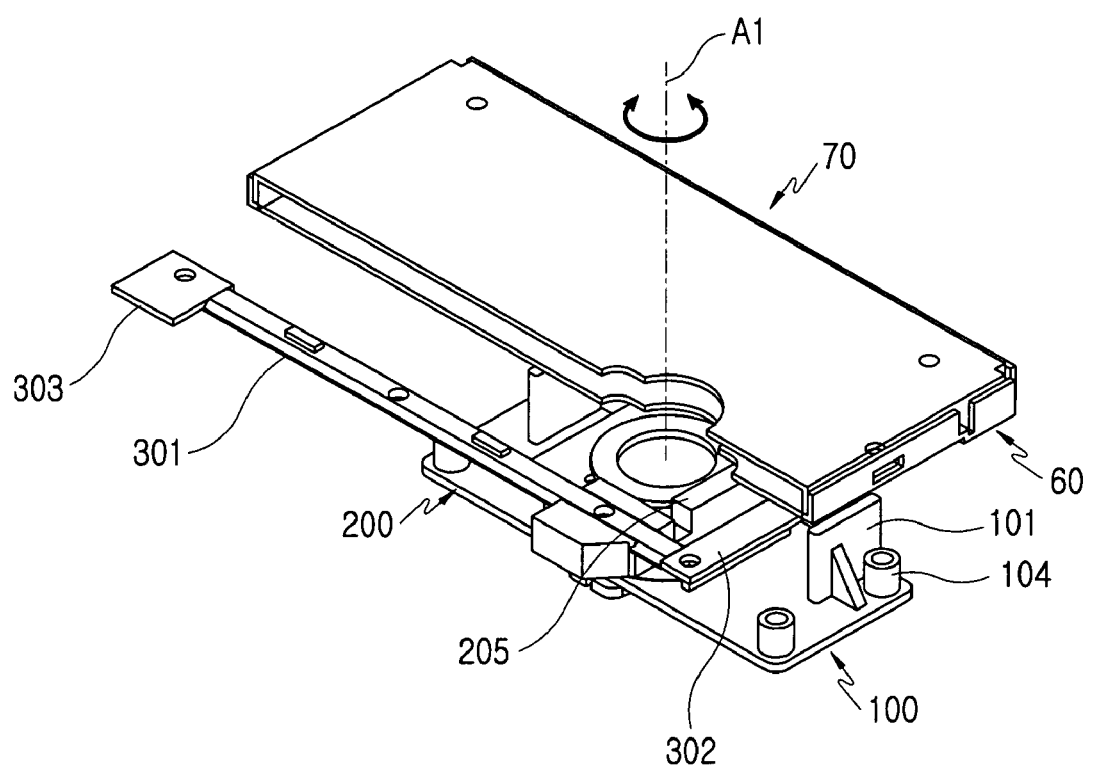
FIG. 25 is a cutaway perspective view showing the interior of the sliding/hinge apparatus for sliding/rotating type mobile terminals shown in FIG. 23.

As shown in FIG. 25, the second hinge frame 200 is provided at one side of the upper part thereof with a stopper protrusion 205, which contacts the second slide bar 302 for stopping the movement of a slide bar 300. When the slide housing 30 is slid and then rotated as shown in FIG. 24, the slide housing 30 is placed on the body housing 20 in the shape of a "T".

Between the first and second hinge frames 100 and 200 is provided a rotary washer 400 so that the second hinge frame 200 is rotated while being opposite to the first hinge frame 100, as shown in FIG. 25. Inside the rotary washer 400 are formed a pair of fixing protrusions 402, which are securely fitted in fixing grooves 201a formed at the cylindrical hinge housing 201, respectively. Consequently, the fixing protrusions 402 are securely fitted in the corresponding fixing holes 201a (FIG. 26).

The rotary washer 400 is provided with one or more washer protrusions 401, which are spaced uniformly apart from each other in the circumferential direction of the washer 400, so that the washer protrusions 401 are engaged in washer grooves 103 formed at the first hinge frame 100.

Figure 26:
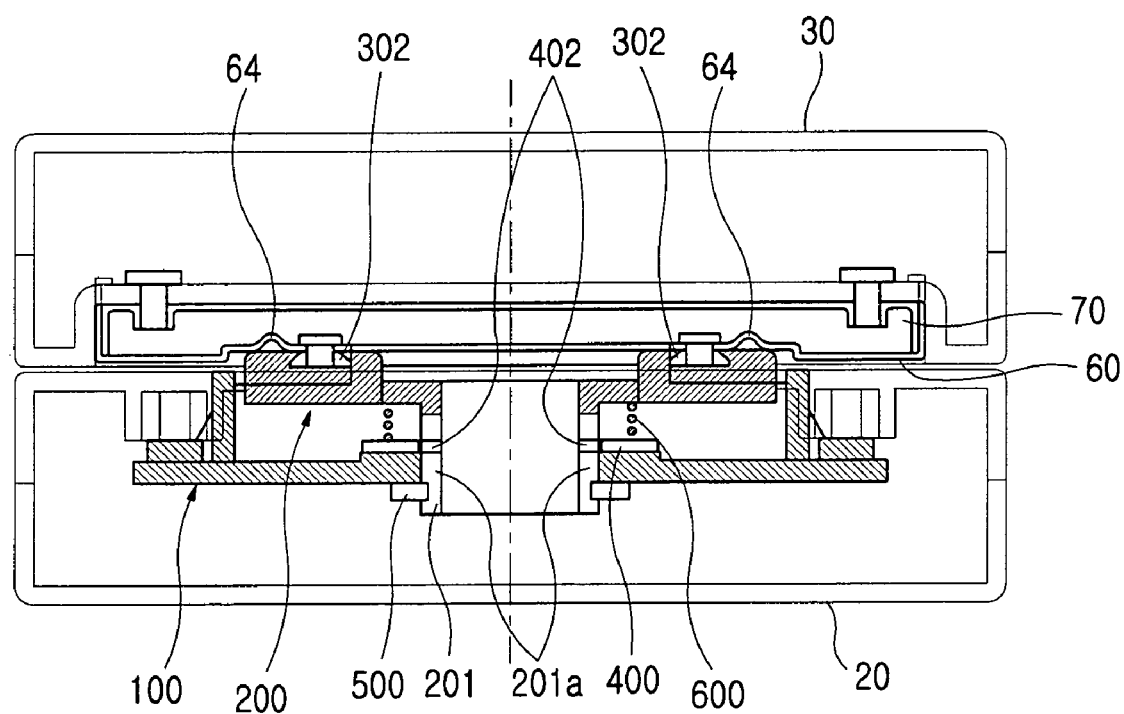
FIG. 26 is a side cross-sectional view showing the construction of the sliding/hinge apparatus for sliding/rotating type mobile terminals according to the second preferred embodiment of the present invention in FIG. 15.

Between the second hinge frame 200 and the rotary washer 400 is disposed a compression spring 600, as shown in FIG. 26. The washer protrusions 401 are securely located in the corresponding washer grooves 103 of the first hinge frame 100. The compression spring 600 generates an elastic force by which the washer protrusions 401 are engaged in or disengaged from the washer grooves 103, respectively. When the slide housing 30 is rotated, the cylindrical hinge housing 201 is rotated. As a result, the rotary washer 400 is rotated.

At prescribed positions outside the washer grooves 103 are formed a pair of rotary stoppers 105, as shown in FIG. 16, which contact the second hinge frame 200 for stopping the rotation of the slide housing 30. When the slide housing 30 rotates, the washer protrusions 401 of the rotary washer 400 are separated from an initial set of corresponding washer grooves 103, and are then inserted into a different set of corresponding washer grooves 103, respectively.

An elastic force is applied to the rotary washer 400 by means of the compression spring 600 in such a manner that the washer protrusions 401 are engaged into and disengaged from the corresponding washer grooves 103, while the slide housing 30 is being rotated.

Figure 27:
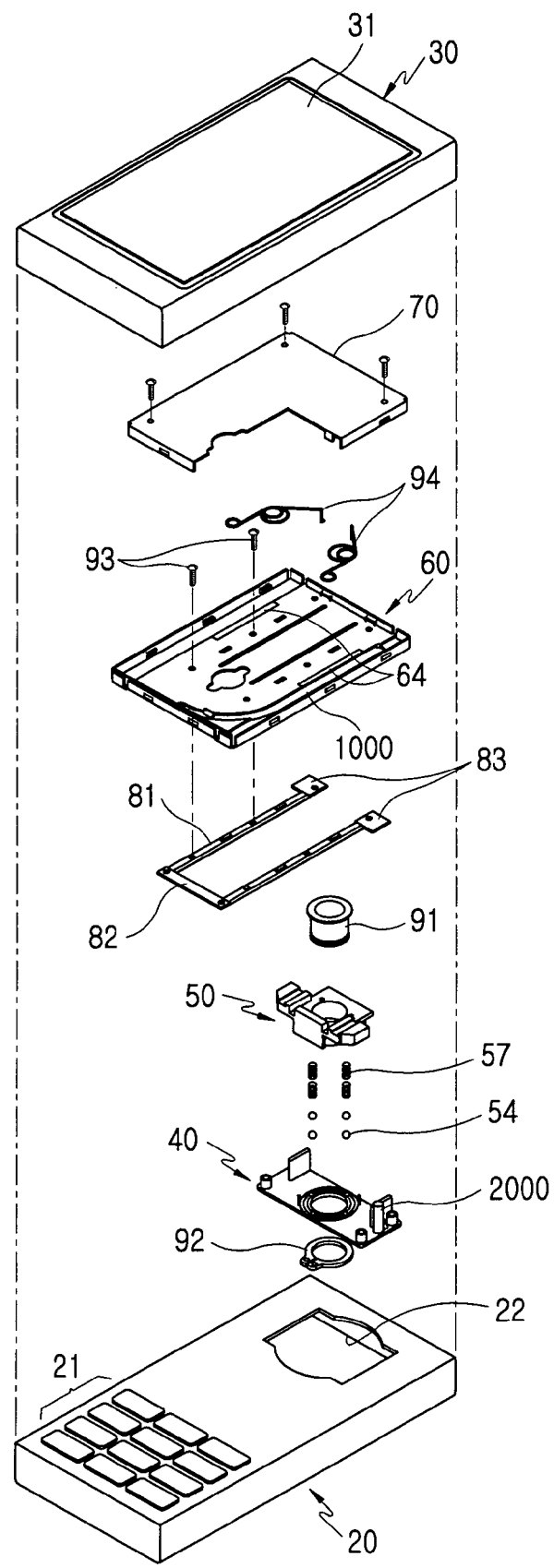
FIG. 27 is an exploded perspective view showing the construction of a sliding/hinge apparatus for sliding/rotating type mobile terminals according to a third preferred embodiment of the present invention.

Operation of a sliding/hinge apparatus for sliding/rotating type mobile terminals according to a third preferred embodiment of the present invention will now be described in detail with reference to FIGS. 27 to 31. As shown in FIG. 27, the sliding type mobile terminal includes a body housing 20, having a keypad 21 comprising a plurality of keys disposed thereon, and a slide housing 30, having a liquid crystal display unit 31 disposed thereon. A first hinge frame 40 of the sliding/hinge apparatus 10 of the sliding/rotating type mobile terminal is fixed to the body housing 20 by means of screws 93.

Figure 28:
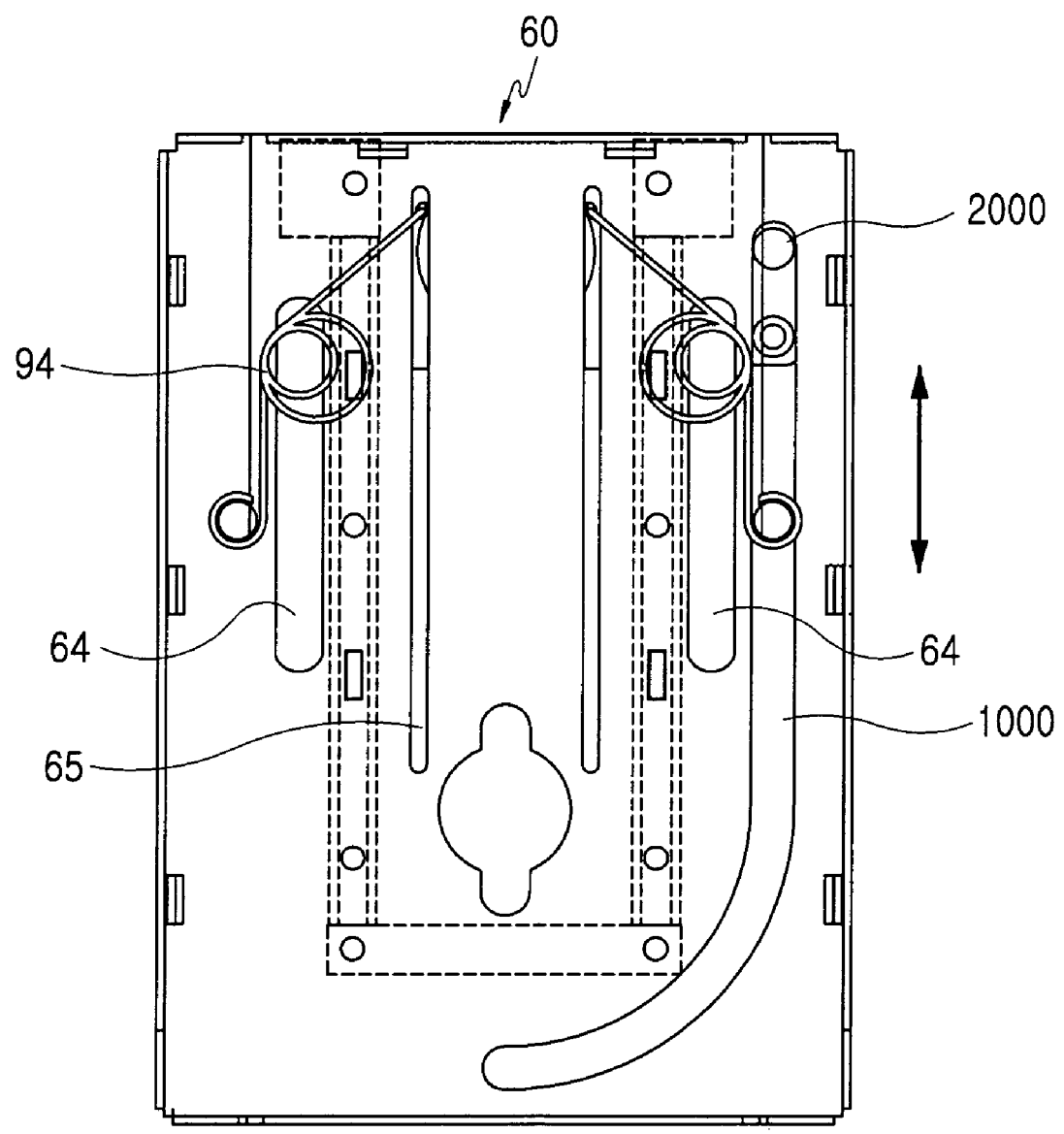
FIG. 28 is a plan view showing the interior of the sliding/hinge apparatus for sliding/rotating type mobile terminals shown in FIG. 27.

At the upper part of the first hinge frame 40 is disposed a second hinge frame 50 while the second hinge frame 50 is opposite to the first hinge frame 40 in such a manner that the slide housing 30 can be slid and rotated about a hinge axis A1. Through the center parts of the first and second hinge frames 40 and 50 is inserted a bush 91 so that the first and second hinge frames 40 and 50 are coupled with each other while they are opposite to each other, as shown in FIG. 28. In a fitting groove at the lower end of the bush 91 is fitted a snap ring 92. To the upper part of the second hinge frame 50 is attached a first plate 60 in such a manner that the slide housing 30 is slid. The first plate 60 is fixed to the slide housing 30 by means of screws 93.

Figure 30:
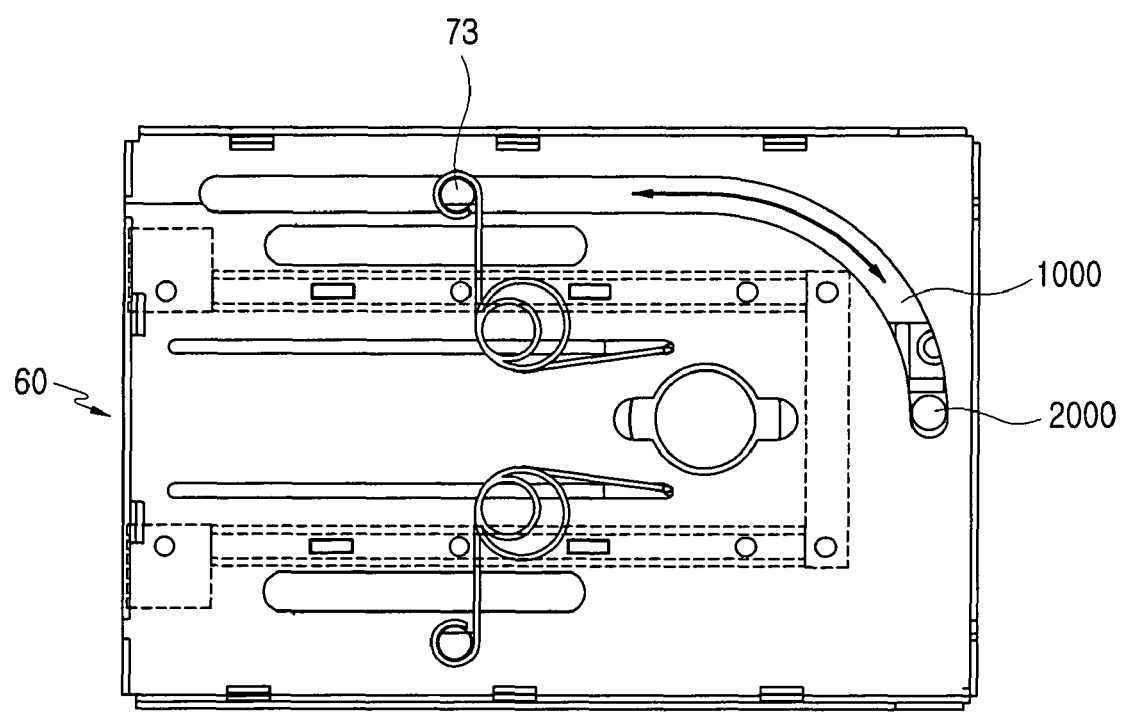
FIG. 30 is an opened plan view of the sliding/hinge apparatus for sliding/rotating type mobile terminals according to the third preferred embodiment of the present invention showing a slide housing of the sliding/hinge apparatus rotated apart in FIG. 27.
Figure 31:
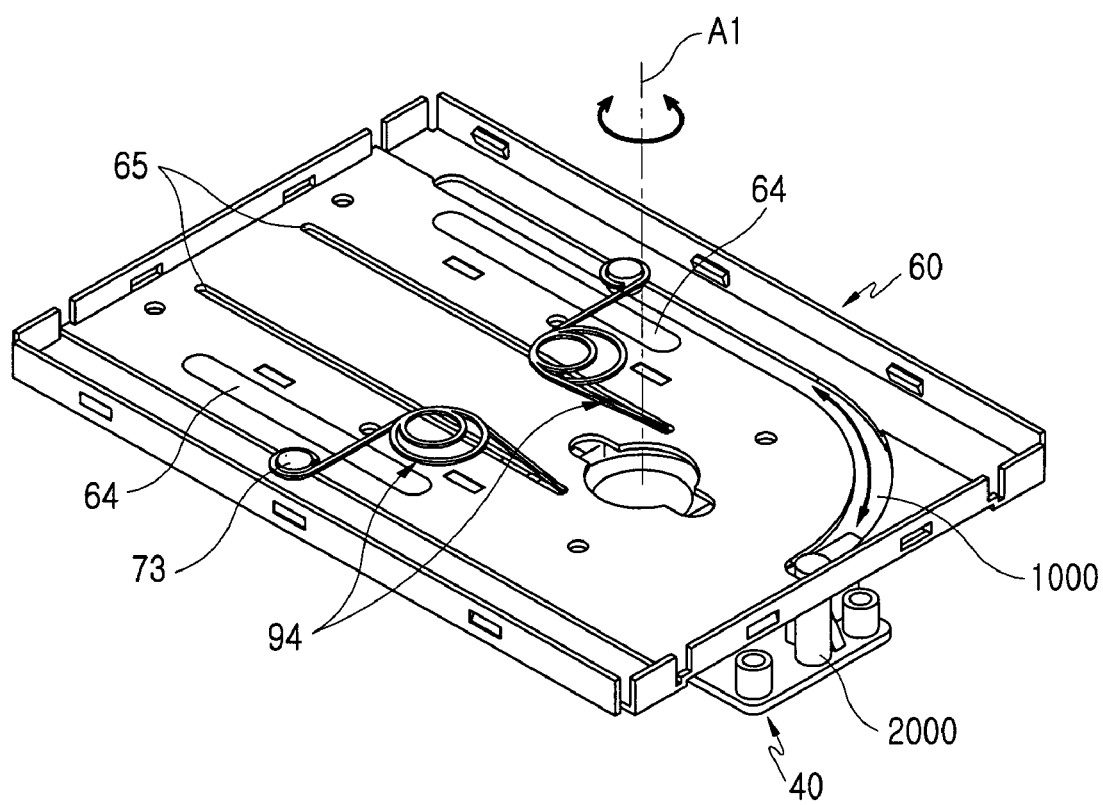
FIG. 31 is a perspective view showing the interior of the sliding/hinge apparatus for sliding/rotating type mobile terminals shown in FIG. 30.

When the slide housing 30 is slid from the body housing 20 in the longitudinal direction thereof as shown in FIGS. 30 and 31, a pair of first slide bars 81 are slid along a pair of guide grooves 55 formed at the upper part of the second hinge frame 50, respectively, since the first slide bars 301 are engaged in the pair of guide grooves 55 while being disposed between the second hinge frame 50 and the first plate 60. Between the first and second plates 60 and 70 are disposed a pair of ring springs 94 for providing an elastic force, by which the slide housing 30 is semi-automatically slid.

Figure 29:
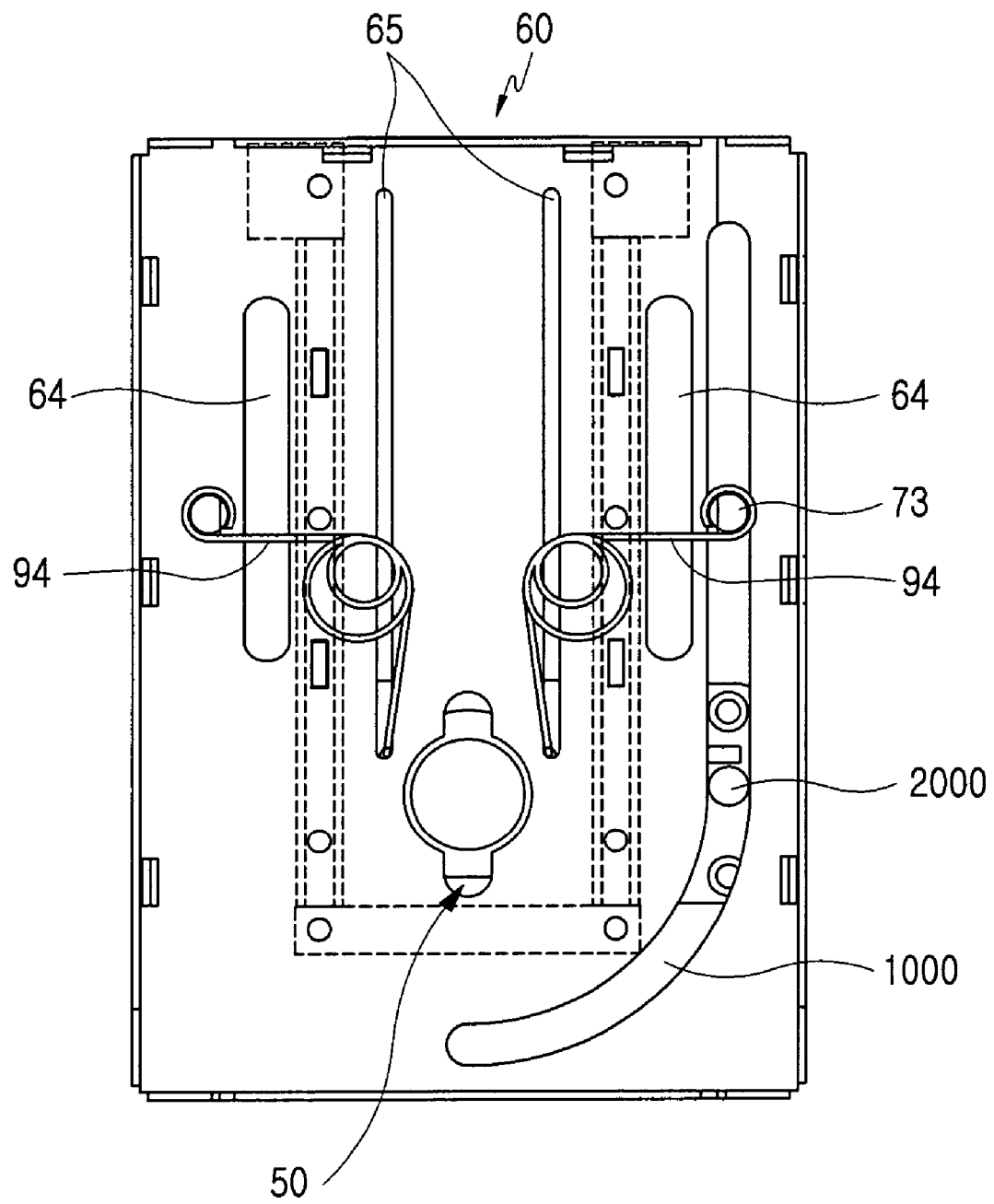
FIG. 29 is a plan view showing the operation of the sliding/hinge apparatus for sliding/rotating type mobile terminals shown in FIG. 27.

As shown in FIG. 29, one end 94a of each of the ring springs 94 is inserted through the corresponding one of the guide holes 65 of the first plate 60 such that the end 94a is engaged in a supporting groove 58 formed at the upper end of the second hinge frame 50, and the other end 94b of each of the ring springs 94 is connected to the corresponding one of pins 73 formed at the second plate 60. Consequently, the elastic force is semi-automatically provided by means of the ring springs 94.

At a prescribed position of the first hinge frame 40 is formed a guide pin 2000, which is slidably moved. At the first plate 60 is formed a pin guide hole 1000, in which the guide pin 2000 is disposed in such a manner that the guide pin 2000 is slid and rotated. When it is slid and then rotated as shown in FIGS. 30 and 31, the slide housing 30 is placed on the body housing 20 in the shape of a "T". When the slide housing 30 slides and rotates, the guide pin 2000 is slid along the pin guide hole 1000, as shown in FIG. 30. The upper part of the pin guide hole 1000 is formed with a prescribed length in the longitudinal direction of the first plate 60. Consequently, the guide pin 2000 can be slid along the pin guide hole 1000.

The lower part of the pin guide hole 1000 is curved such that the slide housing is rotated. Consequently, the guide pin 2000 is guided along the curved lower part of the pin guide hole 1000 so that the slide housing is rotated, when the slide housing 30 is rotated as shown in FIG. 31.

Figure 32:
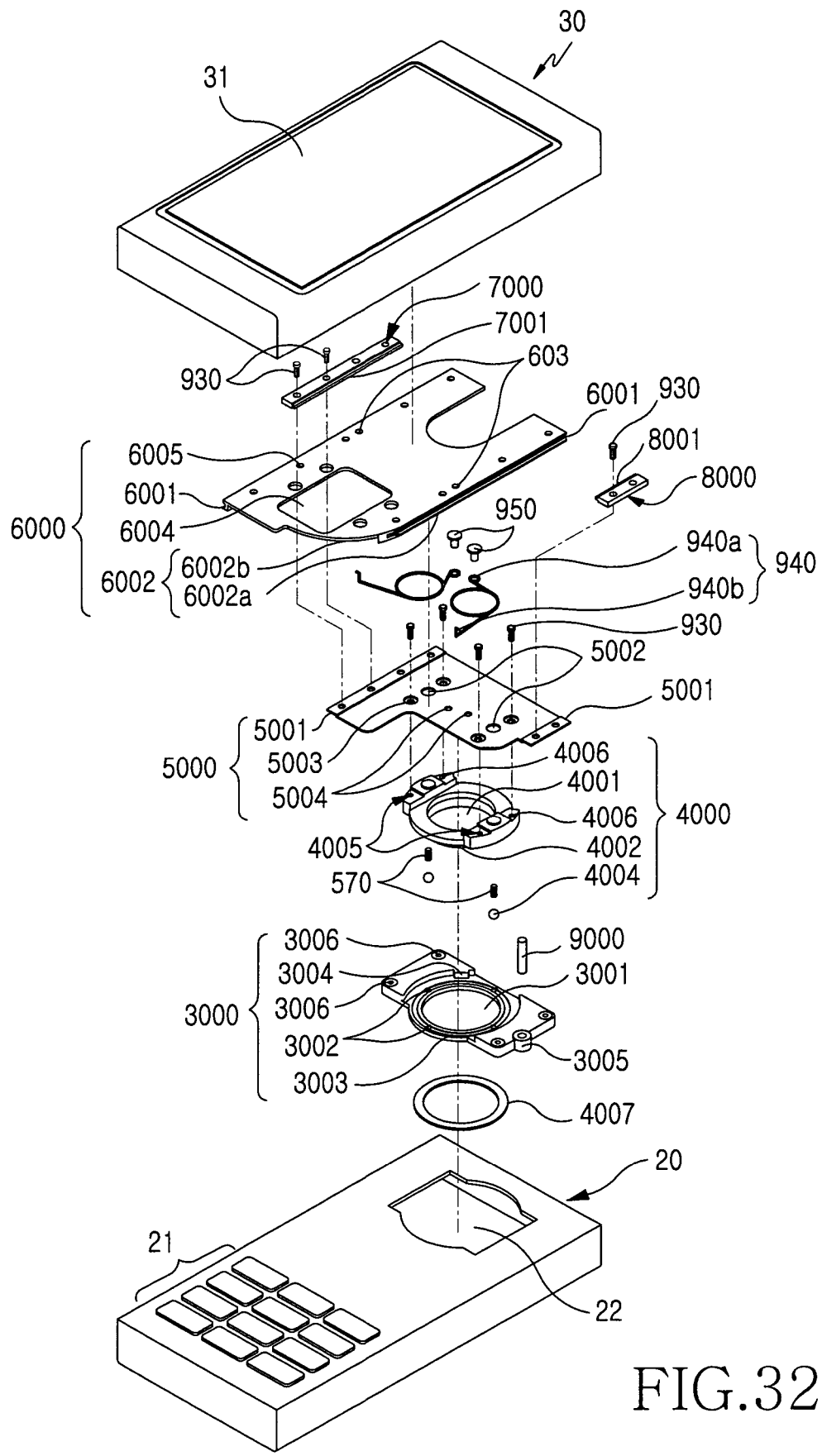
FIG. 32 is an exploded perspective view showing the construction of a sliding/hinge apparatus for sliding/rotating type mobile terminals according to a fourth preferred embodiment of the present invention.

Operation of a sliding/hinge apparatus for sliding/rotating type mobile terminals according to a fourth preferred embodiment of the present invention will now be described in detail with reference to FIGS. 32 to 47. As shown in FIG. 32, a first hinge frame 3000 of the sliding/hinge apparatus 10 for sliding/rotating type mobile terminals is fixed to a body housing 20 by fitting screws 930 in screw fitting parts 4005. At the upper part of the first hinge frame 3000 is disposed a second hinge frame 4000, while the second hinge frame 4000 is opposite to the first hinge frame 3000 in such a manner that a slide housing is rotated about a hinge axis A1, as shown in FIGS. 32 to 34.

Figure 33:
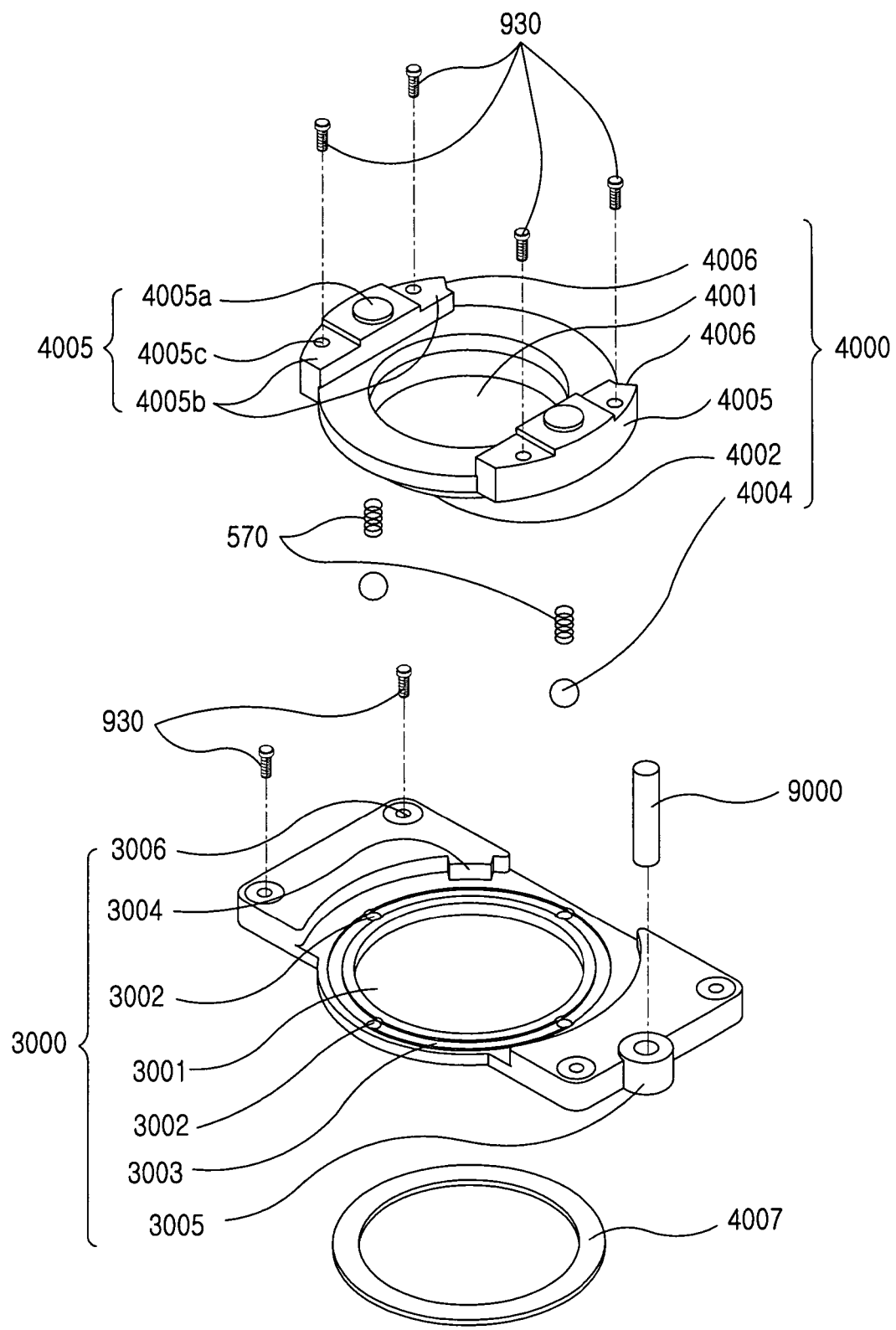
FIG. 33 is an exploded perspective view showing a hinge frame of the sliding/hinge apparatus for sliding/rotating type mobile terminals according to the fourth preferred embodiment of the present invention in FIG. 32.
Figure 34:
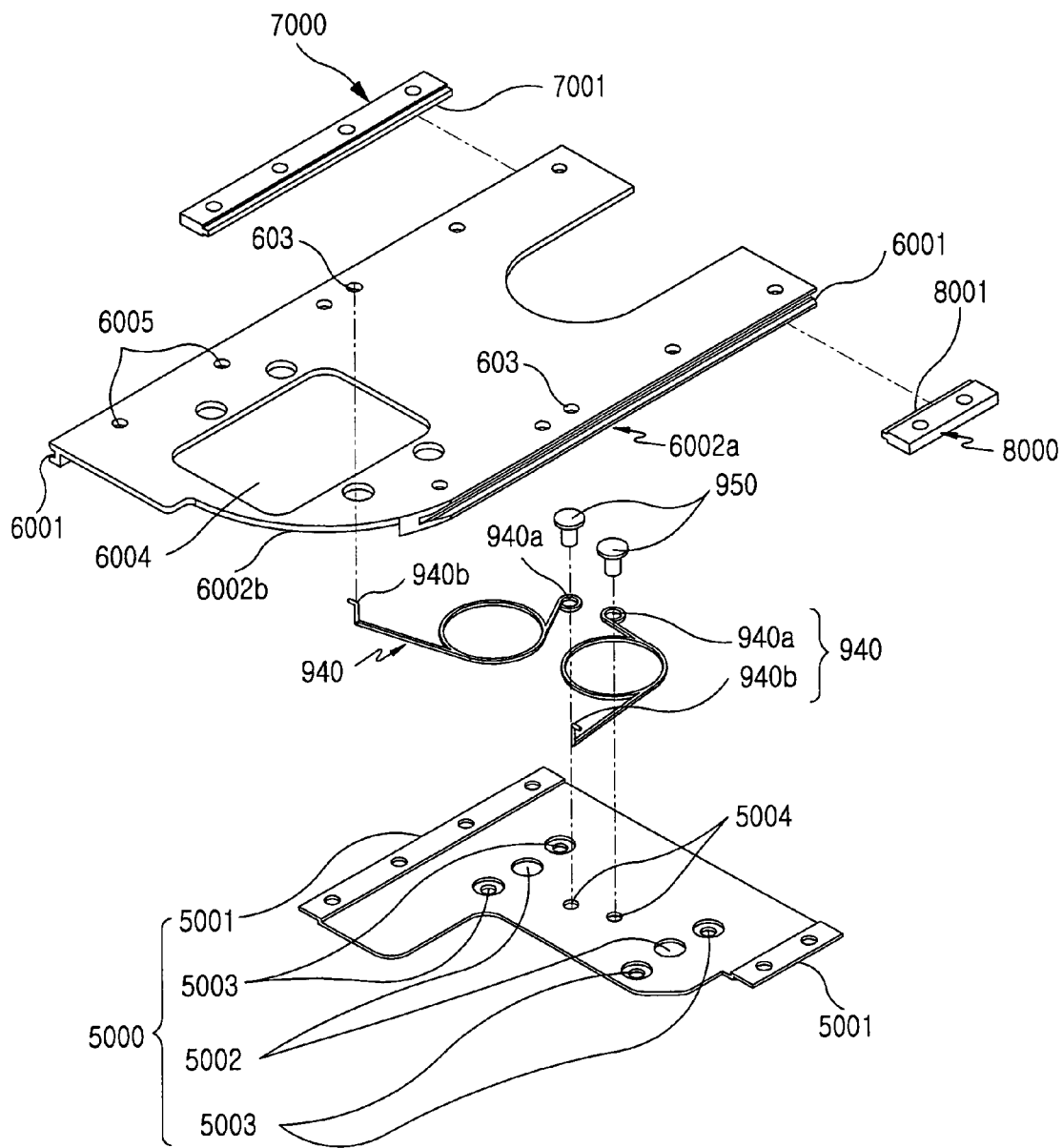
FIG. 34 is an exploded perspective view showing plates of the sliding/hinge apparatus for sliding/rotating type mobile terminals according to the fourth preferred embodiment of the present invention in FIG. 32.
Figure 35:
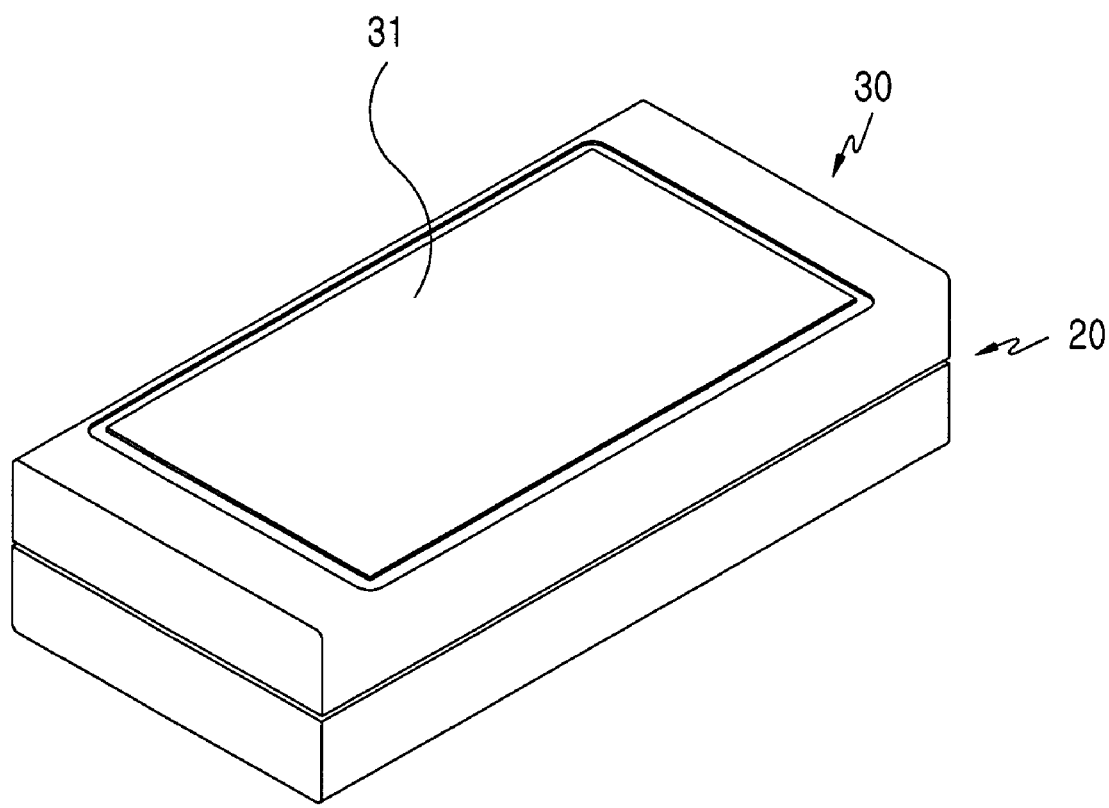
FIG. 35 is an assembled perspective view showing the sliding/hinge apparatus for sliding/rotating type mobile terminals according to the fourth preferred embodiment of the present invention in FIG. 32.

At the center part of the second hinge frame 4000 is formed a cylinder 4002, as shown in FIG. 33, which extends downward in the direction of the hinge axis A1, so that the first and second hinge frames 3000 and 4000 are rotatably connected to each other while being opposite to each other. Through the center part of the first hinge frame 3000 is formed a first hinge frame side through-hole 3001, through which the cylinder 4002 is inserted. A snap ring 4007 is fitted in a fitting groove formed at the lower end of the cylinder 4002.

Through the center part of the second hinge frame 4000 is formed a second hinge frame side through-hole 4001, through which a flexible circuit (not shown) can be inserted, as shown in FIGS. 32 and 33. At a prescribed position of the second plate 6000 is formed a second plate side through-hole 6004, through which the flexible circuit is inserted. Also, at prescribed positions of both sides of the second plate 6000 are formed second plate side screw holes 6005, which are arranged in the longitudinal direction of the plate 6000 so that the second plate 6000 is fixed to the slide housing by fitting screws 930 in the second plate side screw holes 6005.

Figure 36:
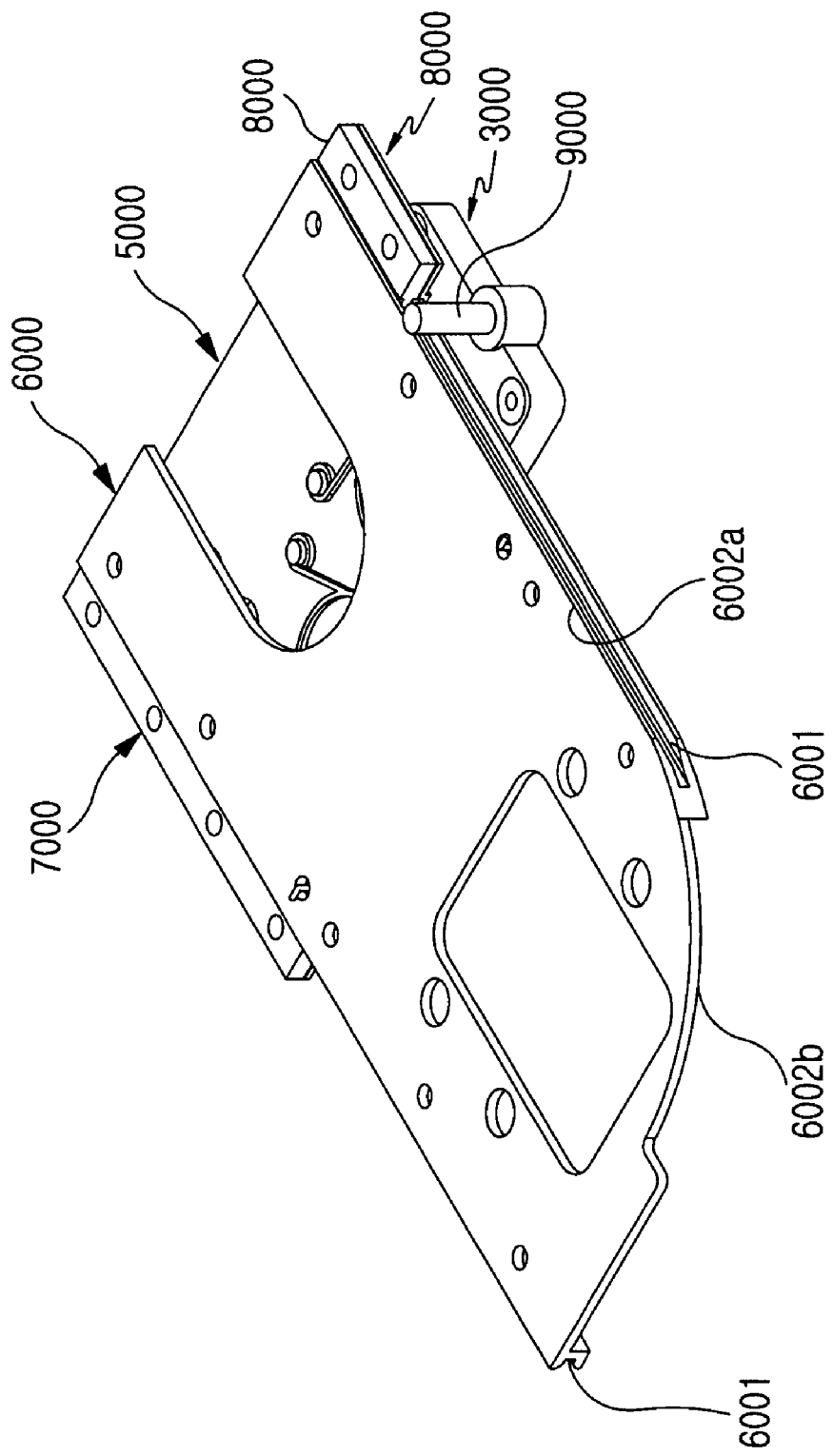
FIG. 36 is a perspective view showing the interior of the sliding/hinge apparatus for sliding/rotating type mobile terminals shown in FIG. 35.
Figure 37:
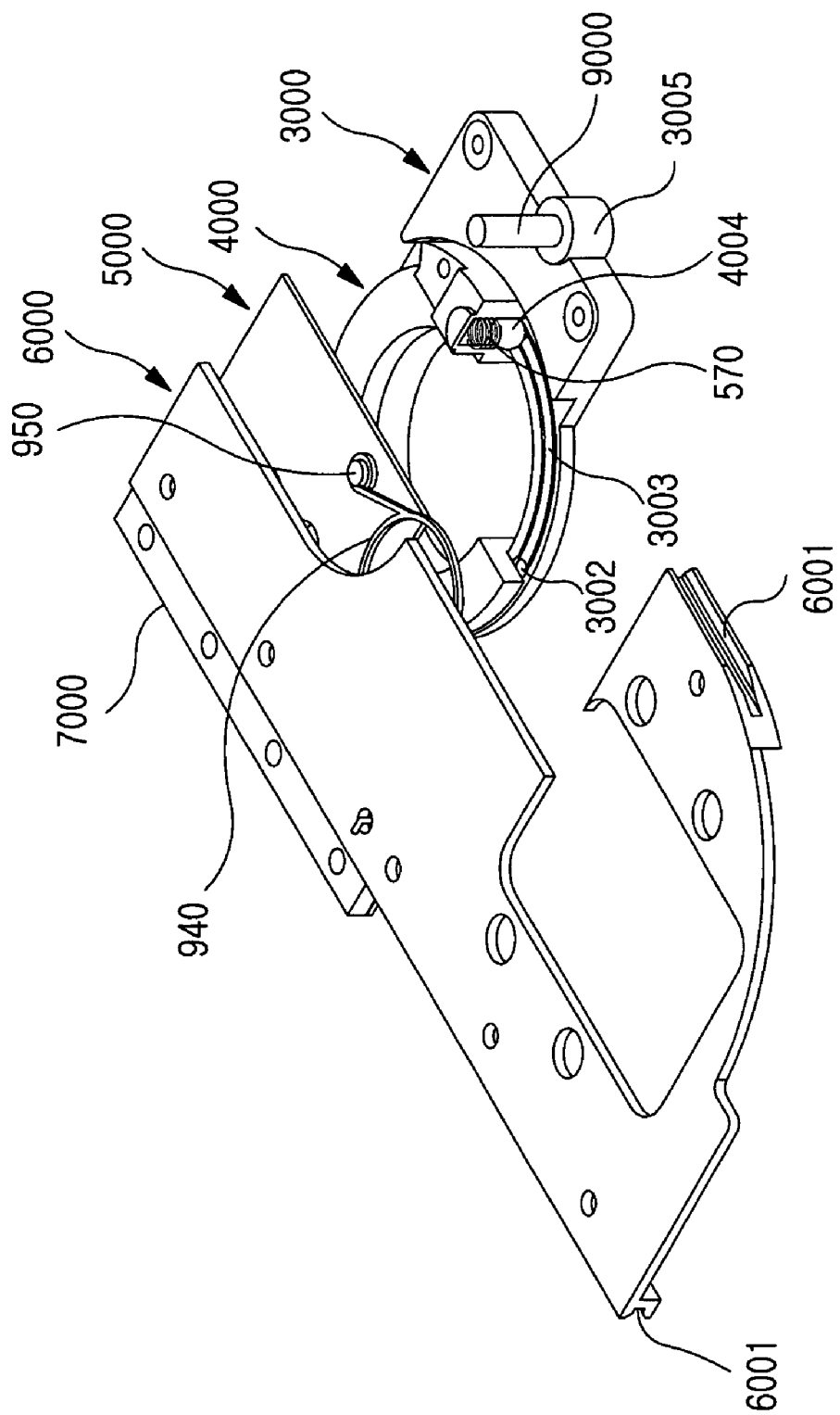
FIG. 37 is a cutaway perspective view showing the interior of the sliding/hinge apparatus for sliding/rotating type mobile terminals shown in FIG. 35.
Figure 38:
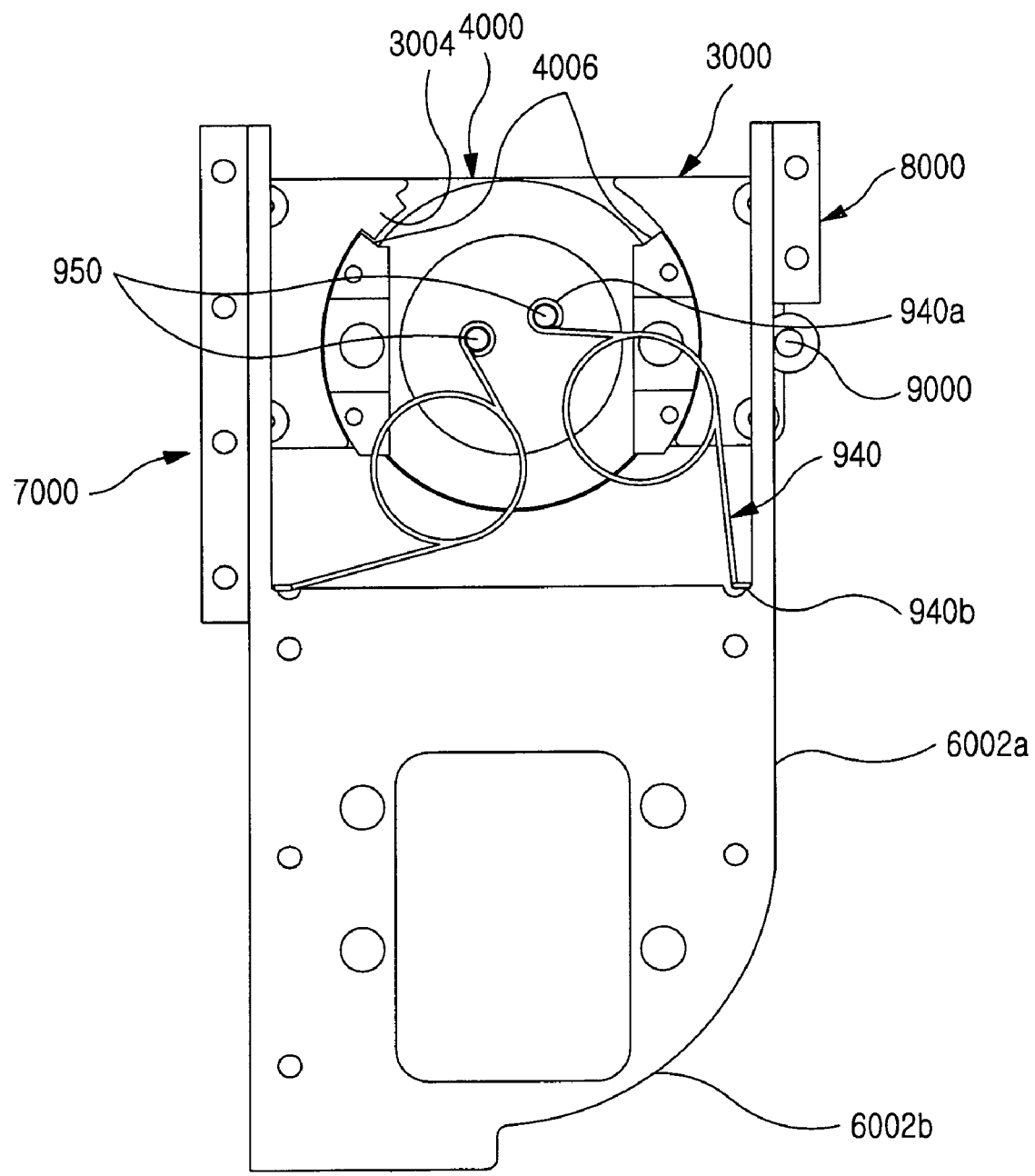
FIG. 38 is a cutaway plan view showing the interior of the sliding/hinge apparatus for sliding/rotating type mobile terminals shown in FIG. 35.
Figure 39:
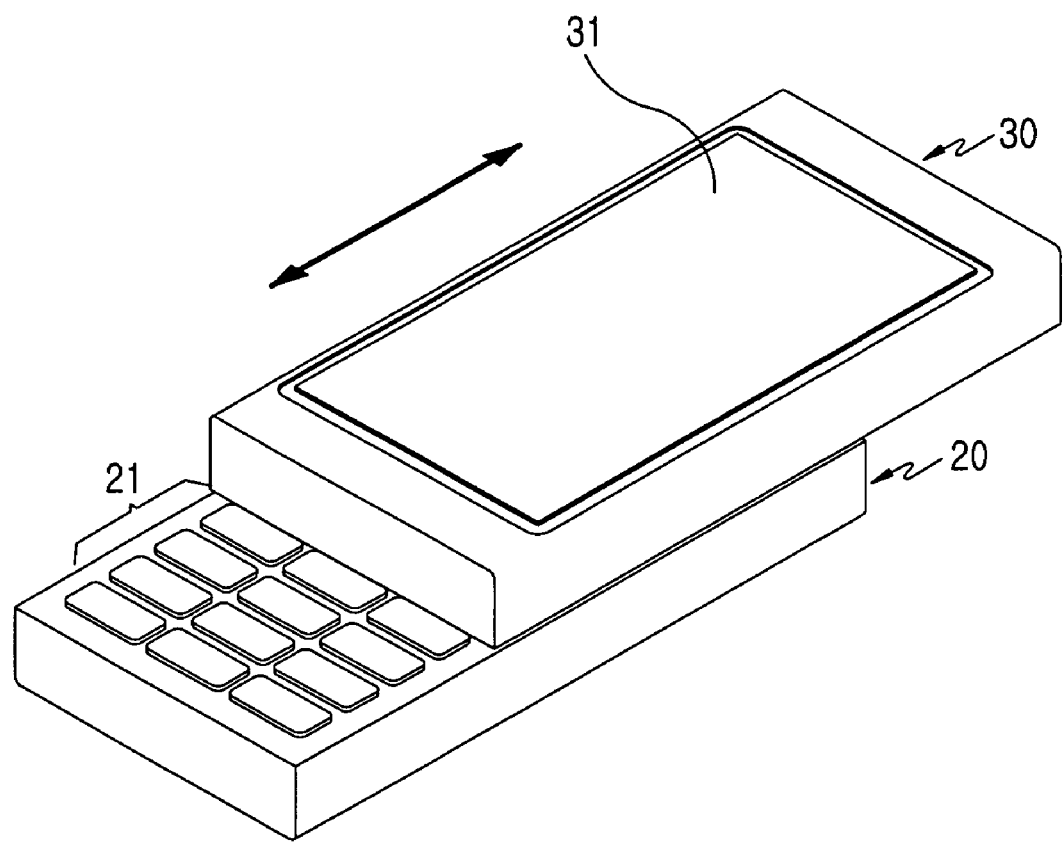
FIG. 39 is a perspective view of the sliding/hinge apparatus for sliding/rotating type mobile terminals according to the fourth preferred embodiment of the present invention in FIG. 32 showing a slide housing of the sliding/hinge apparatus slid.
Figure 40:
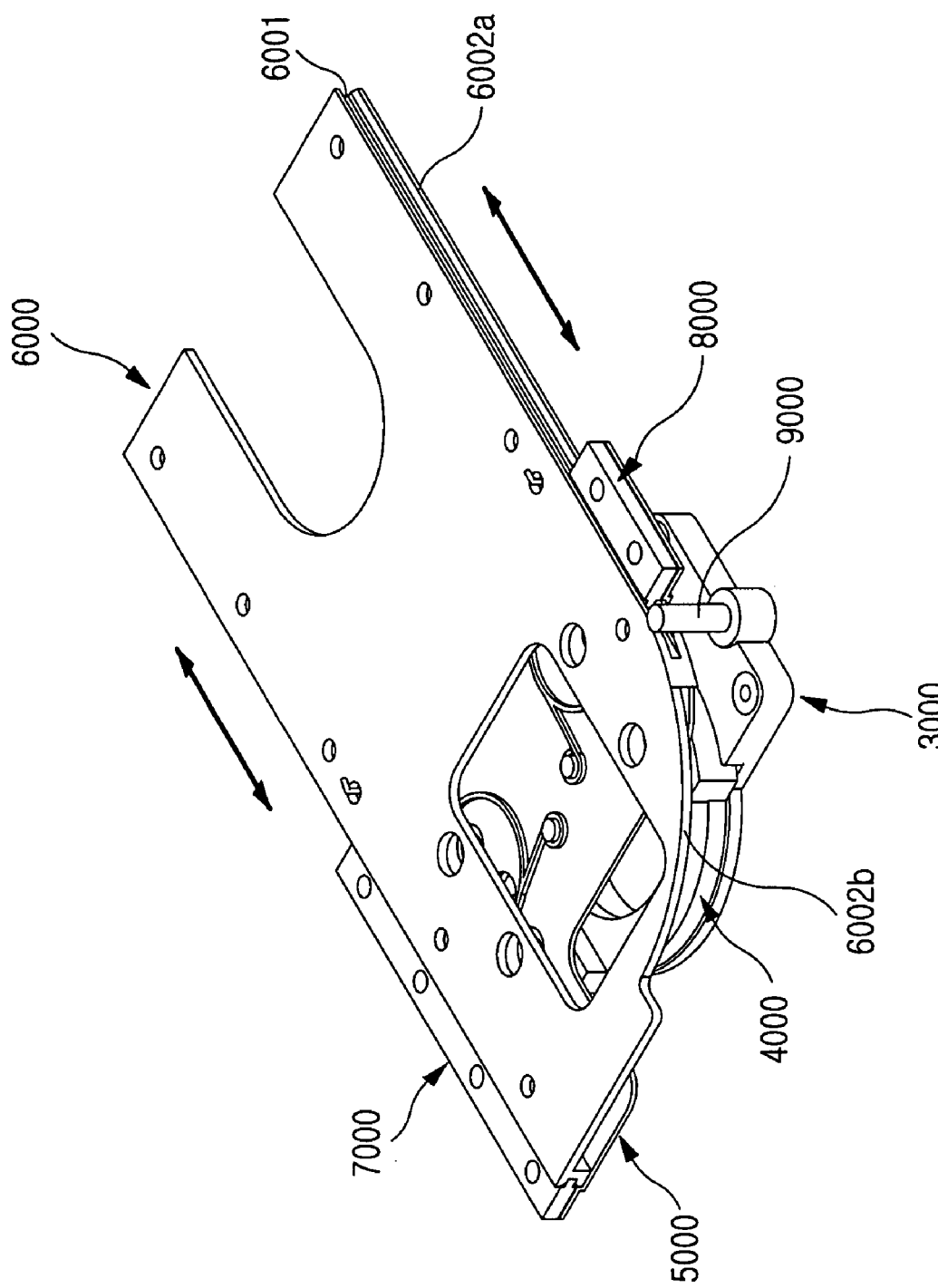
FIG. 40 is a perspective view showing the interior of the sliding/hinge apparatus for sliding/rotating type mobile terminals shown in FIG. 39.

As shown in FIGS. 36 to 38, the first plate 5000 is fixed to the second hinge frame 4000 by means of screws, and a first slide bar 7000 and a second slide bar 8000 are fixed to both sides of the first plate 5000 by means of screws 930. At both sides of the first plate 5000 are formed bar fixing parts 5001, which are disposed in the longitudinal direction of the slide housing 30. To the bar fixing parts 5001 are fixed the slide bars 7000 and 8000 by means of screws 930. When the slide housing 30 is slid as shown in FIGS. 39 and 40, the first and second slide bars 7000 and 8000 of the first plate 5000 are slid along guide grooves 6001 formed at the second plate 6000.

Figure 41:
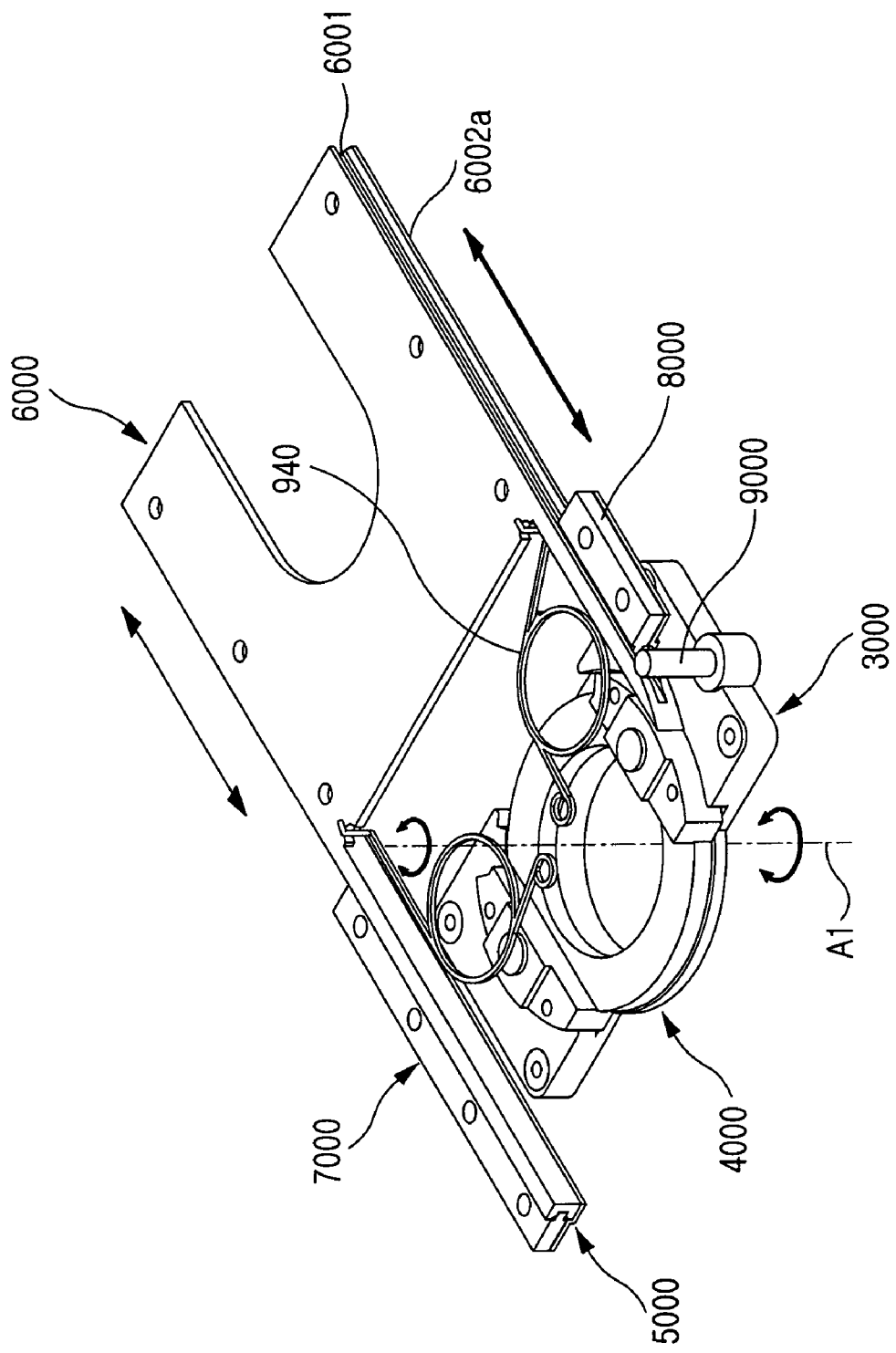
FIG. 41 is a cutaway perspective view showing the interior of the sliding/hinge apparatus for sliding/rotating type mobile terminals shown in FIG. 39.

As shown in FIG. 41, the first slide bar 7000 is provided at one side thereof with a guide protrusion 7001, which is formed in the longitudinal direction of the plate 5000. Similarly, the second slide bar 8000 is provided at one side thereof with a guide protrusion 8001, which is formed in the longitudinal direction of the plate 5000. The guide protrusions 7001 and 8001 are disposed in the guide grooves 6001 in such a manner that the guide protrusions 7001 and 8001 are slid.

Figure 42:
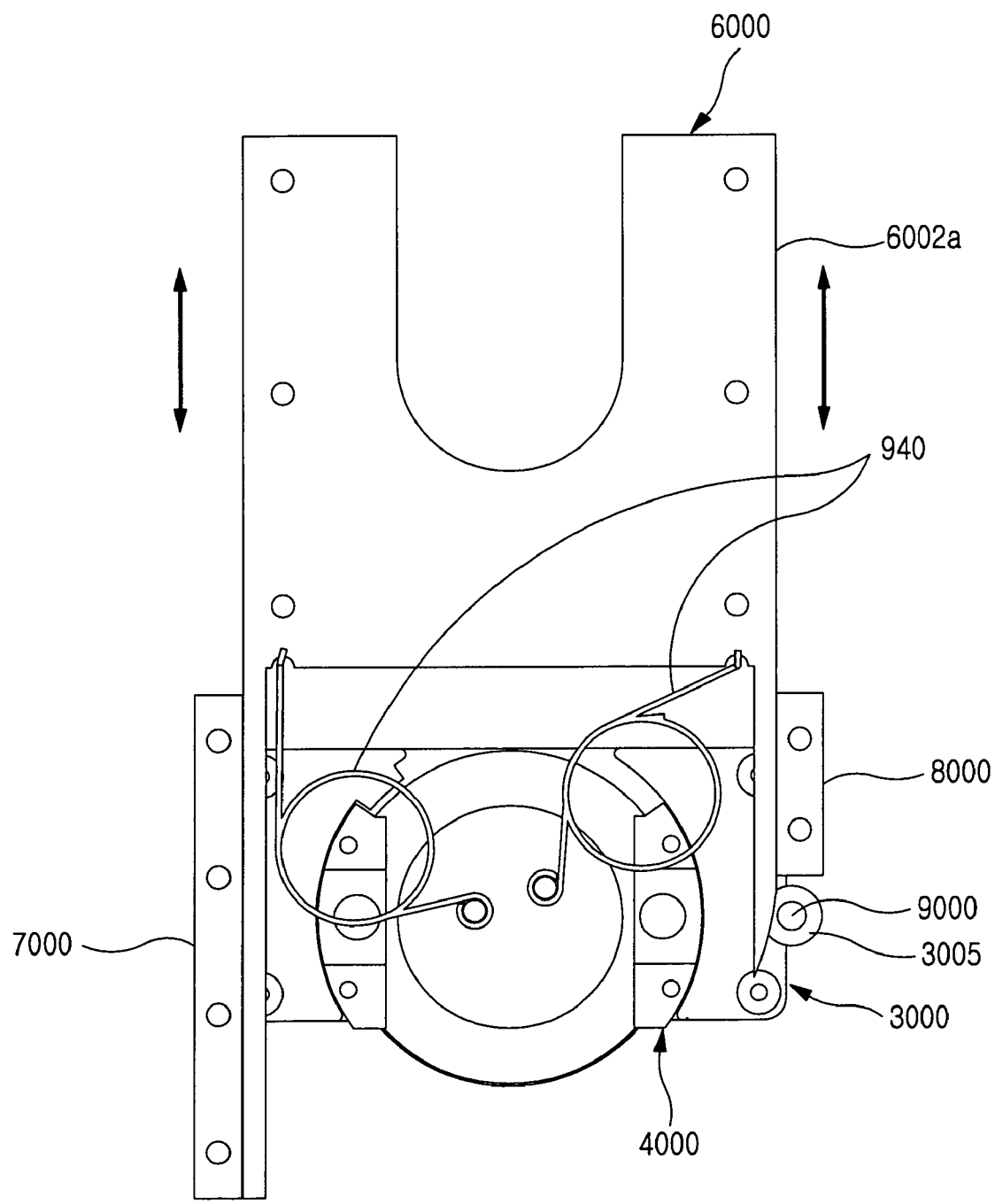
FIG. 42 is a cutaway plan view showing the interior of the sliding/hinge apparatus for sliding/rotating type mobile terminals shown in FIG. 39.

As shown in FIG. 42, the first hinge frame 3000 is provided at a prescribed position thereof with a pin hole 3005, in which a guide pin 9000 can move slidably along a guide 6002 formed at the second plate 6000 is fitted. The guide pin 9000 fitted in the pin hole 3005 is linearly slid along the guide 6002.

The upper part 6002a of the guide 6002 is formed with a prescribed length in the longitudinal direction of the second plate 6000 so that the guide pine 9000 is linearly slid along thereof. A pair of ring springs 940 are disposed, as shown in FIG. 42, between the first and second plates 5000 and 6000 for providing an elastic force, by which the slide housing 30 is semi-automatically slid. Through one end of each of the ring springs 940 is inserted a rivet pin 950 (FIG. 34), which is fitted in a rivet pin hole 5004 formed at the first plate 5000.

Figure 43:
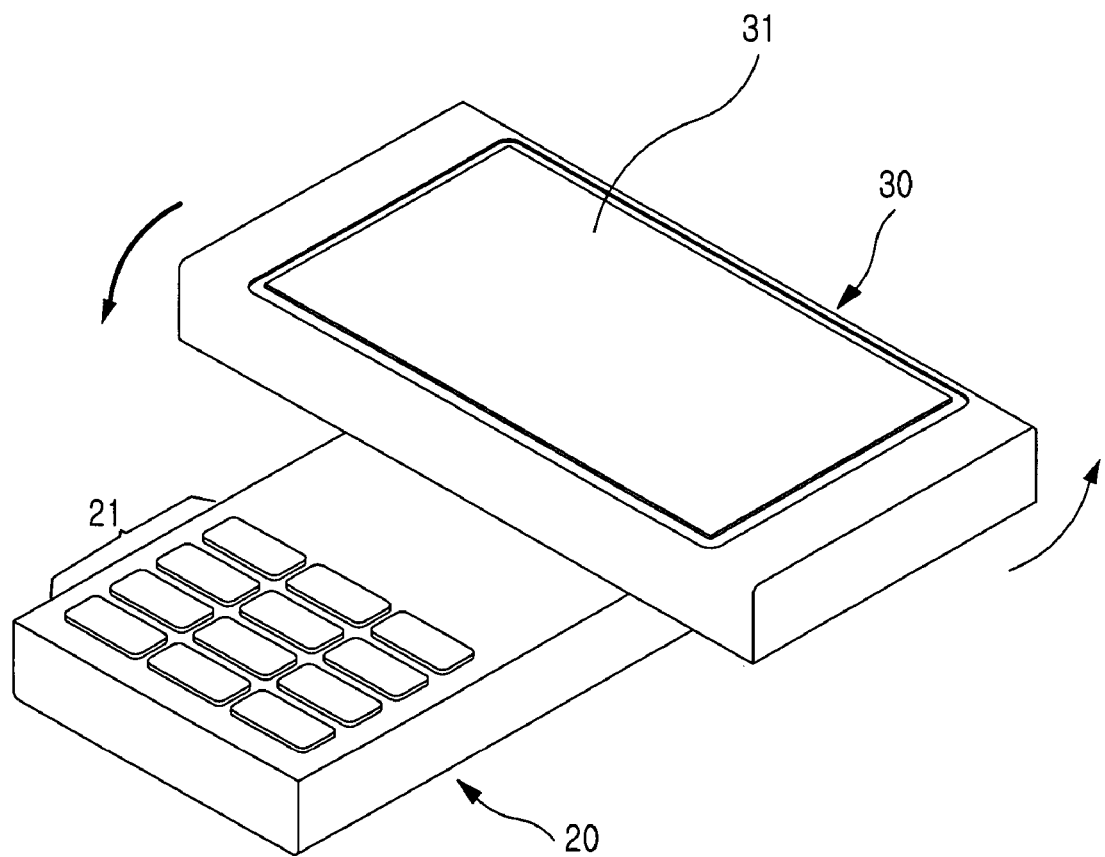
FIG. 43 is a perspective view of the sliding/hinge apparatus for sliding/rotating type mobile terminals according to the fourth preferred embodiment of the present invention in FIG. 32 showing the slide housing of the sliding/hinge apparatus rotated apart.
Figure 44:
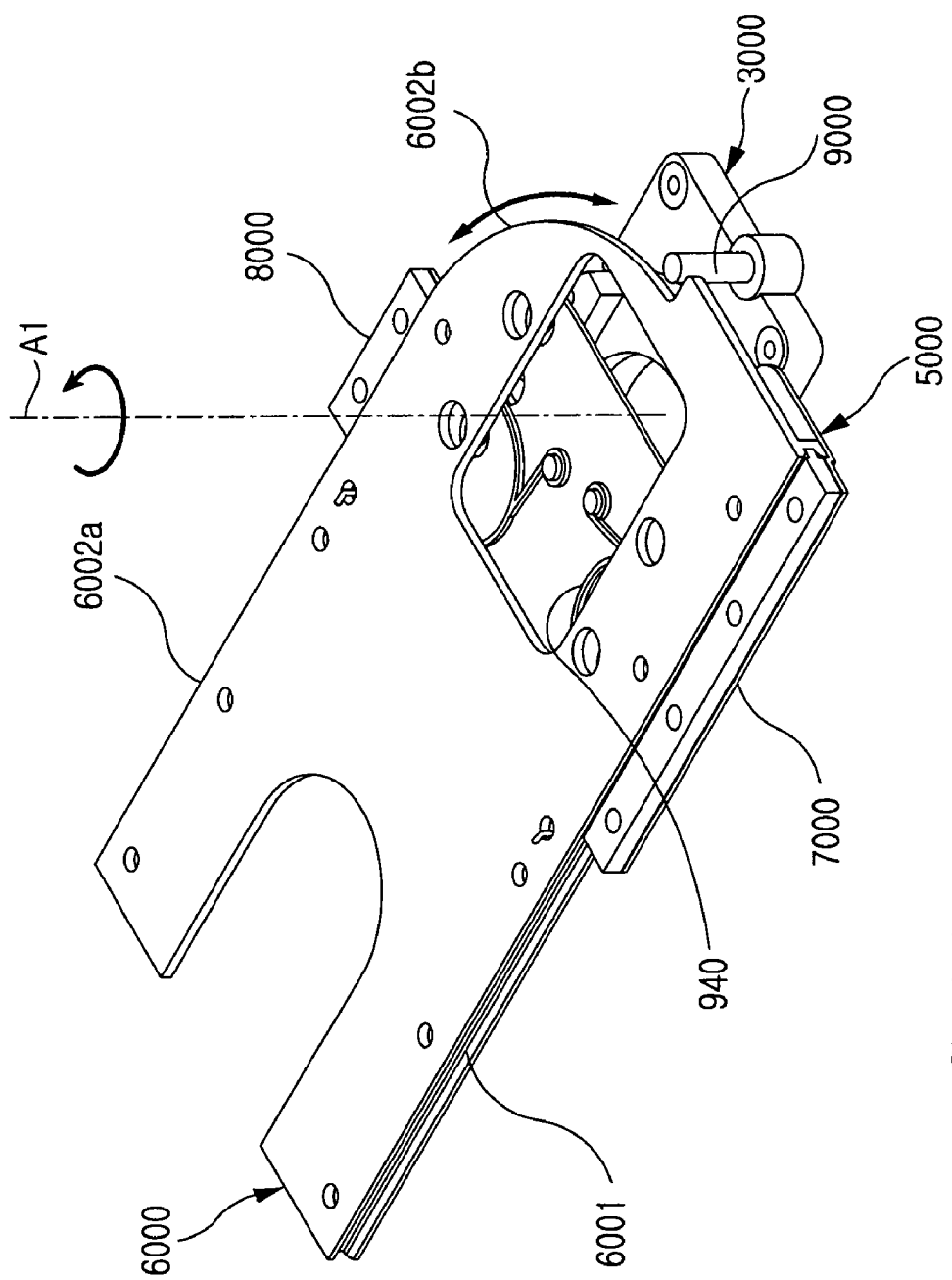
FIG. 44 is a perspective view showing the interior of the sliding/hinge apparatus for sliding/rotating type mobile terminals shown in FIG. 43.

The other end of each of the ring springs 940 is inserted through a spring insertion hole 603 formed at the second plate 6000. When the slide housing 30 is slid and then rotated as shown in FIG. 43, the slide housing 30 is placed on the body housing in the shape of a "T".

Figure 45:
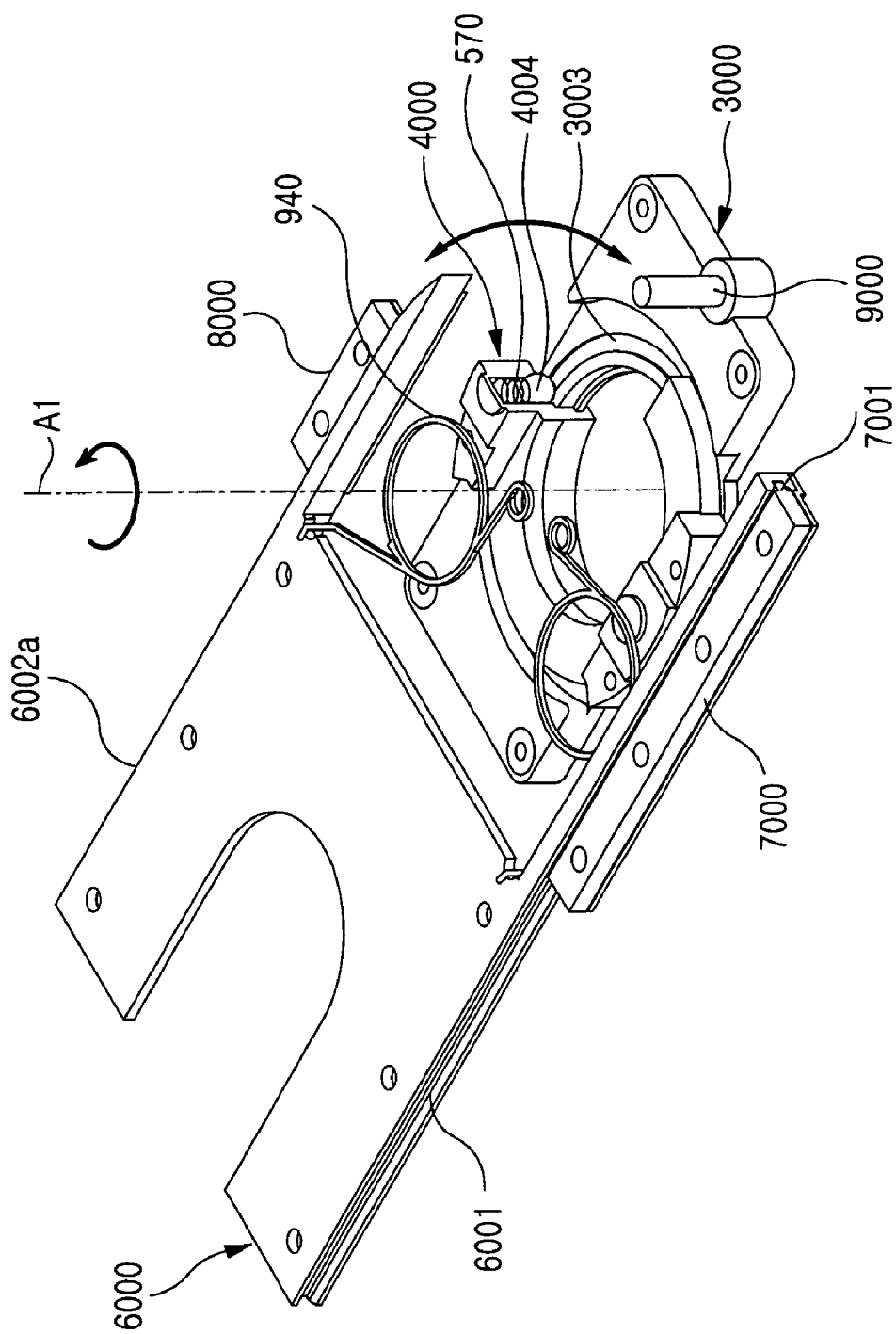
FIG. 45 is a cutaway perspective view showing the interior of the sliding/hinge apparatus for sliding/rotating type mobile terminals shown in FIG. 43.

As shown in FIGS. 33, 37 and 44 to 46, one or more ball grooves 3002 are formed around the first hinge frame side through-hole 3001, which are arranged while being spaced uniformly apart from each other in a circumferential manner, so that balls 4004 are securely located in the ball grooves 3002, respectively. As shown in FIG. 45, a ball guide groove 3003 is formed such that the ball grooves 43 are connected to each other by means of the ball guide groove 3003. The balls 4004 are guided along the ball guide groove 3003.

Figure 47:
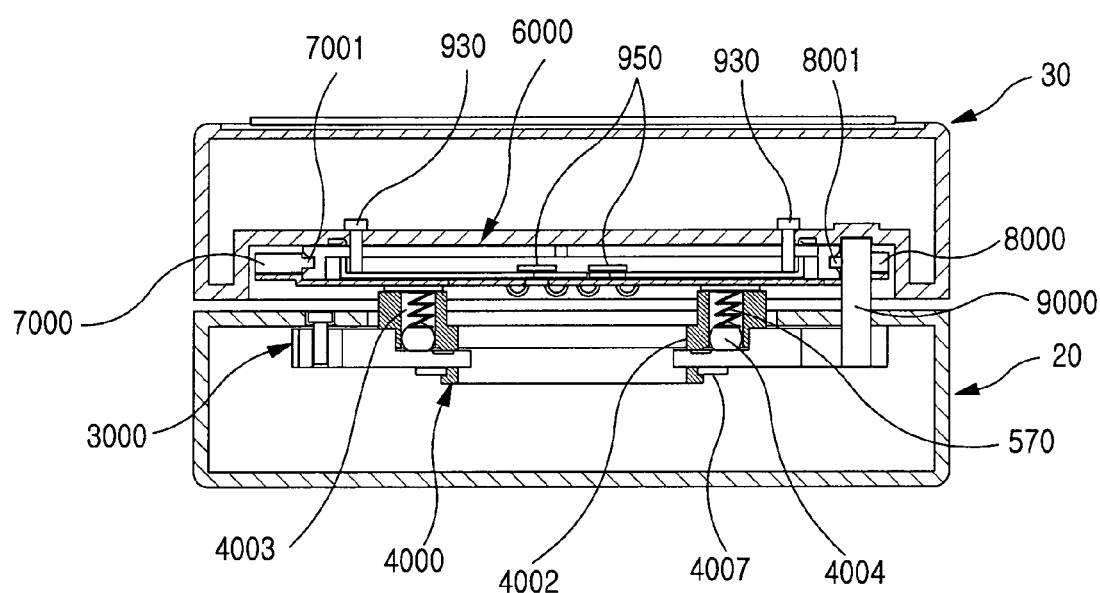
FIG. 47 is a side cross-sectional view showing the construction of the sliding/hinge apparatus for sliding/rotating type mobile terminals according to the fourth preferred embodiment of the present invention in FIG. 32.

Inside the lower ends of the cylinder 4002 of the second hinge frame 4000 are provided compression springs 570, as shown in FIGS. 45 and 47. Around the cylinder 4002 are formed a pair of spring holes 4003, which are opposite to each other. In the pair of spring holes 4003 are disposed a pair of balls 4004, respectively, such that the balls 4006 emerge from the lower ends of the spring holes 4003, respectively, by means of an elastic force from the compression springs 570. The balls 4004 are mounted in the corresponding spring holes 4003 in such a manner that the balls 4004 are selectively engaged in the ball grooves 3002 (FIG. 37) of the first hinge frame 3000, respectively.

When the slide housing is rotated as shown in FIG. 45, the balls 4004 are separated from an initial set of corresponding ball grooves 3002, and are then inserted into a different set of corresponding ball grooves 3002, respectively. When the slide housing is rotated, the balls 4004 are guided along the ball guide groove 3003 connected to the ball grooves 3002.

Referring to FIGS. 32 and 33, a pair of fixing parts 4005 is formed around the second hinge frame 4000, which are fixed to the first plate 5000, so that the first plate 5000 is securely fixed to the fixing parts 4005. Each of the fixing parts 4005 is provided with a fixing protrusion 4005a. The first plate 5000 is provided with fixing holes 5002, in which the fixing protrusions 4005a are fitted, respectively.

Figure 46:
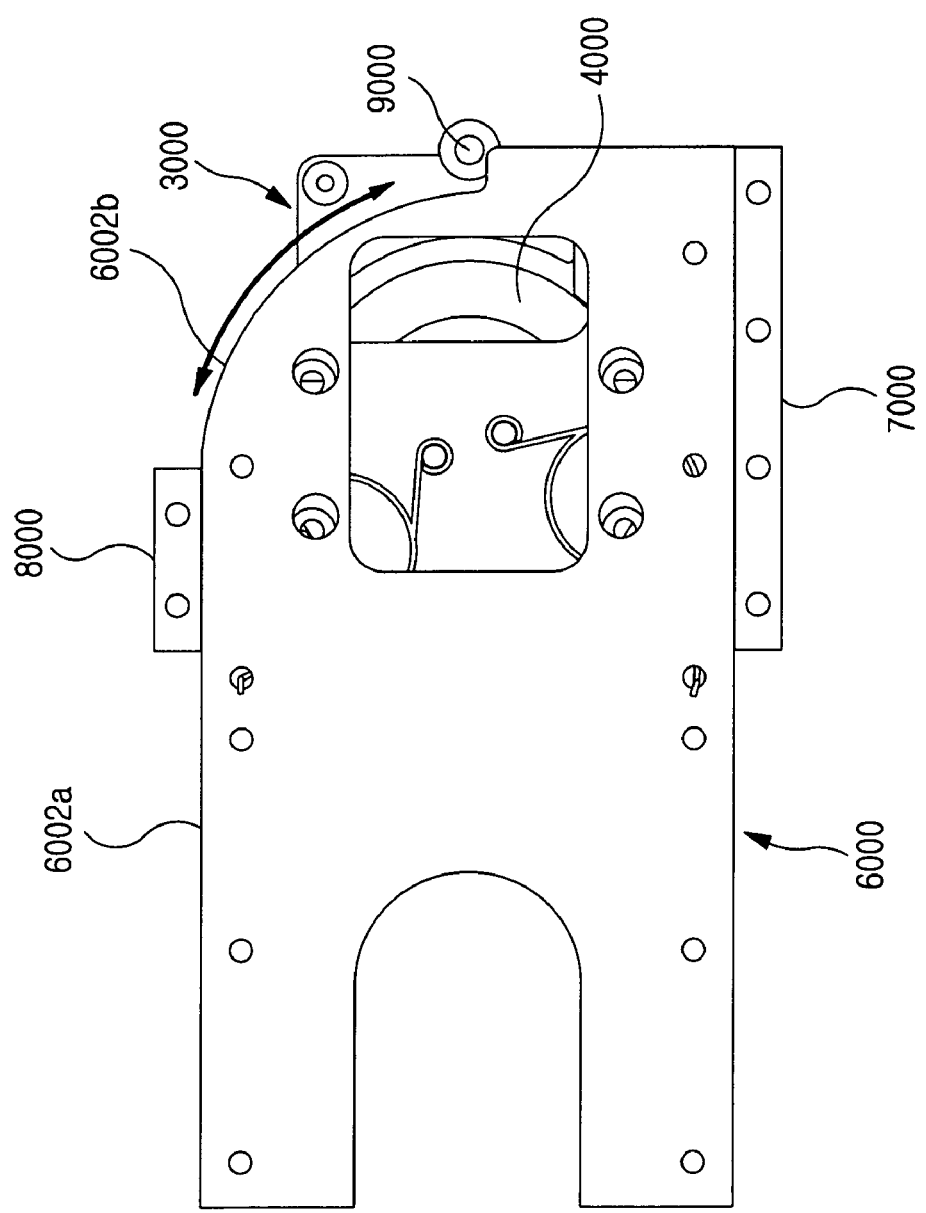
FIG. 46 is a plan view showing the interior of the sliding/hinge apparatus for sliding/rotating type mobile terminals shown in FIG. 43.

At both sides of each of the fixing protrusion 4005a are formed one or more fitting grooves 4005b, in which one or more screw fitting parts 5003 are formed at the first plate 5000. In each of the fitting grooves 4005b is formed a screw hole 4005c. The screw fitting parts 5003 extend downwards from the first plate 5000 so that the screw fitting parts 5003 are fitted in the fitting grooves 4005b of the second hinge frame 4000, respectively. At one side of each of the fixing parts 4005 is formed a stopper 4006, which contacts the stopper protrusion 3004 of the first hinge frame 3000 for stopping the rotation of the slide housing 30. The stopper 4006 contacts the stopper protrusion 3004, whereby rotation of the slide housing 30 is stopped. As shown in FIG. 46, the guide pin 9000 is rotated along the curved lower part 6002b of the guide 6002.

Figure 48:
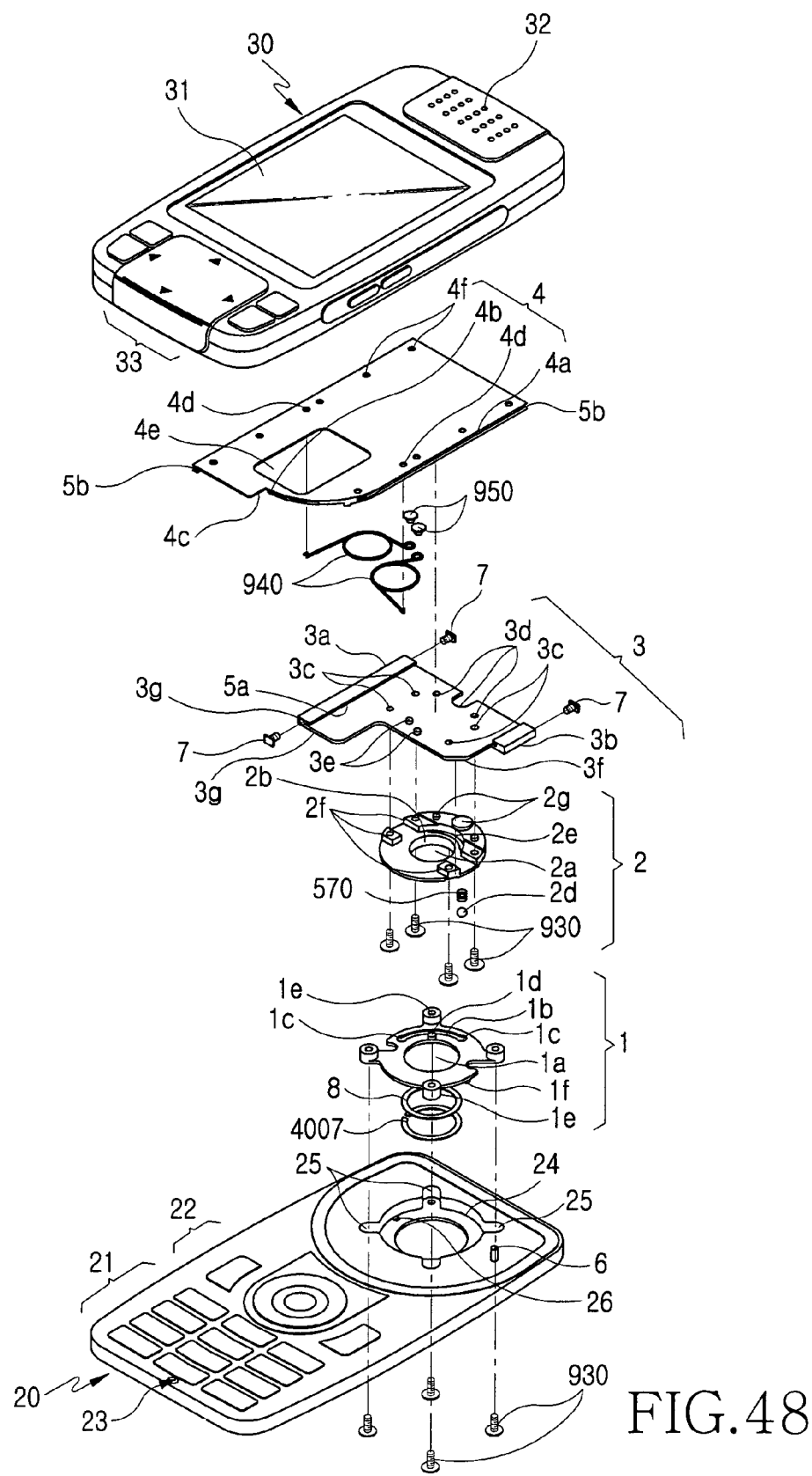
FIG. 48 is an exploded perspective view showing the construction of a sliding/hinge apparatus for sliding/rotating type mobile terminals according to a fifth preferred embodiment of the present invention.
Figure 49:
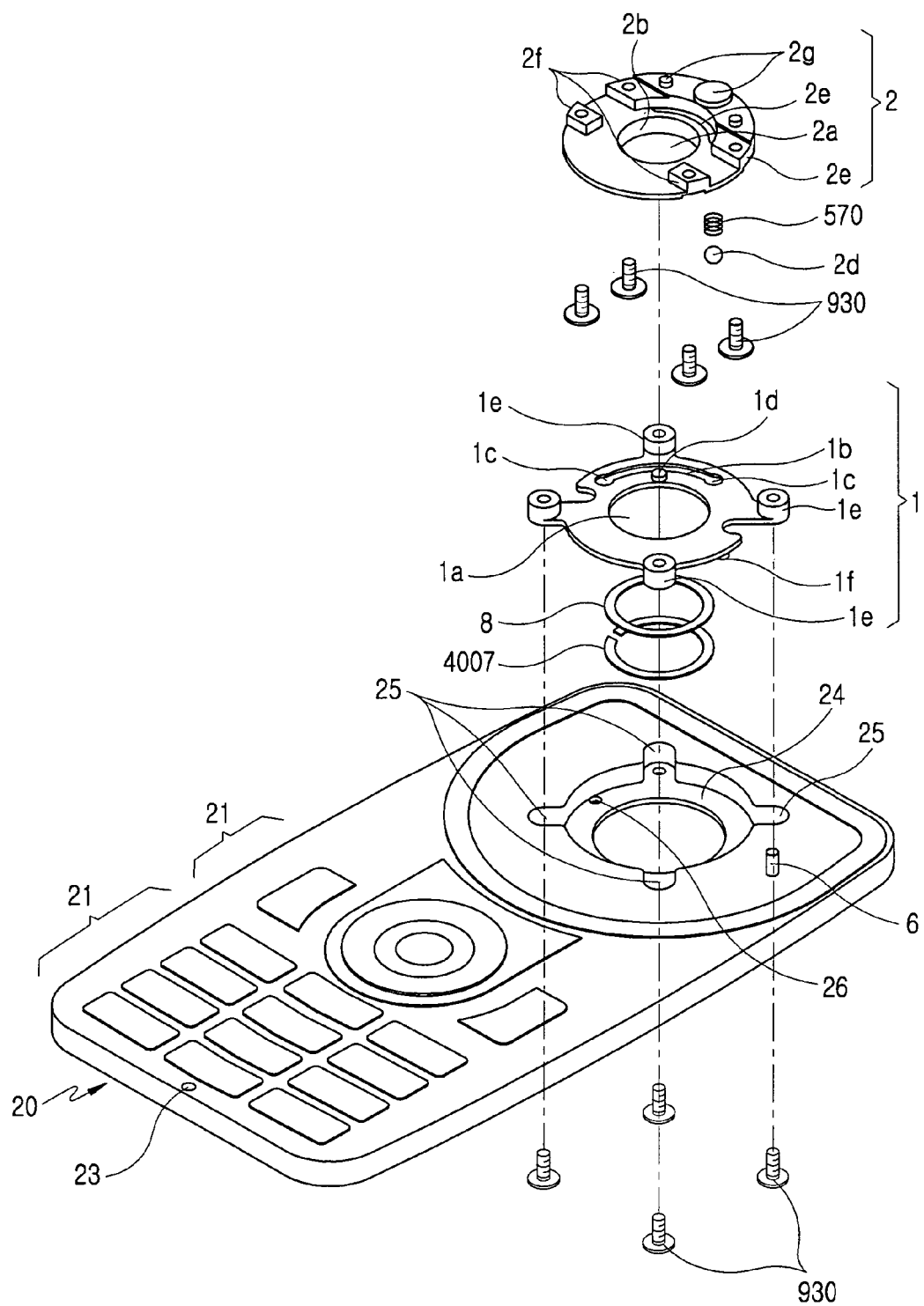
FIG. 49 is an exploded perspective view showing a hinge frame of the sliding/hinge apparatus for sliding/rotating type mobile terminals according to the fifth preferred embodiment of the present invention in FIG. 48.
Figure 50:
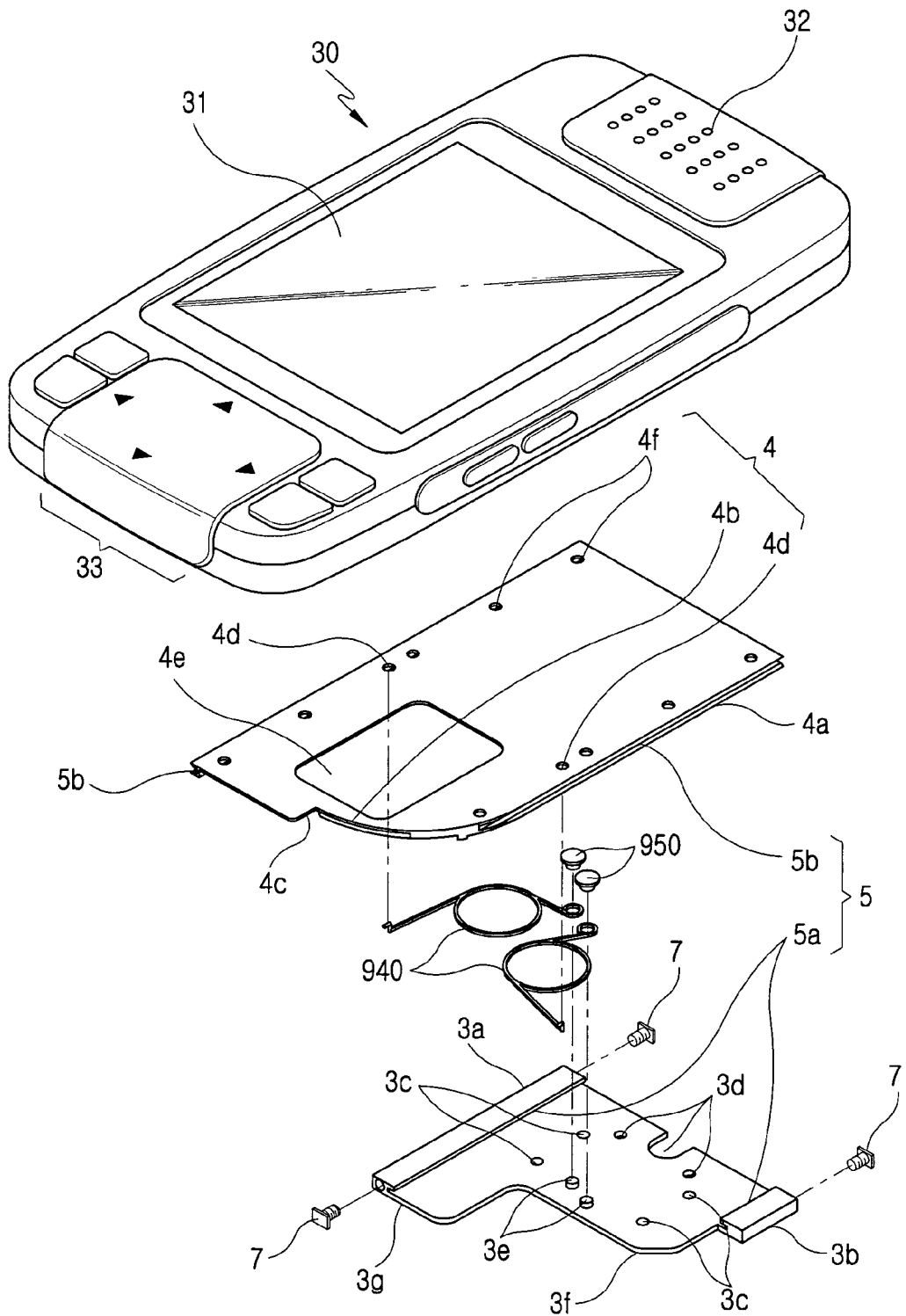
FIG. 50 is an exploded perspective view showing plates of the sliding/hinge apparatus for sliding/rotating type mobile terminals according to the fifth preferred embodiment of the present invention in FIG. 48.
Figure 51:
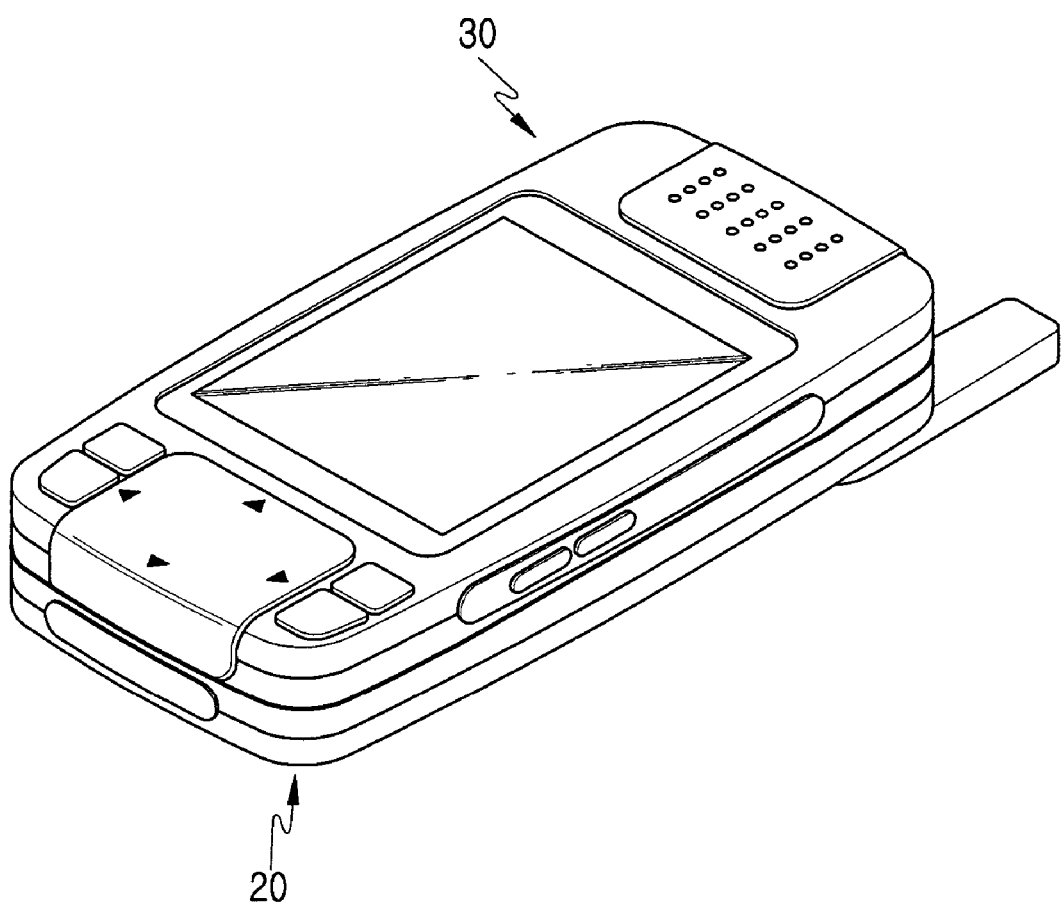
FIG. 51 is an assembled perspective view showing the sliding/hinge apparatus for sliding/rotating type mobile terminals according to the fifth preferred embodiment of the present invention in FIG. 48.
Figure 52:
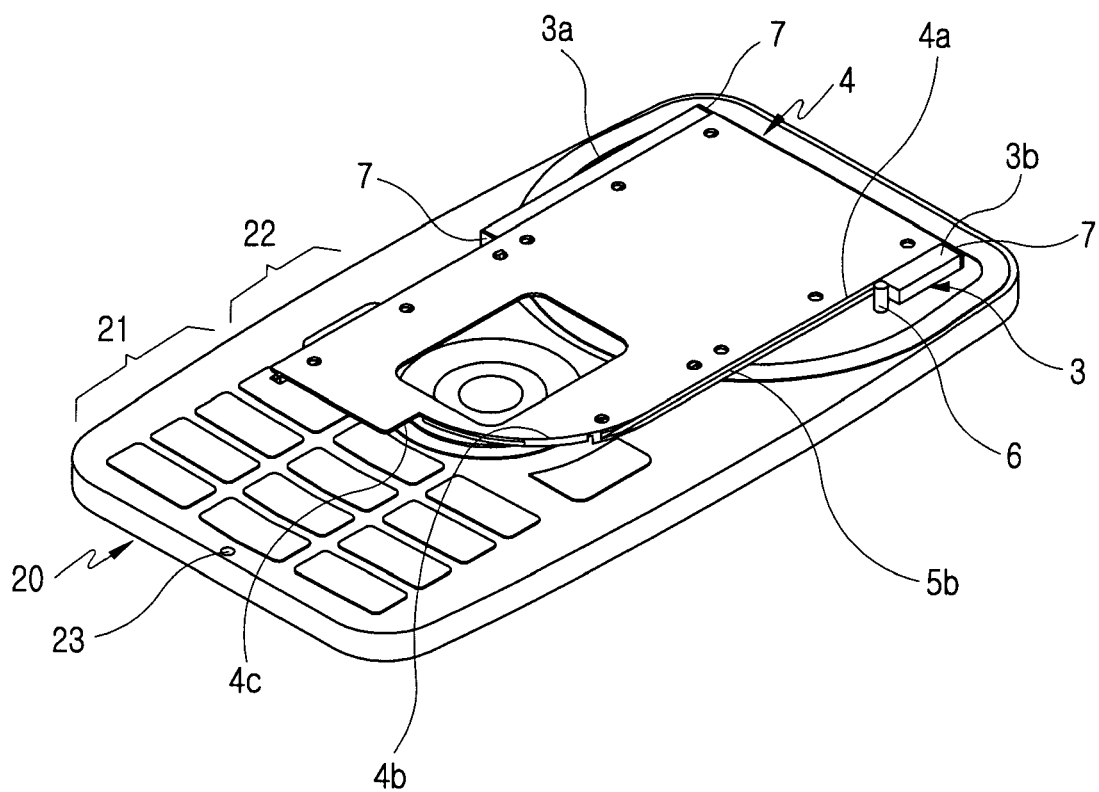
FIG. 52 is a perspective view showing the interior of the sliding/hinge apparatus for the sliding/rotating type mobile terminals shown in FIG. 51.

Operation of a sliding/hinge apparatus for sliding/rotating type mobile terminals according to a fifth preferred embodiment of the present invention will now be described in detail with reference to FIGS. 48 to 66. As shown in FIGS. 48 to 50, the sliding/rotating type mobile terminal comprises a body housing 20 and a slide housing 30. The sliding/hinge apparatus of the sliding/rotating type mobile terminal comprises first and second hinge frames 1 and 2, first and second plates 3 and 4, a guide unit 5, and a guide pin 6. The first hinge frame 1 is inserted into a housing side insertion groove 24 formed at a prescribed position of the upper surface of the body housing 20.

Along the outer edges of the second hinge frame 2 are formed one or more screw coupling holes 2f, through which screws 930 are inserted so that the second hinge frame 2 is attached to the first plate 3 by means of the screws 930. The screws 930 protrude from the corresponding screw coupling holes 2f, and are securely inserted into one or more screw holes 3c formed at the first plate 3.

Figure 64:
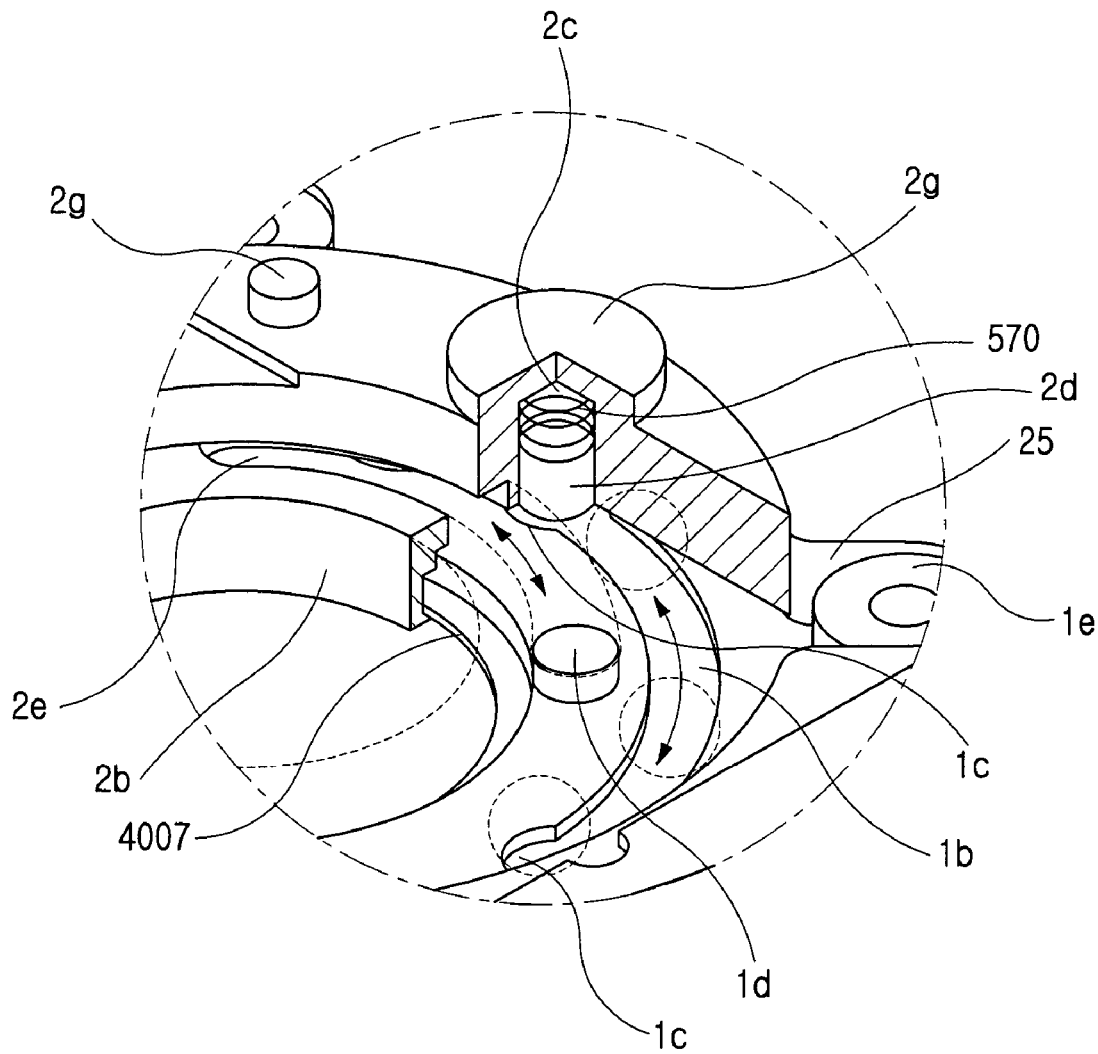
FIG. 64 is an enlarged perspective view showing a portion of the sliding/hinge apparatus for sliding/rotating type mobile terminals shown in FIG. 63 indicated as portion A.

As shown in FIGS. 49 and 64, one or more screw grooves 25 are formed along the outer edge of the housing side insertion groove 24 while being uniformly spaced apart from each other. Screw coupling parts 1e formed at the first hinge frame 1 are inserted into the screw grooves 25, respectively, and the screws 930 are inserted into the screw coupling parts 1e of the first hinge frame 1.

Figure 59:
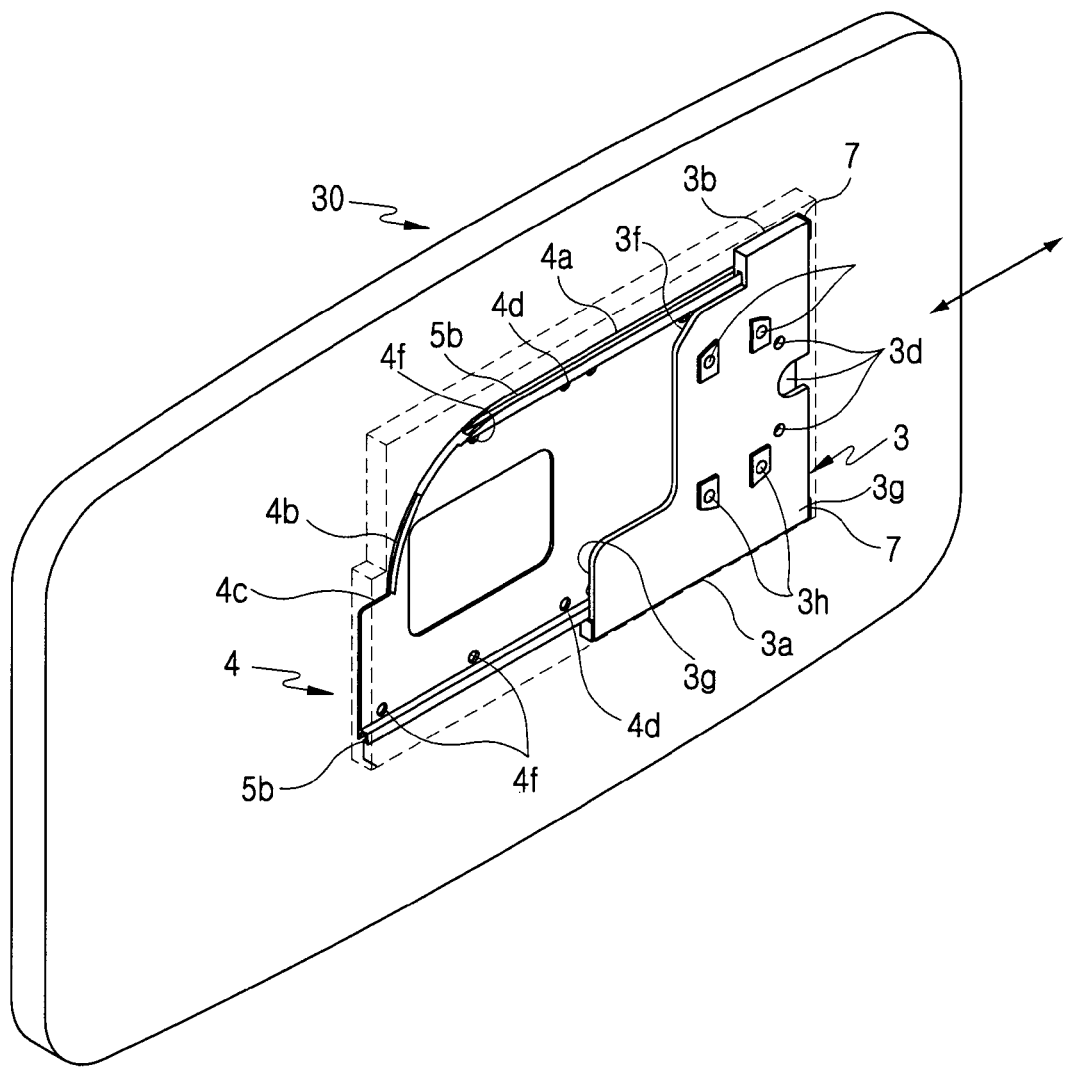
FIG. 59 is a perspective view of the sliding/hinge apparatus for the sliding/rotating type mobile terminals according to the fifth preferred embodiment of the present invention shown in FIG. 48 showing assembly of first and second plates of the sliding/hinge apparatus.

At the lower surface of the first plate 3 are formed one or more screw supporting protrusions 3h for supporting the screw holes, respectively, as shown in FIG. 59. One or more coupling protrusions 2g formed at the second hinge frame 2 are inserted into one or more plate side fixing holes 3d formed at prescribed positions of the first plate 3, respectively.

At prescribed positions of the first plate 3 are formed a pair of rivet pin grooves 3e, through which rivet pins 950 are inserted so that one end of each ring spring 940 is fixed by means of the rivet pins inserted through the rivet pin grooves 3e. The ring springs 940 are arranged such that the end of each ring spring 940 is exactly located in the corresponding rivet pin groove 3e, and then the rivet pins 950 are securely inserted into the rivet pin grooves 3e, respectively.

At both sides of the first and second plates 3 and 4 there is provided a guide unit 5, by which the second plate 4 can be slid. The guide unit 5 comprises guide protrusions 5a formed at first and second slide bars 3a and 3b of the first plate 3 and guide rails 5b formed at the second plate 4.

The first and second slide bars 3a and 3b are formed at both sides of the first plate 3 in the longitudinal direction of the slide housing 30. The guide protrusions 5a are protruded toward the inside part of the first plate 3. The second plate 4 is inserted between the first and second slide bars 3a and 3b. The guide rails 5b formed at both sides of the second plate 4 are engaged with the guide protrusions 5a, respectively, such that the guide rails 5b can be slid. At prescribed positions of the second plate 4 are formed spring fixing holes 4d, which are connected to the other end of each ring spring 940. Attached to both ends of the first and second slide bars 3a and 3b are shock-absorbing members 7, which absorb shock caused due to contact of the plates 3 and 4 and the slide housing 30 when the plates 3 and 4 are slid. The shock-absorbing members 7 are attached to the first and second slide bars 3a and 3b in the longitudinal directions of the first and second slide bars 3a and 3b, respectively.

The second hinge frame 2 is mounted on the upper surface of the first hinge frame 1 in such a manner that the second hinge frame 2 can be rotated about a hinge axis A1 while the second hinge frame 2 is opposite to the first hinge frame 1. Formed at the lower surface of the first hinge frame 1 are one or more fixing protrusions 1f, which are securely inserted into one or more fixing holes 26 formed in the housing side insertion groove 24, respectively.

Figure 53:
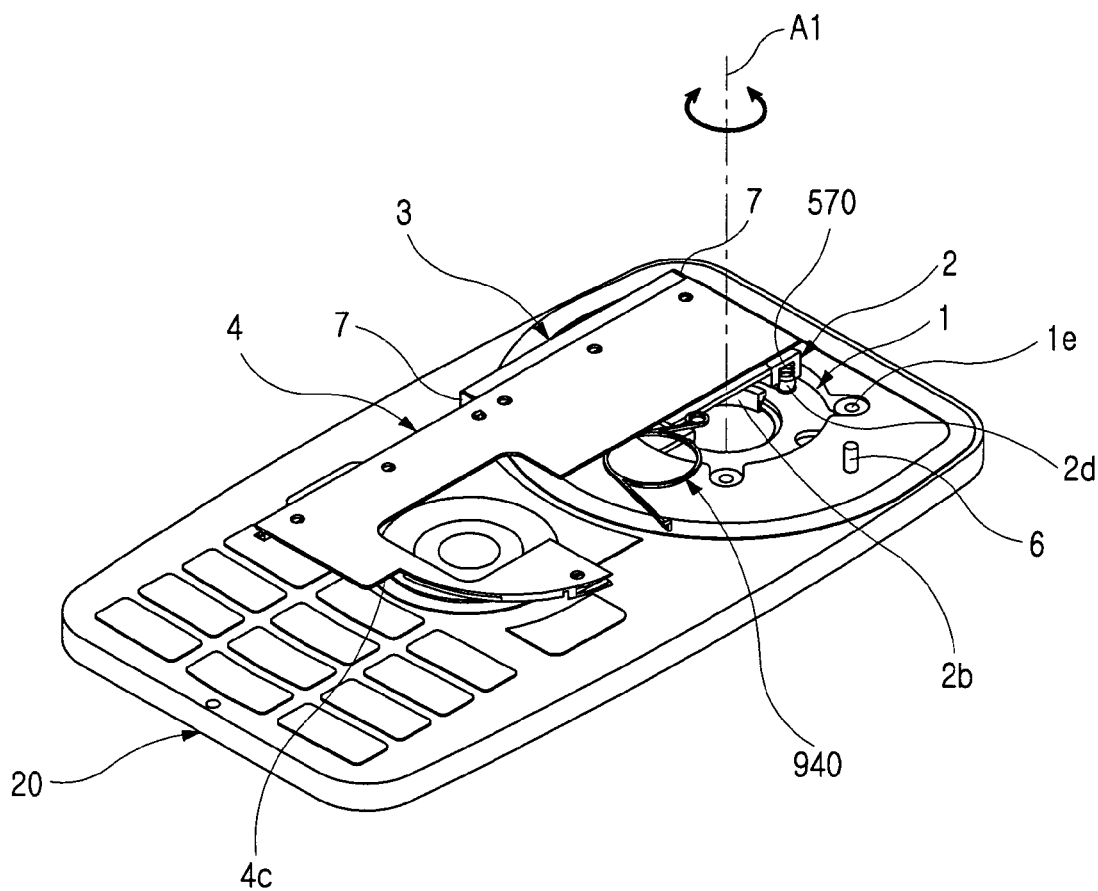
FIG. 53 is a cutaway perspective view showing the interior of the sliding/hinge apparatus for the sliding/rotating type mobile terminals shown in FIG. 52.
Figure 54:
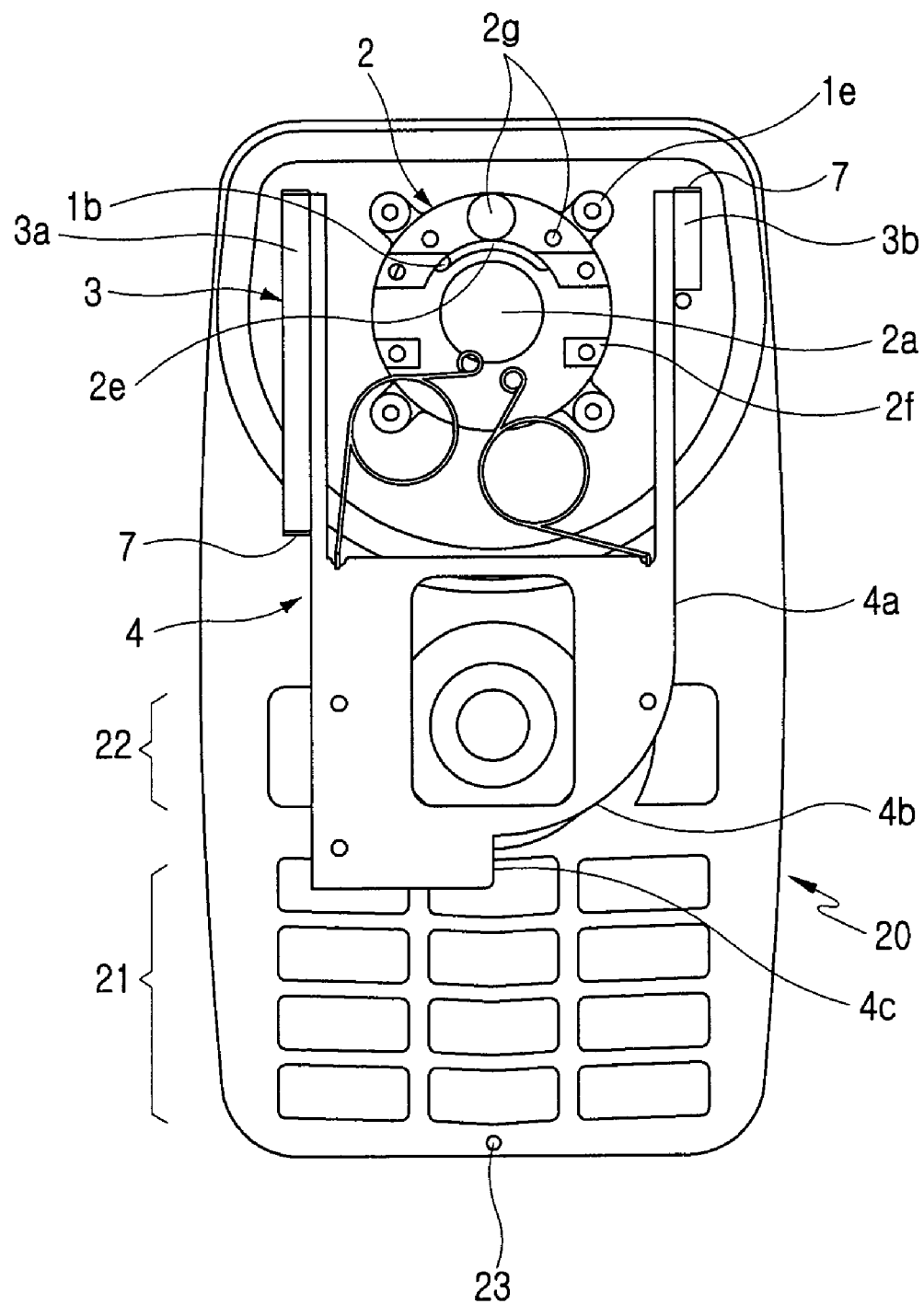
FIG. 54 is a cutaway plan view showing the interior of the sliding/hinge apparatus for the sliding/rotating type mobile terminals shown in FIG. 52.

As shown in FIGS. 48, 53 and 64, a cylinder 2b is formed at the center part of the second hinge frame 2. The cylinder 2b extends downward in the direction of the hinge axis A1 so that the first and second hinge frames 1 and 2 can be rotatably coupled with each other while the first and second hinge frames 1 and 2 are opposite to each other. The cylinder 2b is inserted through a first hinge frame side through-hole 1a formed at the center part of the first hinge frame 1, and then a stopper ring 4007 is fitted in a fitting groove formed at one end of the cylinder 2b. At the upper surface of the stopper ring 4007 is disposed a friction-preventing ring 8, which prevents friction due to rotation of the slide housing 30.

At the center part of the second hinge frame 2 is formed a second hinge frame side through-hole 2a, through which a flexible circuit (not shown) is inserted. Formed at a prescribed position of the second plate 4 is a second plate side through-hole 4e, through which the flexible circuit is inserted.

Figure 55:
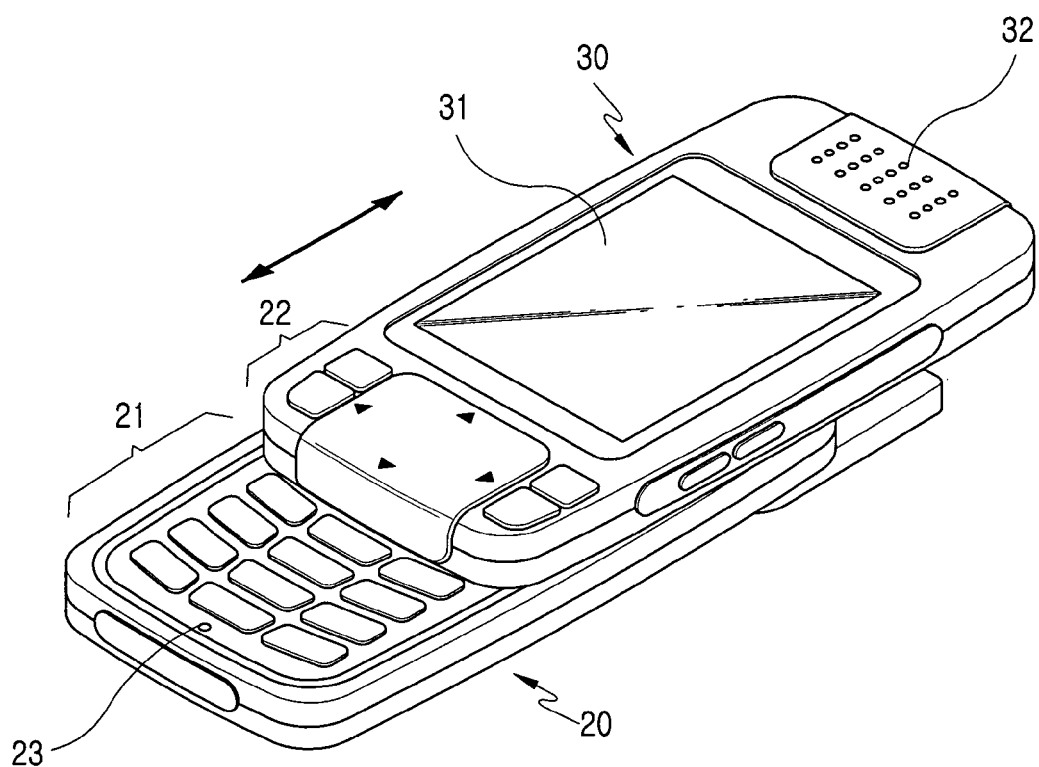
FIG. 55 is a perspective view of the sliding/hinge apparatus for the sliding/rotating type mobile terminals according to the fifth preferred embodiment of the present invention shown in FIG. 48 showing a slide housing of the sliding/hinge apparatus after it has been slid.

As shown in FIGS. 48 and 50, second plate side screw holes 4f are formed at prescribed positions of both sides of the second plate 4 in the longitudinal direction of the plate 4. The second plate 4 is attached to the slide housing 30 by inserting the screws 930 into the second plate side screw holes 4f. When the slide housing 30 is slid as shown in FIG. 55, the guide rails 5b formed at the first plate 3 are guided along the guide protrusions 5a formed at the first and second slide bars 3a and 3b.

Figure 56:
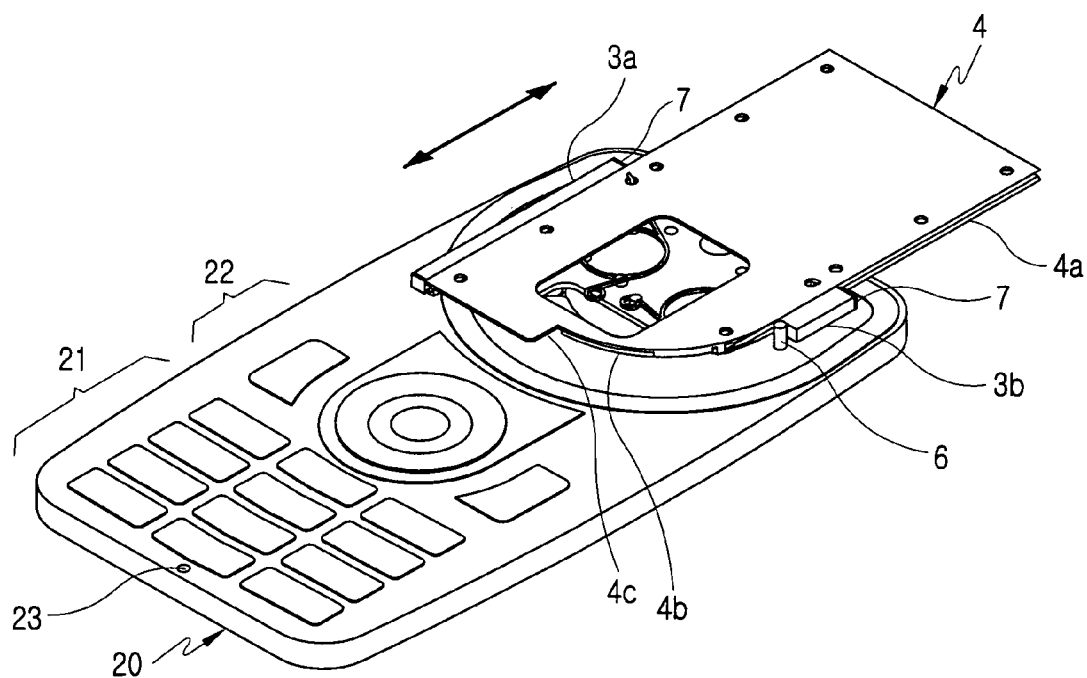
FIG. 56 is a perspective view showing the interior of the sliding/hinge apparatus for the sliding/rotating type mobile terminal shown in FIG. 55.
Figure 57:
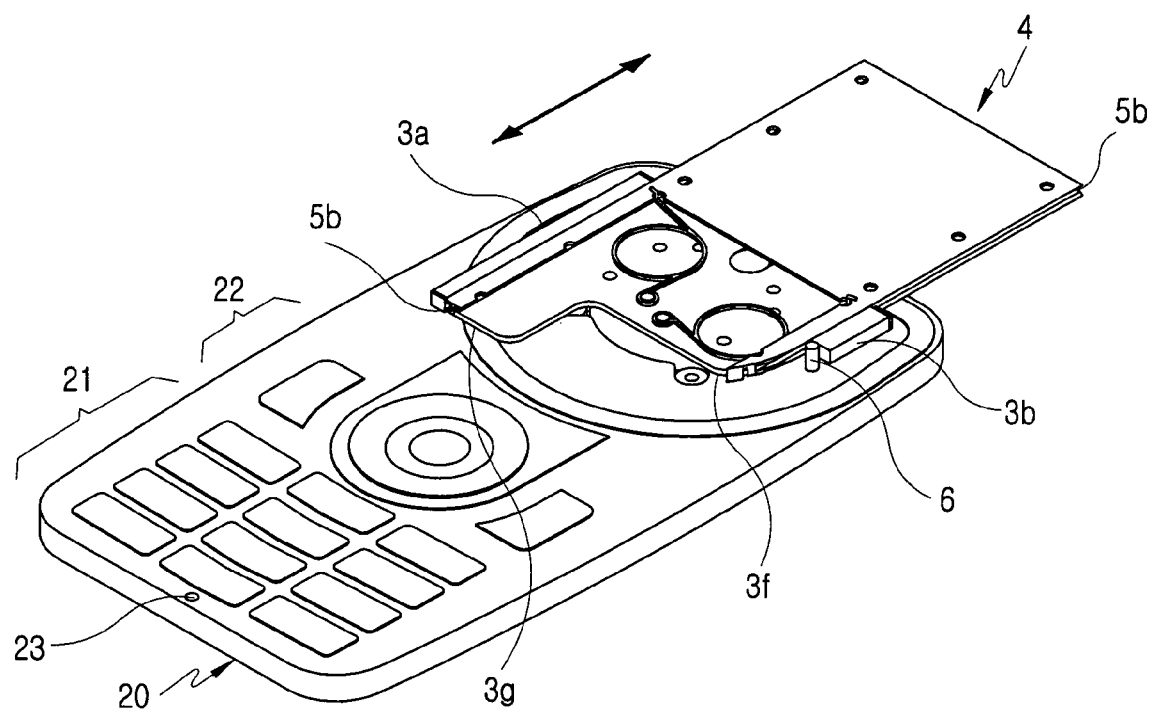
FIG. 57 is a cutaway perspective view showing the interior of the sliding/hinge apparatus for the sliding/rotating type mobile terminals shown in FIG. 55.

A stopper pin 6 is formed at a prescribed position of the upper surface of the body housing, as shown in FIGS. 56 and 57 by which the second plate 4 can be slid and rotated, and the slid and rotated second plate 4 can be stopped. The stopper pin 6 contacts a straight guide part 4a, which is formed at the second plate 4 so that the second plate 4 can be guided by means of the stopper pin 6 when the second plate 4 is slid.

Figure 58:
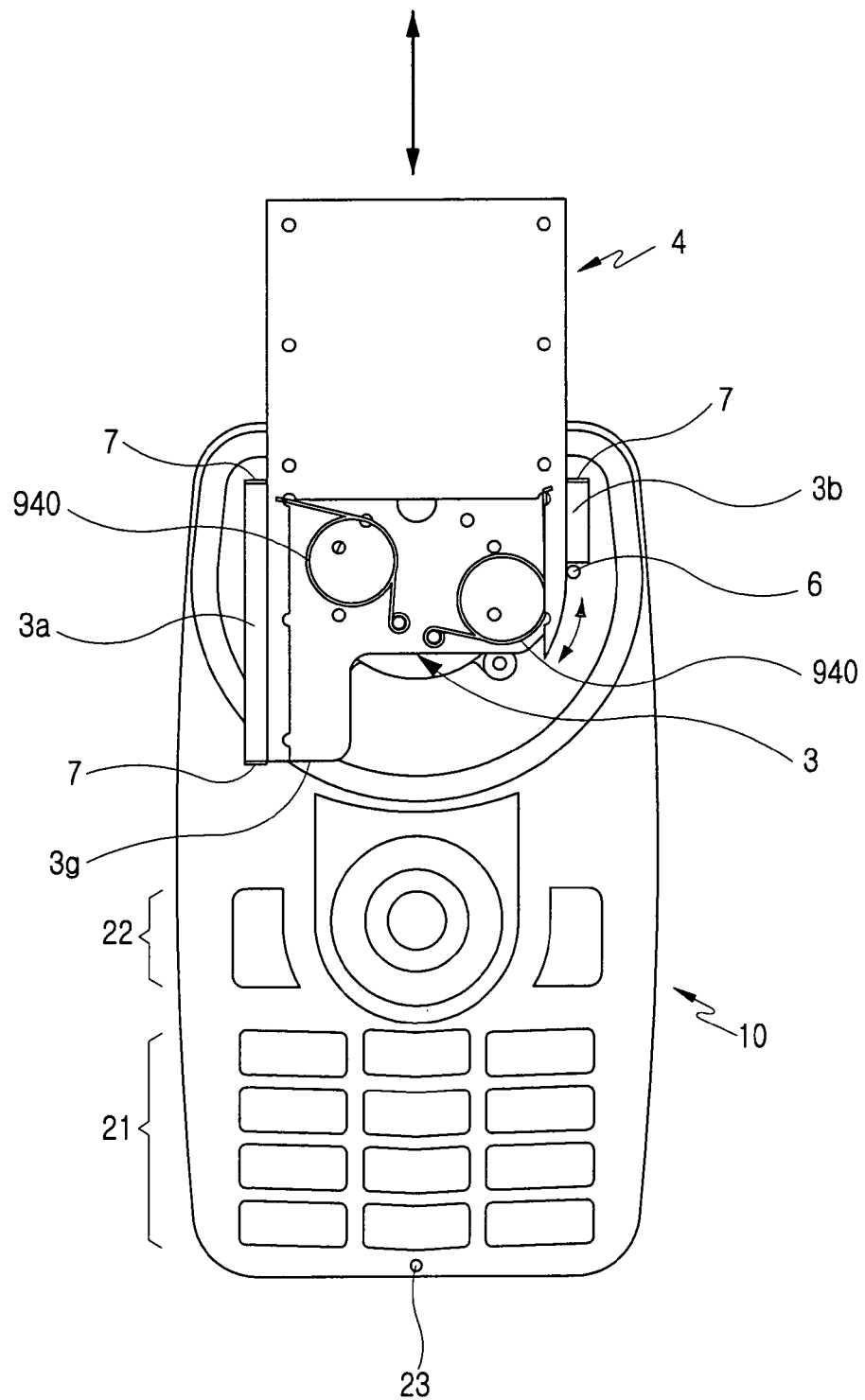
FIG. 58 is a plan view showing the interior of the sliding/hinge apparatus for the sliding/rotating type mobile terminals shown in FIG. 55.

As shown in FIG. 58, a pair of ring springs 940 is disposed between the first and second plates 3 and 4 for providing an elastic force by which the sliding housing 30 can be semi-automatically slid. One end of each ring spring 940, through which the corresponding rivet pin 950 is inserted, is securely fitted in the corresponding rivet pin groove 3e formed at the first plate 3 (FIG. 48). The other end of each ring spring 940 is fixedly inserted into a corresponding spring side fixing hole 4d formed at the second plate 4.

Figure 60:
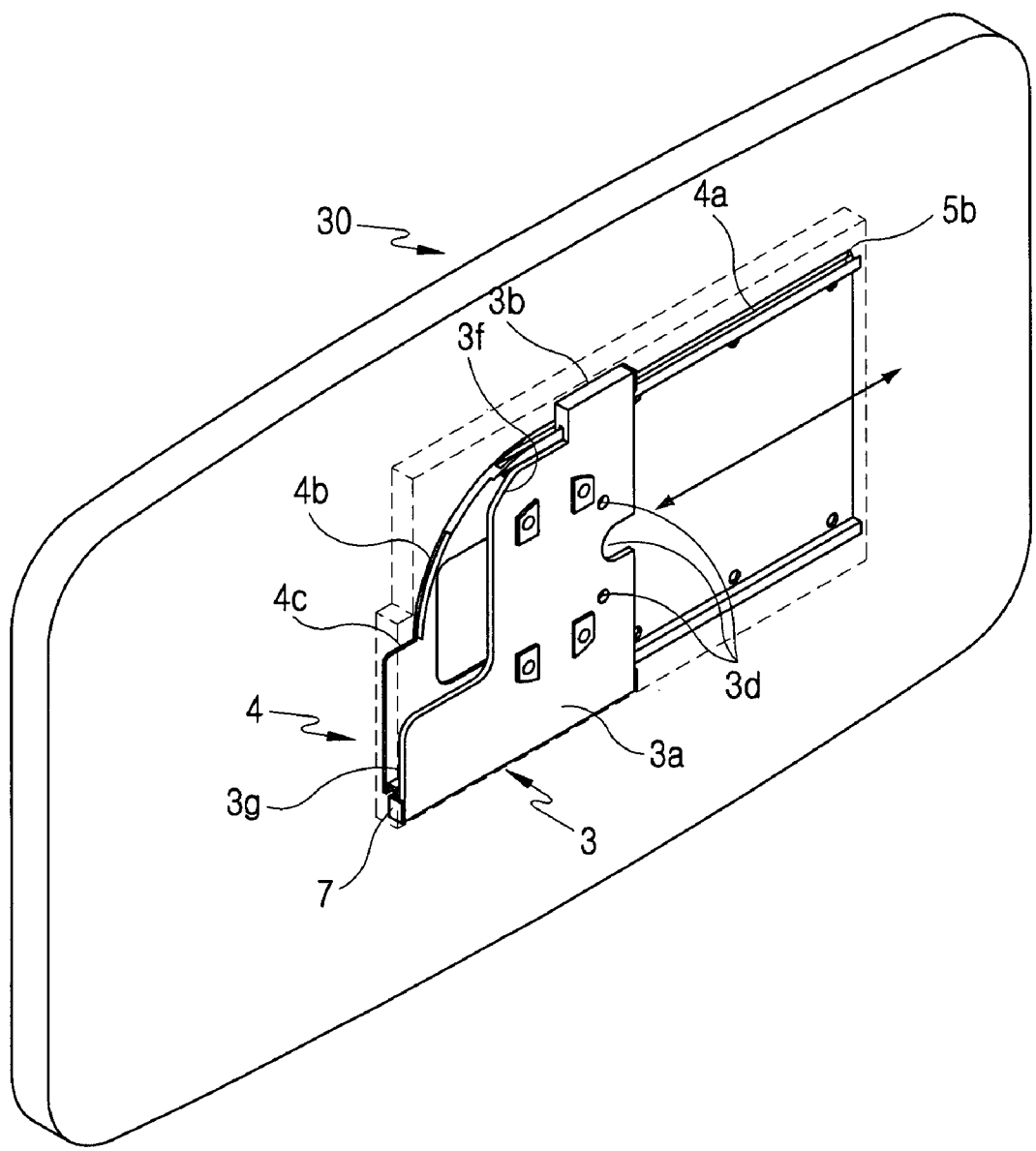
FIG. 60 is a perspective view of the sliding/hinge apparatus for the sliding/rotating type mobile terminals according to the fifth preferred embodiment of the present invention shown in FIG. 48 showing the first and second plates of the sliding/hinge apparatus after they have been slid.

At one end of the first plate 3 is formed a stopper part 3g, which stops the sliding movement of the slide housing 30 when the stopper part 3g contacts the inside of the slide housing 30, as shown in FIGS. 59 and 60. When the second plate 4 is moved as the slide housing 30 is slid, the inside of the slide housing 30 contacts the stopper part 3g, and at the same time the sliding movement of the slide housing 30 is stopped.

Figure 61:
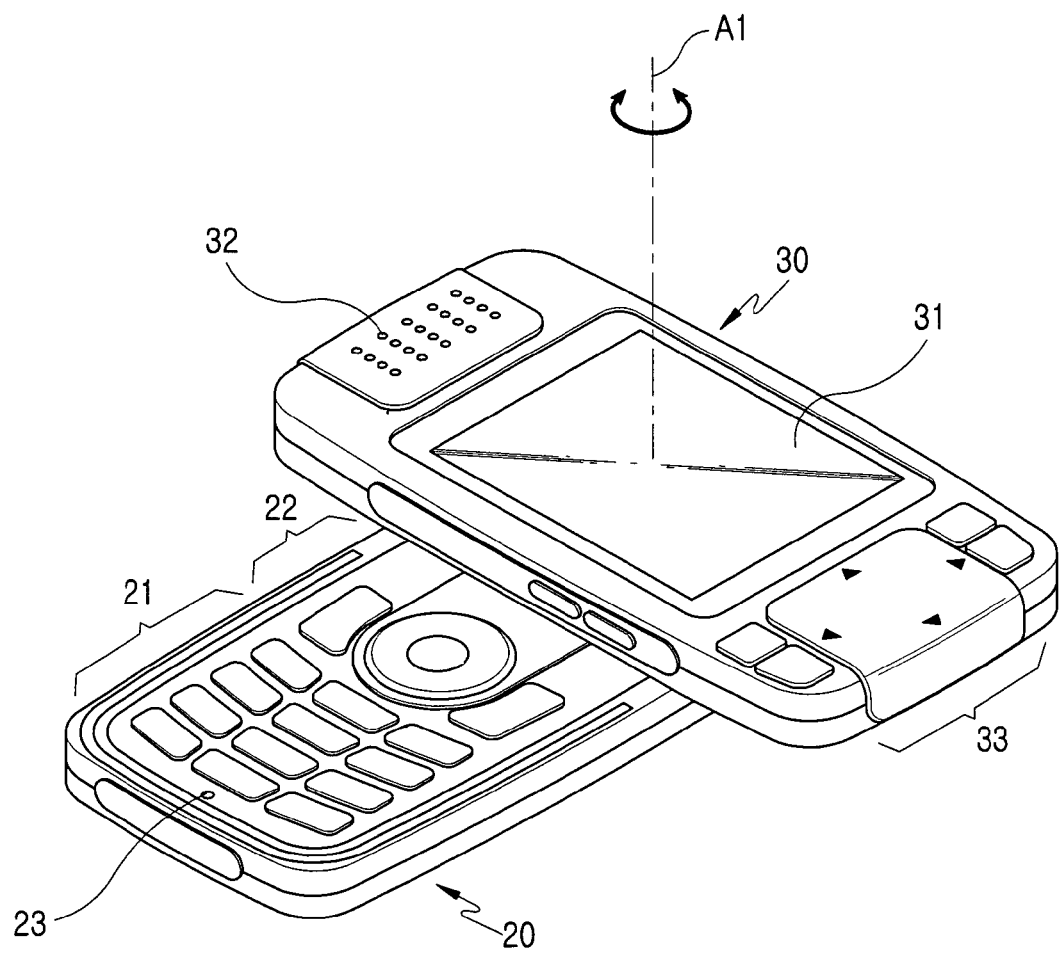
FIG. 61 is a perspective view of the sliding/hinge apparatus for the sliding/rotating type mobile terminals according to the fifth preferred embodiment of the present invention shown in FIG. 48 showing the slide housing of the sliding/hinge apparatus after it has been rotated.

Latching protrusions 4c are formed at the lower ends of the guide parts 4a and 4b, as shown in FIG. 60, which are engaged with a latching member 3f of the first plate 3. When the slide housing 30 is slid and then rotated as shown in FIG. 61, the sliding housing 30 and the body housing 20 are arranged in the shape of a "T".

Figure 62:
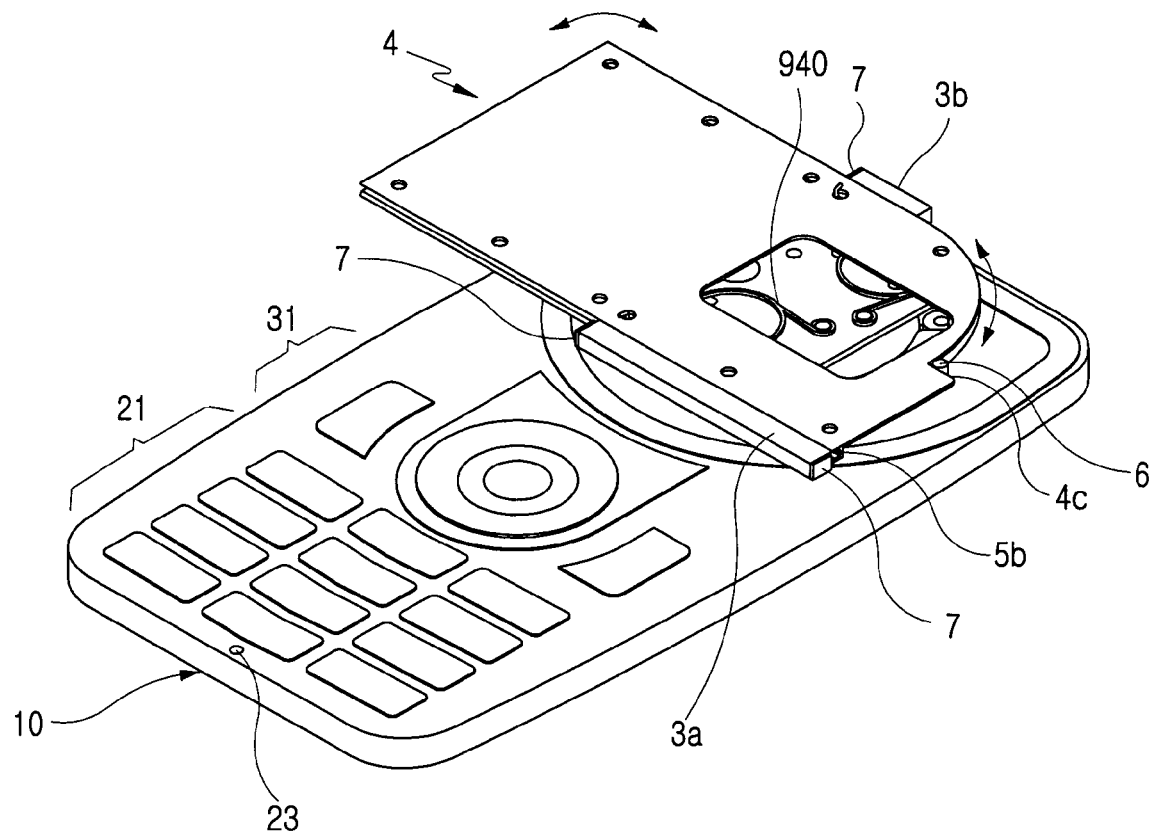
FIG. 62 is a perspective view showing the interior of the sliding/hinge apparatus for the sliding/rotating type mobile terminals shown in FIG. 61.
Figure 63:
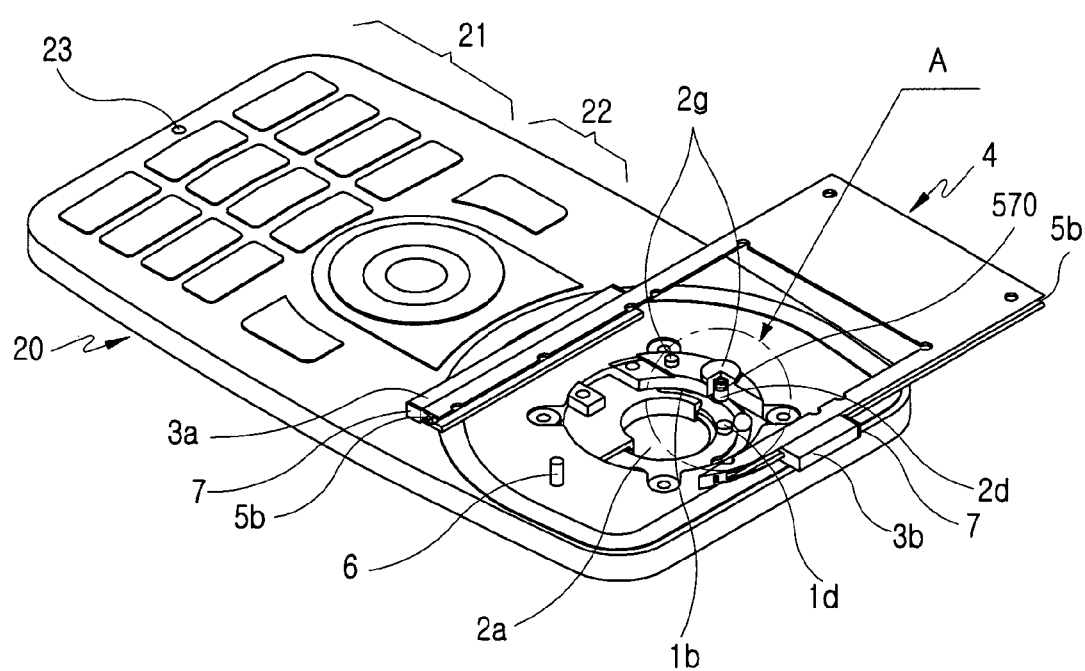
FIG. 63 is a cutaway perspective view showing the interior of the sliding/hinge apparatus for the sliding/rotating type mobile terminals shown in FIG. 61.

A ball guide groove 1b is formed around the first hinge frame side through-hole 1a, in the circumferential direction thereof, as shown in FIGS. 62 to 64, along which a ball 2d is guided so that the slide housing 30 can be rotated. The ball 2d, which is provided in the second hinge frame 2, is guided along the ball guide grooves 1b, whereby the second hinge frame 2 is rotated. At both ends of the ball guide groove 1b are formed ball grooves 1c, respectively, in which the ball 2d is securely located, as shown in FIGS. 63 and 64. The ball 2d is disengaged from one of the ball grooves 1c, moved along the ball guided groove 1b, and engaged into the other ball groove 1c, so that the rotatability of the second hinge frame 2 is improved.

A spring hole 2c is formed at the position next to the cylinder 2b of the second hinge frame 2 having a compression spring 570 disposed therein, as shown in FIG. 64. The ball 2d is disposed in the spring hole 2c such that the ball 2d emerges from the lower end of the spring hole 2c by means of the elastic force of the compression spring 570. The ball 2d is securely located in the ball guide groove 1b or the ball grooves 1c so that the slide housing 30 can be rotated or the rotation of the slide housing 30 can be stopped, respectively.

Figure 65:
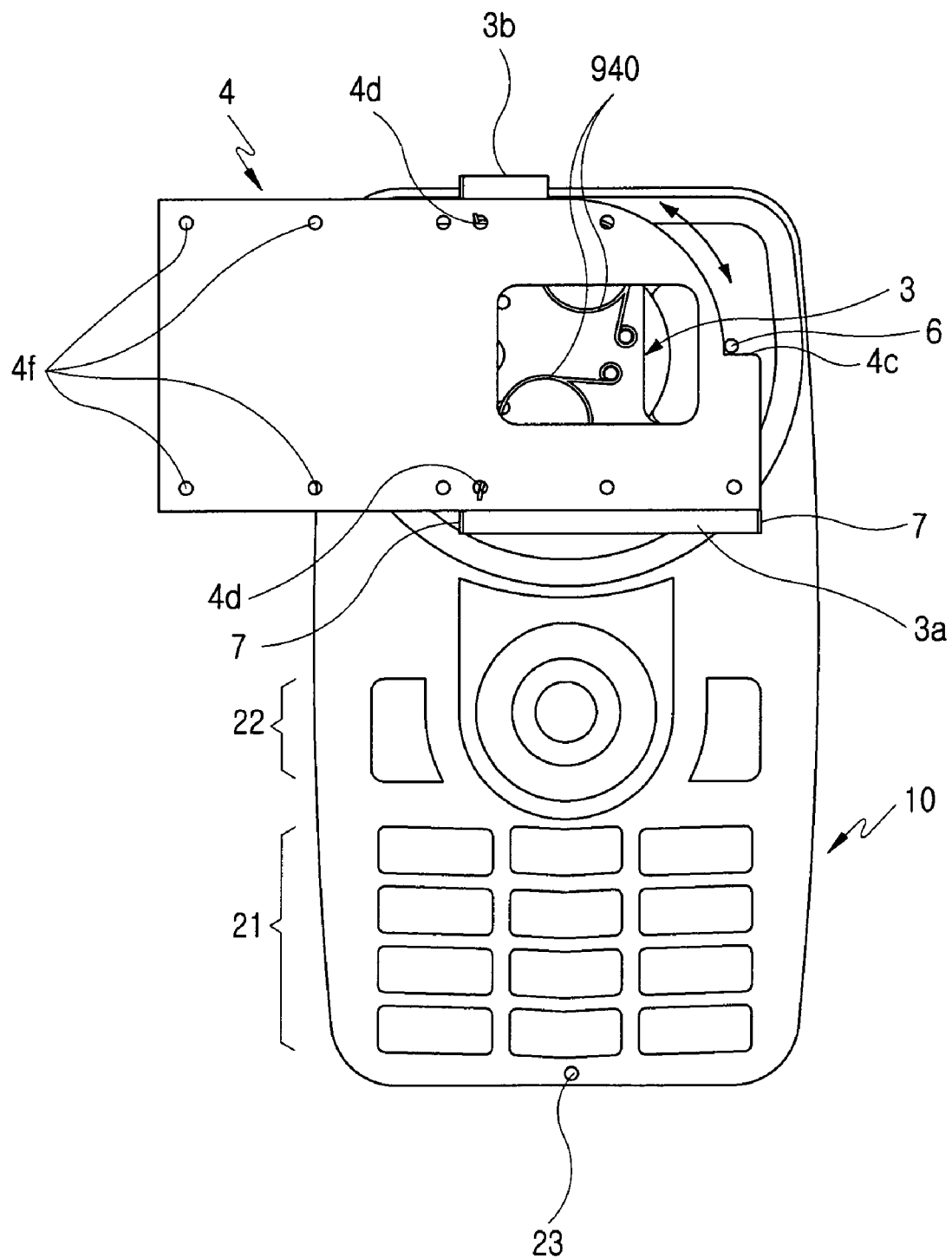
FIG. 65 is a plan view showing the interior of the sliding/hinge apparatus for the sliding/rotating type mobile terminals shown in FIG. 61.
Figure 66:
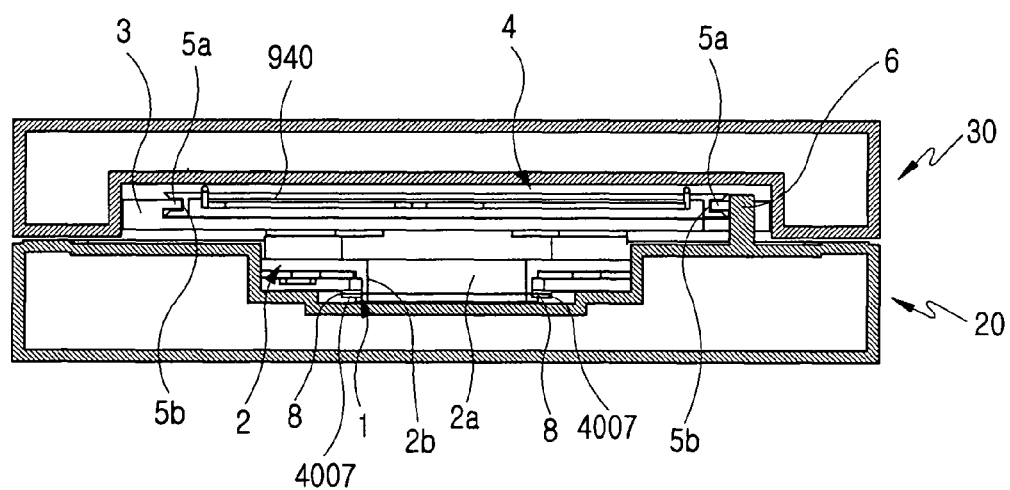
FIG. 66 is a side cross-sectional view showing the construction of the sliding/hinge apparatus for the sliding/rotating type mobile terminals according to the fifth preferred embodiment of the present invention in FIG. 48.

A stopper hole 2e is formed between the second hinge frame side through-hole 2a and the spring hole 2c, along the circumference of the through-hole 2a, in which a stopper protrusion 1d is engaged so that the slide housing 30 is guided and simultaneously the rotation of the slide housing 30 is stopped. When the slide housing 30 is rotated as shown in FIG. 65, the slide housing 30 is rotated along a curved guide part 4b formed at the second plate 4.

The plates 3 and 4 can be slid and rotated by means of the stopper pin 6 formed at the body housing 20. Also, the slid and rotated plates 3 and 4 are stopped by means of the stopper pin 6. An engaging surface 4c is formed at one end of the second plate 4, in which the stopper pin 6 is securely located. When the stopper pin 6 is securely located in the engaging surface 4c, the sliding movement and rotation of the plates 3 and 4 are stopped.

The body housing 20 is provided with a microphone unit 23 and a plurality of keypads 21. The body housing 20 is also provided with a plurality of auxiliary keypads 22, which are arranged adjacent to the keypads 21. The sliding housing 30 is provided with a plurality of auxiliary keypads 33 and a speaker unit 32.

The operation of a sliding/hinge apparatus for sliding/rotating type mobile terminals according to a sixth preferred embodiment of the present invention will now be described in greater detail with reference to FIGS. 67 to 73.

Figure 67:
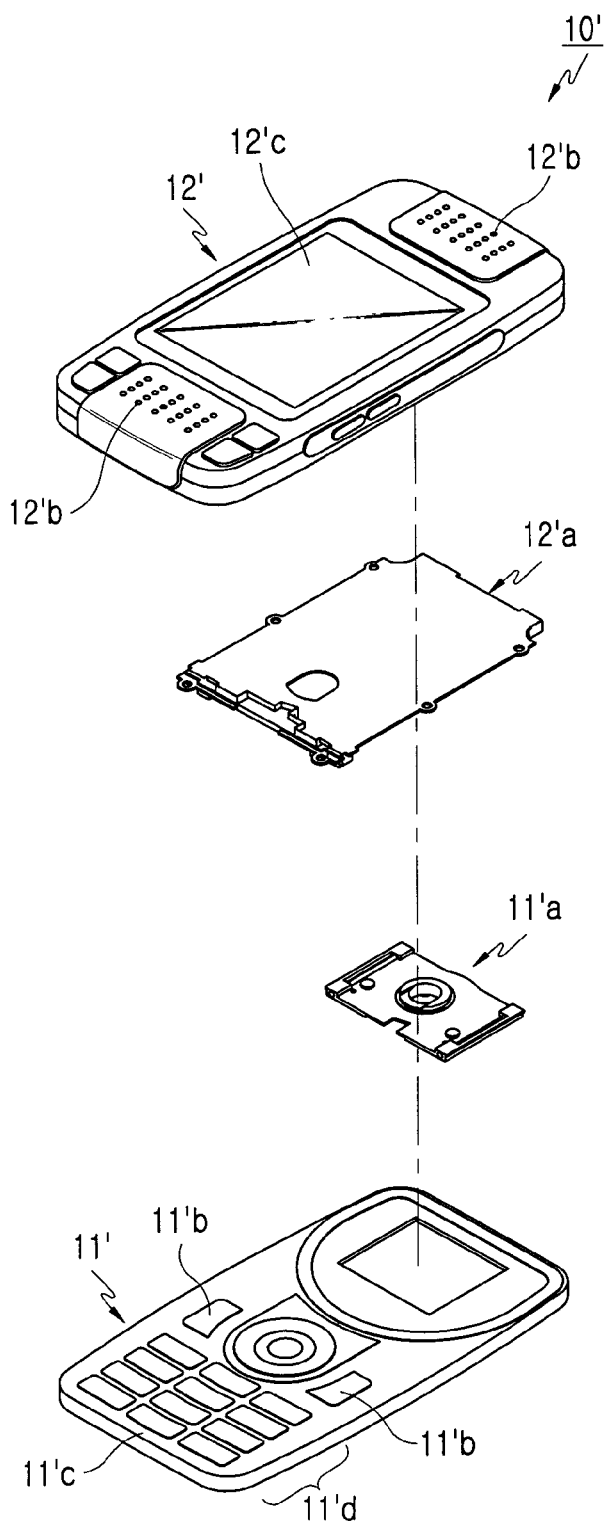
FIG. 67 is an exploded perspective view showing the construction of a sliding/hinge apparatus for sliding/rotating type mobile terminals according to a sixth preferred embodiment of the present invention.

As shown in FIG. 67, the sliding/hinge apparatus for sliding/hinge type mobile terminals includes first and second housings 11' and 12' extending in the longitudinal direction, a sliding module 12'a, and a rotating module 11'a.

Figure 68:
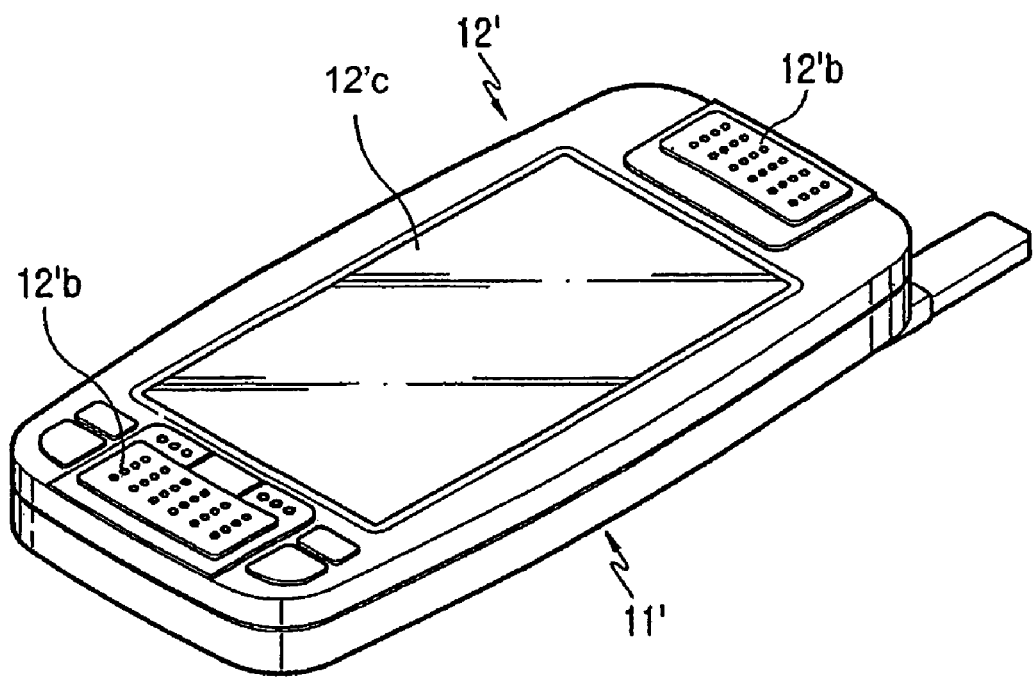
FIG. 68 is a perspective view showing a sliding/hinge apparatus for sliding/rotating type mobile terminals, before sliding, according to the sixth preferred embodiment of the present invention.
Figure 72:
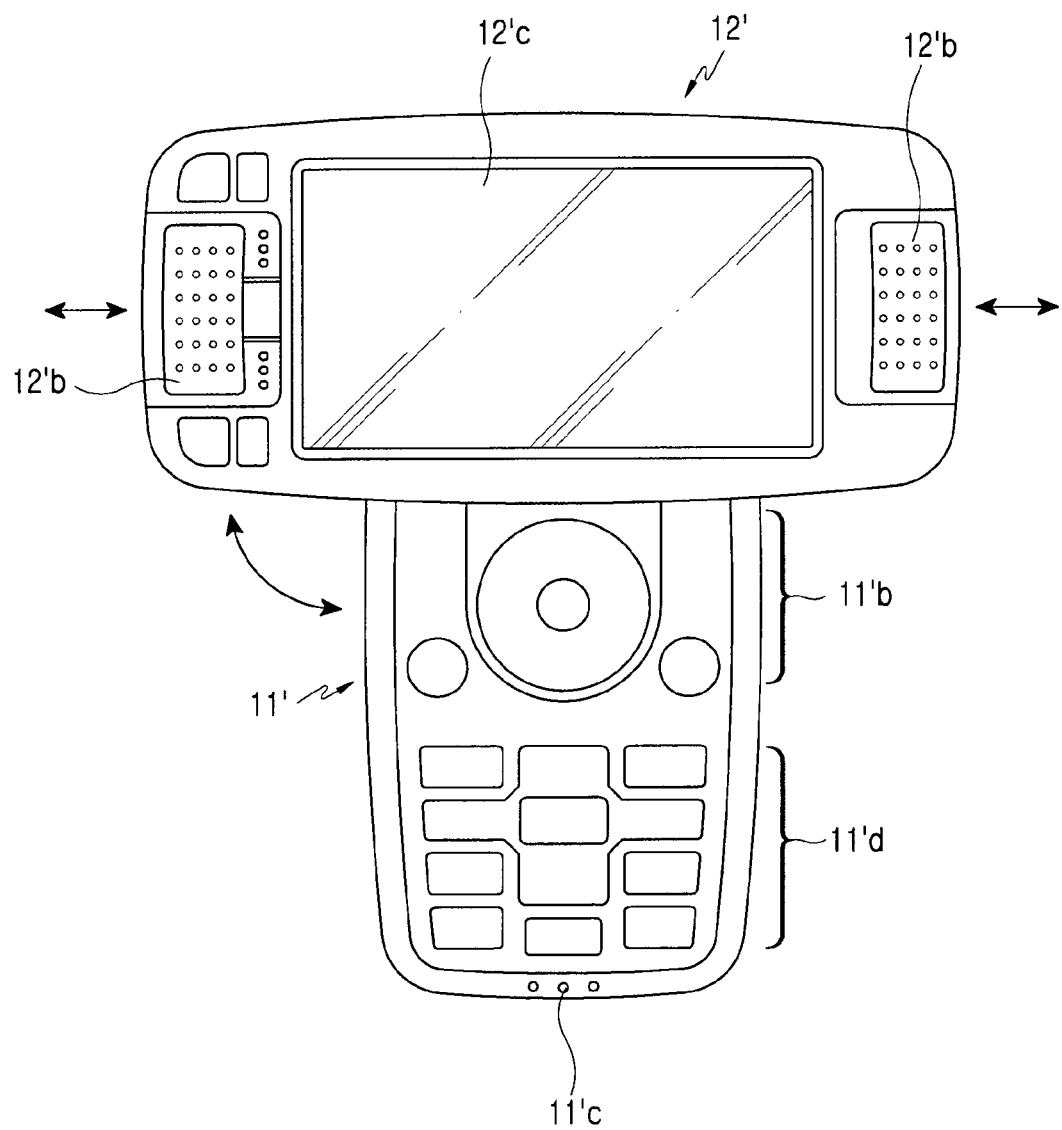
FIG. 72 is a front view of the second housing of a sliding/hinge apparatus for sliding/rotating type mobile terminals, after rotating, according to the sixth preferred embodiment of the present invention.

As shown in FIGS. 68 and 72, the first housing 11' is positioned to face the back surface of the second housing 12'. The second housing 12' is adapted to slide while facing the first housing 11' and rotate about a predetermined axis.

Figure 69:
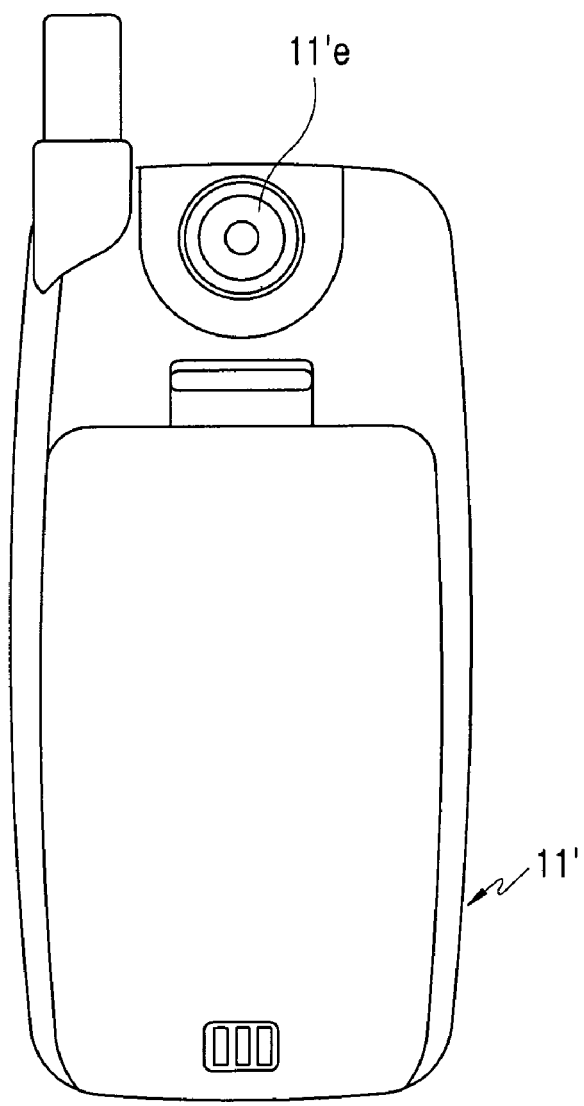
FIG. 69 is a rear view of a first housing of a sliding/hinge apparatus for sliding/rotating type mobile terminals according to the sixth preferred embodiment of the present invention.
Figure 70:
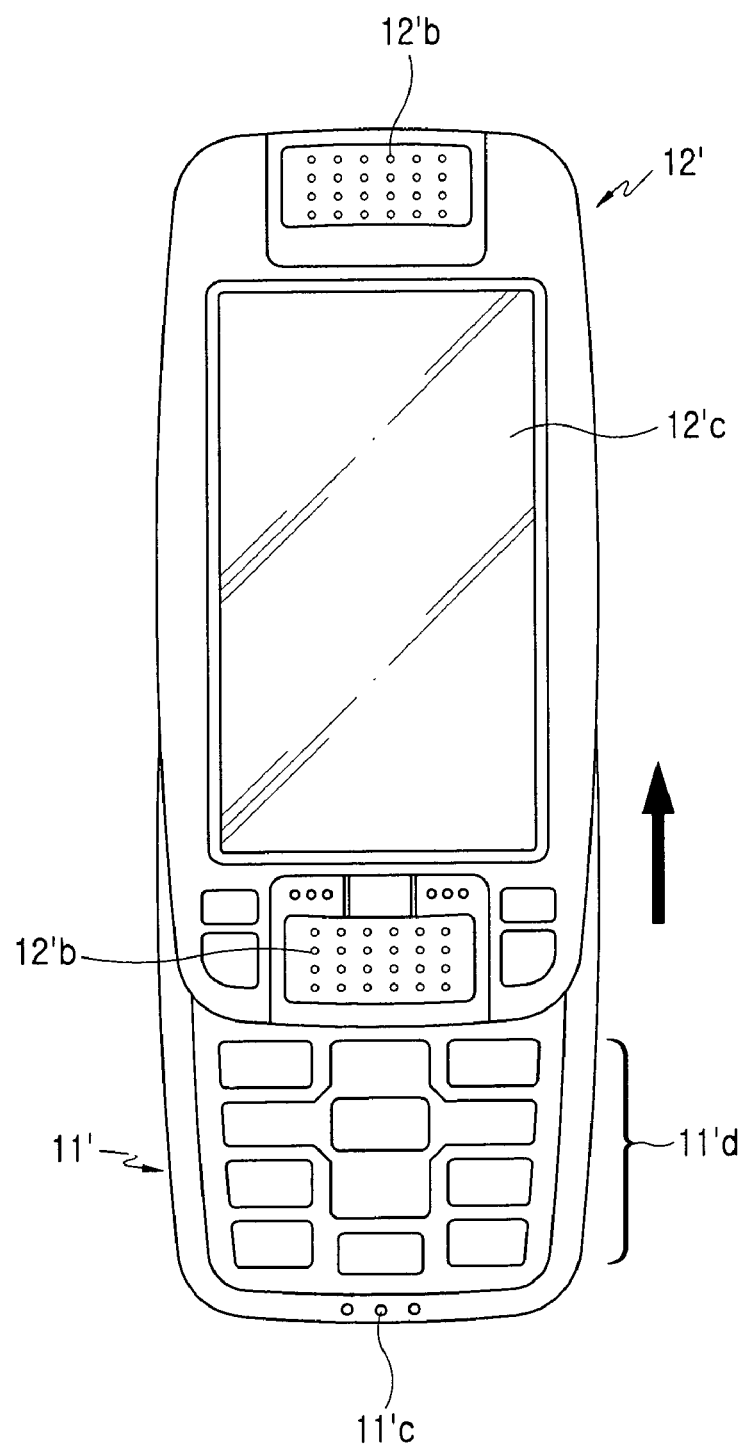
FIG. 70 is a front view of a second housing of a sliding/hinge apparatus for sliding/rotating type mobile terminals, after sliding, according to the sixth preferred embodiment of the present invention.

As shown in FIG. 70, the first housing 11' has a main keypad 11'd including a number of keys, which are exposed as the second housing 12' slides, and a microphone device 11'c positioned on the front surface thereof. As shown in FIG. 69, the first housing 11' has a camera lens module 11'e positioned on the rear surface thereof.

As shown in FIG. 67, the sliding module 12'a is fastened to the back surface of the second housing 12' so that it can slide. The rotating module 11'a is rotatably coupled to the sliding module 12'a and also fastened to the top surface of the first housing 11'.

As shown in FIG. 70, the sliding module 12'a slides the second housing 12' away from the first housing 11' in the longitudinal direction from an initial position to a final position. As shown in FIG. 72, after sliding the second housing to the final position, the rotating module 11' rotates the second housing 12' about a predetermined axis.

As shown in FIG. 72, the first housing 11' has an auxiliary keypad 1'b positioned on the front surface thereof, which is exposed as the second housing 12' rotates.

The first and second housings 11' and 12' are positioned in a T-shaped configuration.

The second housing 12' has a pair of stereo speaker devices 12'b positioned on both ends thereof, respectively.

Figure 71:
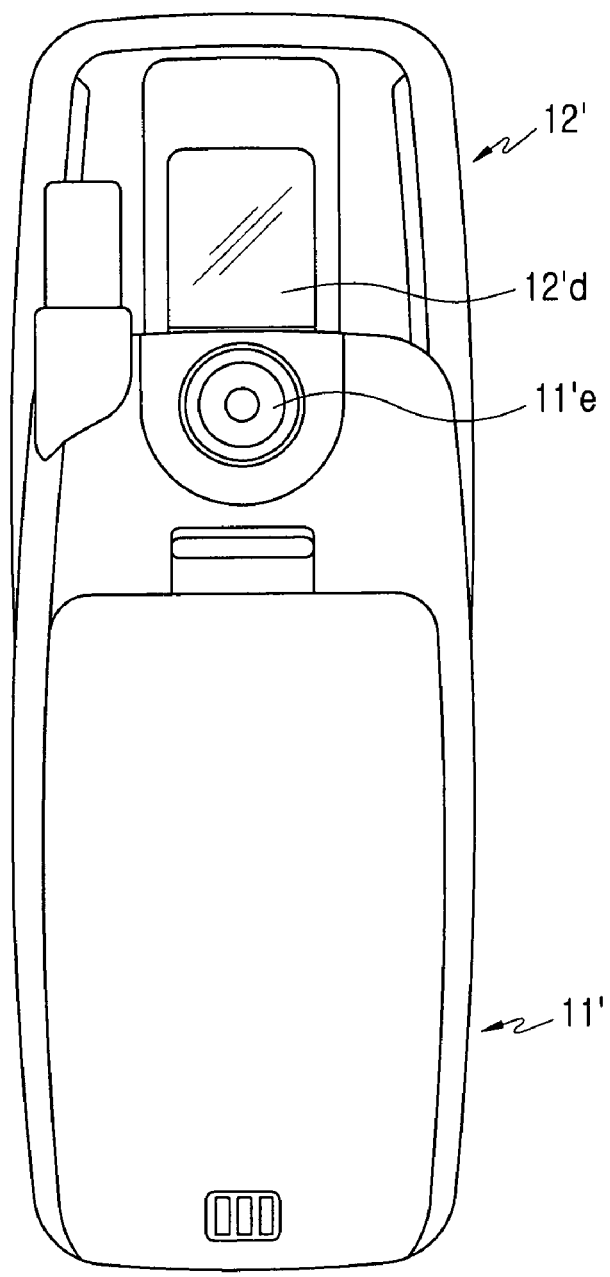
FIG. 71 is a rear view of the sliding/hinge apparatus for sliding/rotating type mobile terminals shown in FIG. 70.

As shown in FIG. 70, the second housing 12' has a main display device 12'c positioned on the front surface thereof, which is always exposed. As shown in FIG. 71, the second housing 12'c has an auxiliary display device 12'd positioned on the rear surface thereof, which is used to display the same type of images and characters as displayed on the main display device 12'c when the second housing 12' is slid.

The auxiliary display device 12'd may be made of a reflection plate.

Figure 73:
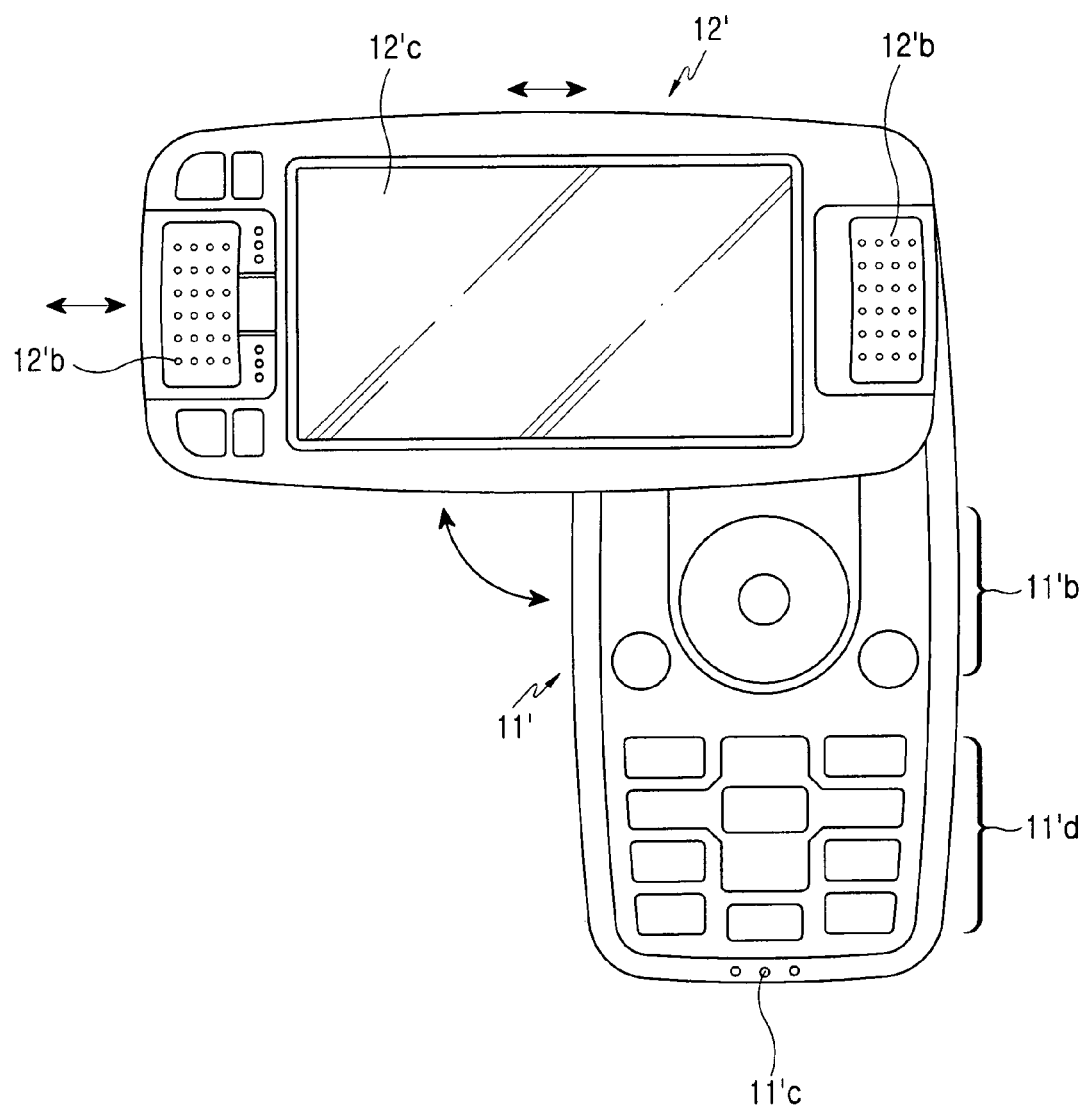
FIG. 73 is a front view showing a second housing of a sliding/hinge apparatus for sliding/rotating type mobile terminals according to the sixth preferred embodiment of the present invention, which has slid in the same direction as it has rotated.

After the second housing 12' is rotated about the predetermined axis, as shown in FIG. 73, it is slid in a direction substantially perpendicular to the longitudinal direction (horizontal direction). Then, the first and second housings 11' and 12' are positioned in a Γ-shaped configuration.

As shown in FIGS. 68 and 73, the second housing 12' slides in a direction substantially perpendicular to the longitudinal direction (horizontal direction) until reaching the final position, where it again rotates about the predetermined axis to be folded onto the top surface of the first housing 11' while facing it.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. For example, as those skilled in the art can appreciate, the embodiments of the present invention discussed above are applicable to any portable terminals.

What is claimed is:

1. A sliding/rotating type portable communication apparatus comprising:
   a first housing; and
   a second housing adapted to linearly slide along a first predetermined axis while facing the first housing and rotate about a second predetermined axis;
   wherein the second housing is adapted to slide while facing the first housing, rotate about the second predetermined axis, and then slide in a direction approximately perpendicular to the first predetermined axis; and
   wherein the second housing is adapted to rotate about the second predetermined axis, then slide in a direction approximately perpendicular to a direction of the linear sliding, to a final sliding position, and then rotate again to be folded on the first housing.

2. The apparatus as set forth in claim 1, further comprising:
   a sliding module positioned between the first and second housings to slide the second housing; and
   a rotating module adapted to guide the sliding of the sliding module and, after the sliding is over, rotate the sliding module about the second predetermined axis.

3. The apparatus as set fourth in claim 2, wherein the sliding module is fastened to the back surface of the second housing and the rotating module is fastened to the upper surface of the first housing.

4. The apparatus as set fourth in claim 1, wherein the second housing is adapted to rotate while continuously facing the first housing.

5. The apparatus as set fourth in claim 1, wherein the sliding of the second housing exposes a main keypad of the first housing and the rotation of the second housing exposes an auxiliary keypad of the first housing.

6. The apparatus as set fourth in claim 5, wherein the first and second housings are positioned in a T-shaped configuration.

7. The apparatus as set fourth in claim 1, wherein the first and second housings are positioned substantially perpendicular to each other as the second housing rotates.

8. The apparatus as set forth in claim 1, wherein the first and second housings are positioned in a Γ-shaped configuration.

9. The apparatus as set fourth in claim 1, wherein the second housing has a pair of stereo speaker devices positioned on both ends thereof, respectively.

10. The apparatus as set fourth in claim 1, wherein the second housing has a main display device positioned on the front surface thereof, which is always exposed, and an auxiliary display device positioned on the rear surface thereof, which is exposed to the exterior as the second housing is slid and rotated.

11. The apparatus as set fourth in claim 10, wherein the auxiliary display device is made of a reflection plate.

12. The apparatus as set fourth in claim 1, wherein the first housing has a microphone device positioned on the front surface thereof and a camera lens module positioned on the lower surface thereof.

13. A sliding/rotating type portable communication apparatus comprising:
   a first housing;
   a second housing;
   a sliding module positioned between the first and second housings, the sliding module being adapted to allow the second housing to linearly slide with respect to the first housing between an initial position and a secondary position; and
   a rotating module positioned between the first and second housings, the rotating module being adapted to allow the second housing to rotate with respect to the first housing about a predetermined axis;
   wherein the second housing is adapted to slide in a first direction while facing the first housing, rotate about the predetermined axis, and then slide in a direction approximately perpendicular to the first direction.

14. The apparatus as set fourth in claim 13, wherein the sliding module is fastened to the back surface of the second housing and the rotating module is fastened to the upper surface of the first housing.

15. The apparatus as set fourth in claim 13, wherein the first and second housings are positioned substantially perpendicular to each other as the second housing rotates.

16. The apparatus as set fourth in claim 13, wherein the second housing is adapted to rotate about the predetermined axis, then slide in a direction approximately perpendicular to a direction of the linear sliding, to a final sliding position, and then rotate again to be folded on the first housing.

17. The apparatus as set fourth in claim 13, wherein the second housing has a pair of stereo speaker devices positioned on both ends thereof, respectively.

* * * * *